(12) United States Patent
Chen et al.

(10) Patent No.: US 10,796,480 B2
(45) Date of Patent: Oct. 6, 2020

(54) METHODS OF GENERATING PERSONALIZED 3D HEAD MODELS OR 3D BODY MODELS

(71) Applicant: METAIL LIMITED, London (GB)

(72) Inventors: Yu Chen, London (GB); Dongjoe Shin, London (GB); Joe Townsend, London (GB); Jim Downing, London (GB); Duncan Robertson, London (GB); Tom Adeyoola, London (GB)

(73) Assignee: METAIL LIMITED, London (GB)

( * ) Notice: Subject to any disclaimer, the term of this patent is extended or adjusted under 35 U.S.C. 154(b) by 0 days.

(21) Appl. No.: 15/752,709

(22) PCT Filed: Aug. 15, 2016

(86) PCT No.: PCT/GB2016/052527
§ 371 (c)(1),
(2) Date: Feb. 14, 2018

(87) PCT Pub. No.: WO2017/029488
PCT Pub. Date: Feb. 23, 2017

(65) Prior Publication Data
US 2019/0035149 A1 Jan. 31, 2019

(30) Foreign Application Priority Data

Aug. 14, 2015 (GB) .................................. 1514453.8
Aug. 14, 2015 (GB) .................................. 1514456.1
(Continued)

(51) Int. Cl.
*G06T 17/00* (2006.01)
*G06T 17/20* (2006.01)
(Continued)

(52) U.S. Cl.
CPC .......... *G06T 17/20* (2013.01); *G06K 9/00248* (2013.01); *G06K 9/00255* (2013.01);
(Continued)

(58) Field of Classification Search
CPC ......... G06T 17/00; G06T 17/20; G06T 15/04; H04N 5/23222
See application file for complete search history.

(56) References Cited

U.S. PATENT DOCUMENTS

2004/0252217 A1* 12/2004 Battles .................. H04N 5/232
348/333.01
2005/0031194 A1* 2/2005 Lee .................... G06K 9/00288
382/154
(Continued)

FOREIGN PATENT DOCUMENTS

| EP | 2 993 614 A1 | 3/2016 |
| GB | 2488237 B | 9/2015 |
| WO | 2012/126135 A1 | 9/2012 |

OTHER PUBLICATIONS

Gu et al., 3D Alignment of Face in a Single Image, Proceeding of the 2006 IEEE Computer Society Conference on Computer Vision and Pattern Recognition (Year: 2006).*
(Continued)

*Primary Examiner* — Charles Tseng
(74) *Attorney, Agent, or Firm* — Saul Ewing Arnstein & Lehr LLP

(57) ABSTRACT

There is provided a method of generating an image file of a personalized 3D head model of a user, the method comprising the steps of: (i) acquiring at least one 2D image of the user's face; (ii) performing automated face 2D landmark recognition based on the at least one 2D image of the user's face; (iii) providing a 3D face geometry reconstruction using a shape prior; (iv) providing texture map generation and interpolation with respect to the 3D face geometry recon-
(Continued)

struction to generate a personalized 3D head model of the user, and (v) generating an image file of the personalized 3D head model of the user. A related system and computer program product are also provided.

21 Claims, 46 Drawing Sheets

(30) Foreign Application Priority Data

| | | | |
|---|---|---|---|
| Jan. 20, 2016 | (GB) | ................................... | 1601086.0 |
| Jan. 20, 2016 | (GB) | ................................... | 1601088.6 |
| Apr. 22, 2016 | (GB) | ................................... | 1607004.7 |
| May 25, 2016 | (GB) | ................................... | 1609240.5 |

(51) Int. Cl.

| | |
|---|---|
| *G06T 15/04* | (2011.01) |
| *G06T 19/00* | (2011.01) |
| *G06T 7/50* | (2017.01) |
| *G06K 9/00* | (2006.01) |
| *G06T 13/40* | (2011.01) |
| *G06T 19/20* | (2011.01) |
| *H04N 5/232* | (2006.01) |

(52) U.S. Cl.
CPC ............... *G06T 7/50* (2017.01); *G06T 13/40* (2013.01); *G06T 15/04* (2013.01); *G06T 19/00* (2013.01); *G06T 19/20* (2013.01); *G06T 2200/08* (2013.01); *G06T 2200/24* (2013.01); *G06T 2207/20081* (2013.01); *G06T 2207/20084* (2013.01); *G06T 2207/30201* (2013.01); *G06T 2215/16* (2013.01); *G06T 2219/2012* (2013.01); *G06T 2219/2021* (2013.01); *H04N 5/23222* (2013.01)

(56) References Cited

U.S. PATENT DOCUMENTS

| | | | |
|---|---|---|---|
| 2005/0031195 A1 | 2/2005 | Liu | |
| 2007/0080963 A1* | 4/2007 | Christophe | ............. G06T 15/04 345/427 |
| 2009/0132371 A1* | 5/2009 | Strietzel | ................ G06Q 30/02 705/14.46 |
| 2011/0102553 A1 | 5/2011 | Corcoran et al. | |
| 2012/0183238 A1 | 7/2012 | Savvides et al. | |
| 2012/0320063 A1* | 12/2012 | Finch | .................... G06T 11/203 345/442 |
| 2013/0162862 A1* | 6/2013 | Zhao | .................... H04N 1/6027 348/223.1 |
| 2014/0147037 A1* | 5/2014 | Choi | .................. G06K 9/00362 382/165 |
| 2015/0139485 A1* | 5/2015 | Bourdev | .............. G06K 9/6292 382/103 |
| 2015/0206310 A1* | 7/2015 | Okada | ...................... G06T 3/40 348/222.1 |
| 2016/0148080 A1* | 5/2016 | Yoo | ..................... G06K 9/4628 382/157 |

OTHER PUBLICATIONS

International Search Report, dated Feb. 13, 2017, and Written Opinion issued in International Application No. PCT/GB2016/052527.
Combined Search and Examination Report, dated Feb. 22, 2017, issued in corresponding GB Application No. GB1613959.4.
B. Allen, B. Curless, and Z. Popovic. The space of human body shapes: reconstruction and parametrization from range scans. ACM Transactions on Graphics, 22(3):587-594, 2003.
B. Amberg, S. Romdhani, and T. Vetter. Optimal step nonrigid ICP algorithms for surface registration. IEEE Conference on Computer Vision and Pattern Recognition, 2007.
T. Baltrusaitis, P. Robinson, and L.-P. Morency. Constrained local neural fields for robust facial landmark detection in the wild. In Proceedings of the IEEE International Conference on Computer Vision Workshops, pp. 354-361, 2013.
H. Barrow, J. Tenenbaum, R. Bolles, and H. Wolf. Parametric correspondence and chamfer matching: Two new techniques for image matching. Proc. 5th Int. Joint Conf. Artificial Intelligence, pp. 659-663, 1977.
R. Basri and D. Jacob. Lambertian reflectance and linear subspaces. IEEE Trans. Pattern Analysis and Machine Intelligence (PAMI), 2003.
P. Besl and N. Mckey. A method for registration of 3-D shapes. IEEE Trans. Pattern Analysis and Machine Intelligence (PAMI), 14(2):239-256, 1992.
V. Blanz and T. Vetter. A morphable model for the synthesis of 3D faces. Proc. of SIGGRAPH, pp. 187-194, 1999.
F. Bookstein. Principal warps: Thin-plate splines and the decomposition of deformations. IEEE Trans. Pattern Analysis and Machine Intelligence (PAMI), 11(6):567-585, 1989.
Y. Chen, D. Robertson, and R. Cipolla. A practical system for modelling body shapes from single view measurments. British Machine Vision Conference, 2011.
D. Cristinacce and T. Cootes. Automatic feature localisation with constrained local models. Pattern Recognition, 41(10):3054-3067, 2008.
D. Fidaleo and G. Medioni. Model-assisted 3d face reconstruction from video. In Analysis and modeling of faces and gestures, pages 124-138, Springer, 2007.
P. Gill, W. Murray, and M. Wright. The Levenberg-Marquardt Method. London: Academic Press, 1981.
K. Haming and G. Peters. The stucture-from-motion reconstruction pipeline ̄c a survery with focus on short image sequences. Kybernetika, 46(5):926-937, 2010.
C. Harris and M. Stephens. A combined corner and edge detector. In In Proc. of Fourth Alvey Vision Conference, pp. 147-151, 1988.
Hartley and A. Zisserman. Multiple view geometry in computer vision. Cambridge University Press, Cambridge, 2003. Choix de documents en appendice.
D. Huttenlocher, R. Lilien, and C. Olson. View-based recognition using an eigenspace approximation to the hausdorff measure. IEEE Trans. Pattern Analysis and Machine Intelligence (PAMI), 21(9):951-955, 1999.
E. Kazemi and J. Sullivan. One millisecond face alignment with an ensemble of regression trees. IEEE Conference on Computer Vision and Pattern Recognition, 2014.
A. Krizhevsky, I. Sutskever, and G. E. Hinton. Imagenet classification with deep convolutional neural networks. In Advances in Neural Information Processing Systems, p. 2012.
P. Lamere, P. Kwok, W. Walker, E. Gouv ̄° a, R. Singh, B. Raj, and P. Wolf. Design of the cmu sphinx-4 decoder. In 8th European Conf. on Speech Communication and Technology (Eurospeech), 2003.
Y. LeCun, L. Bottou, Y. Bengio, and P. Haffner. Gradient-based learning applied to document recognition. Proceedings of the IEEE, 86(11):2278-2324, Nov. 1998.
M. Lourakis and A. Argyros. The design and implementation of a generic sparse adjustment software package based on the levenberg-marquardt algorithm. 2004.
D. Lowe. Distinctive image features from scale-invariant keypoints. International Journal of Computer Vision, 2(60):91-110, 2004.
D. Martin, C. Fowlkes, and J. Malik. Learning to detect natural image boundaries using local brightness, color, and texture cues. IEEE Trans. Pattern Analysis and Machine Intelligence (PAMI), 26(5):530-549, 2004.
P. Pérez, M. Gangnet, and A. Blake. Poisson image editing. In ACM Transactions on Graphics (TOG), vol. 22, pp. 313-318. ACM, 2003.
K. Robinette, H. Daanen, and E. Paquet. The CAESAR project: a 3-D surface anthopometry survey. International Conference on 3-D Digital Imaging and Modeling, pp. 380-386, 1999.

(56) References Cited

OTHER PUBLICATIONS

C. Schmid, R. Mohr, and C. Bauckhage. Evaluation of interest point detectors. International Journal of computer vision, 37(2):151-172, 2000.

P.J. Schneider and D. Eberly. Geometric Tools for Computer Graphics. Elsevier Science Inc., New York, NY, USA, 2002.

K. Simonyan and A. Zisserman. Very deep convolutional networks for large-scale image recognition. CoRR, abs/1409.1556, 2014.

R. T. Tan and K. Ikeuchi. Seperating reflection components of textured surfaces using a single image. Pattern Analysis and Machine Intelligence, IEEE Transactions on, 27(2):178-195, 2005.

P. Viola and M. Jones. Robust real-times object detection. In International Journal of Computer Vision, 2001.

Y. Wang, S. Lucey, and J. F. Cohn. Enforcing convexity for improved alignment with constrained local models. In Computer Vision and Pattern Recognition, 2008. CVPR 2008. IEEE Conference on, pp. 1-8. IEEE, 2008.

K. Zhou, X. Wang, Y. Tong, M. Desbrun, B. Guo, and H.-Y. Shum. Texturemontage. In ACM SIGGRAPH 2005 Papers SIGGRAPH '05, pp. 1148-1155, New York, NY, USA, 2005. ACM.

* cited by examiner

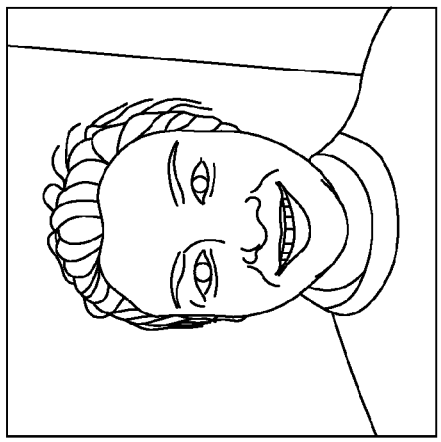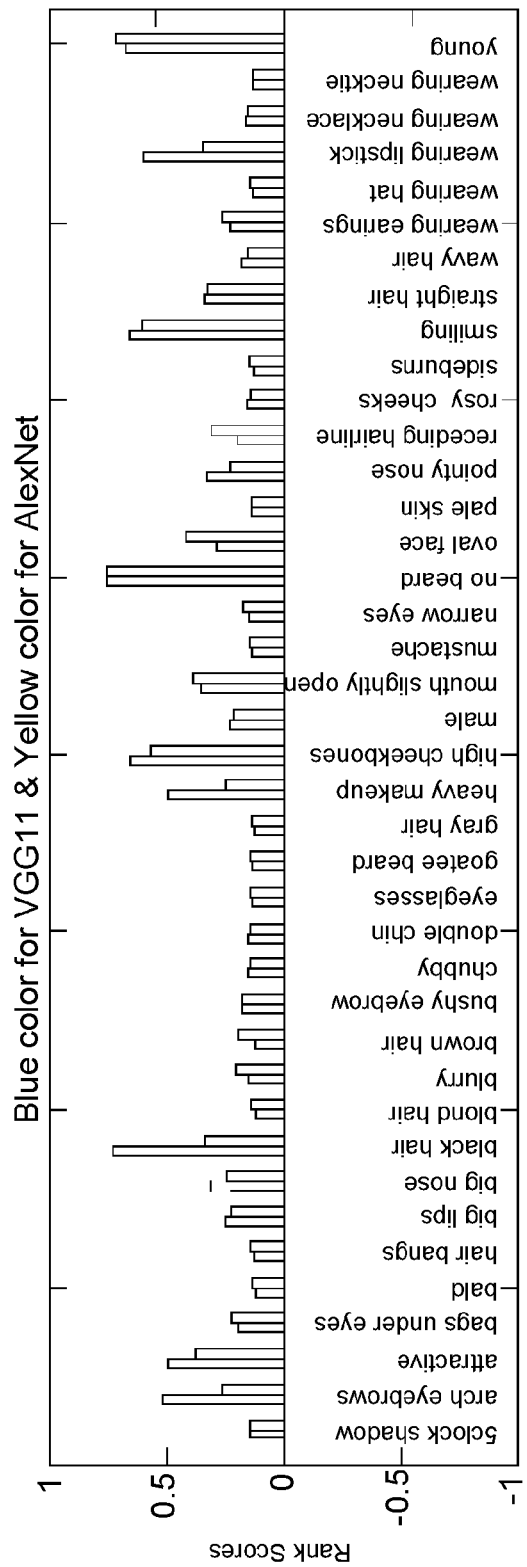
FIG. 8

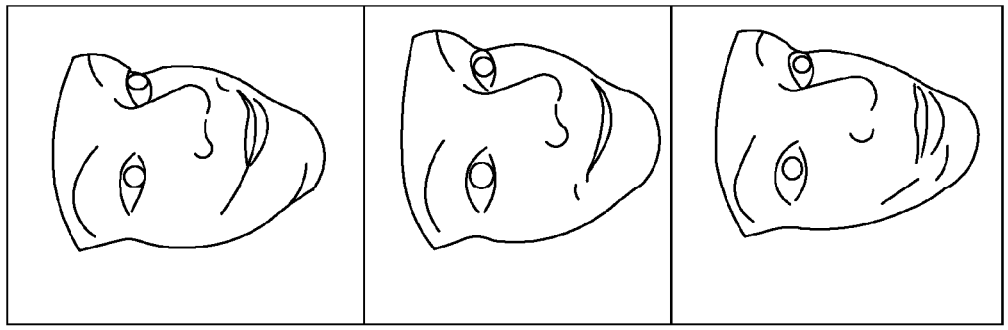
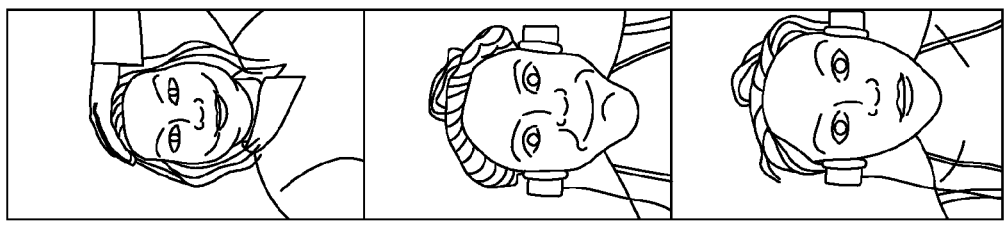
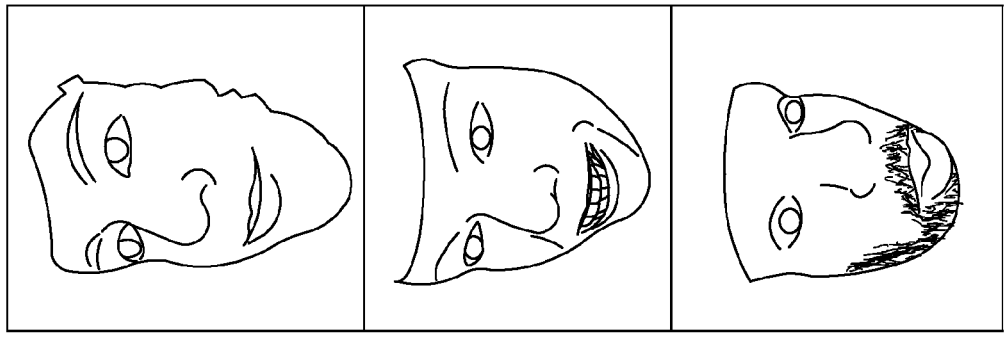
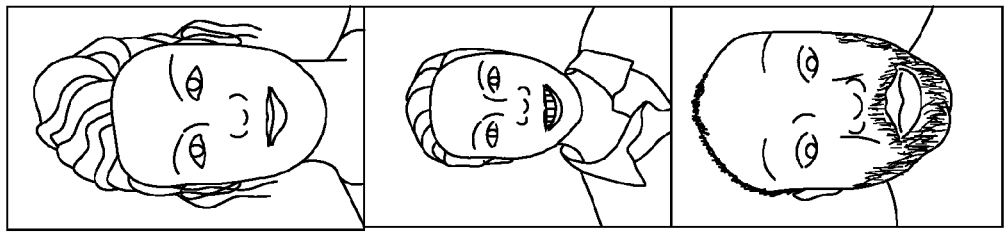
FIG. 10

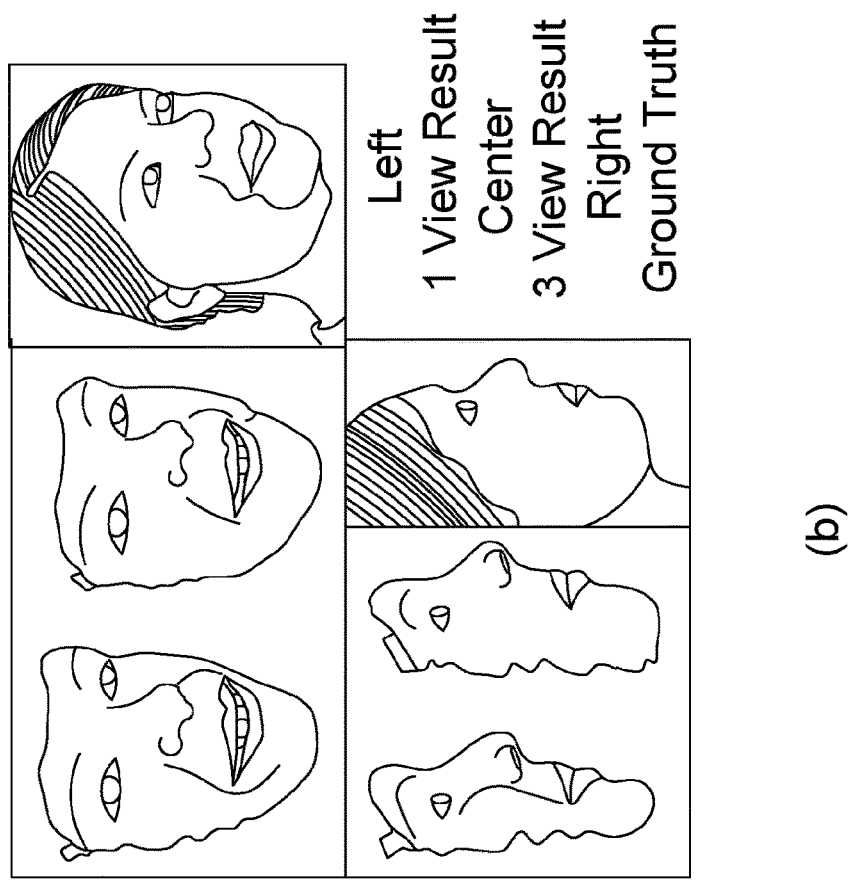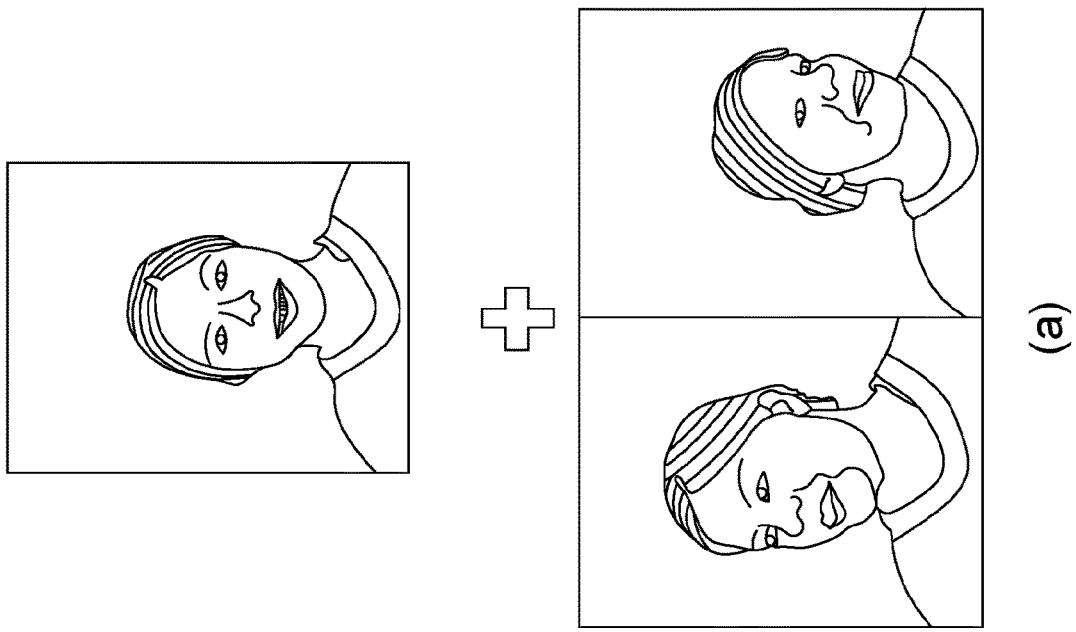
FIG. 11

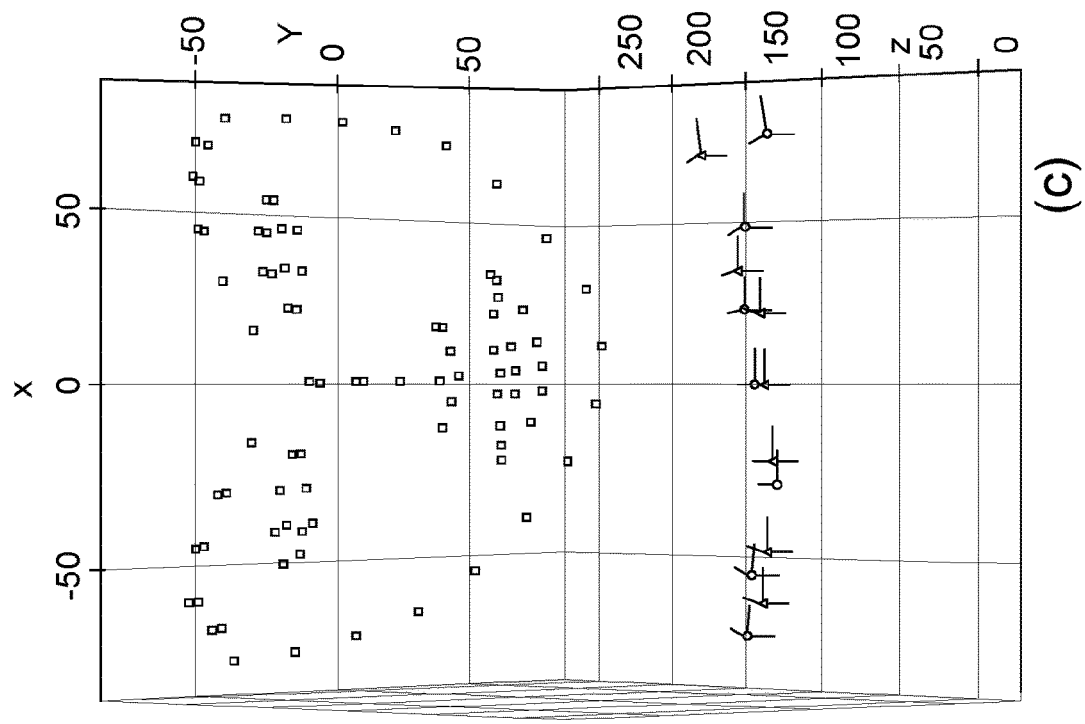
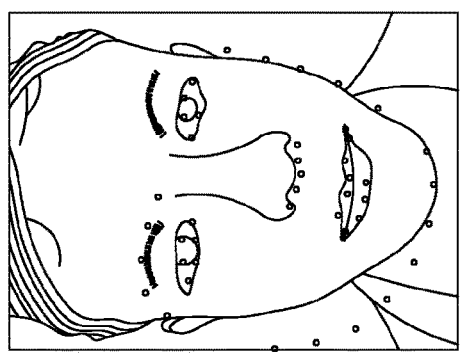
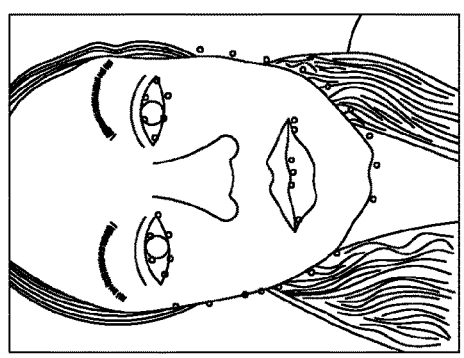
FIG. 13

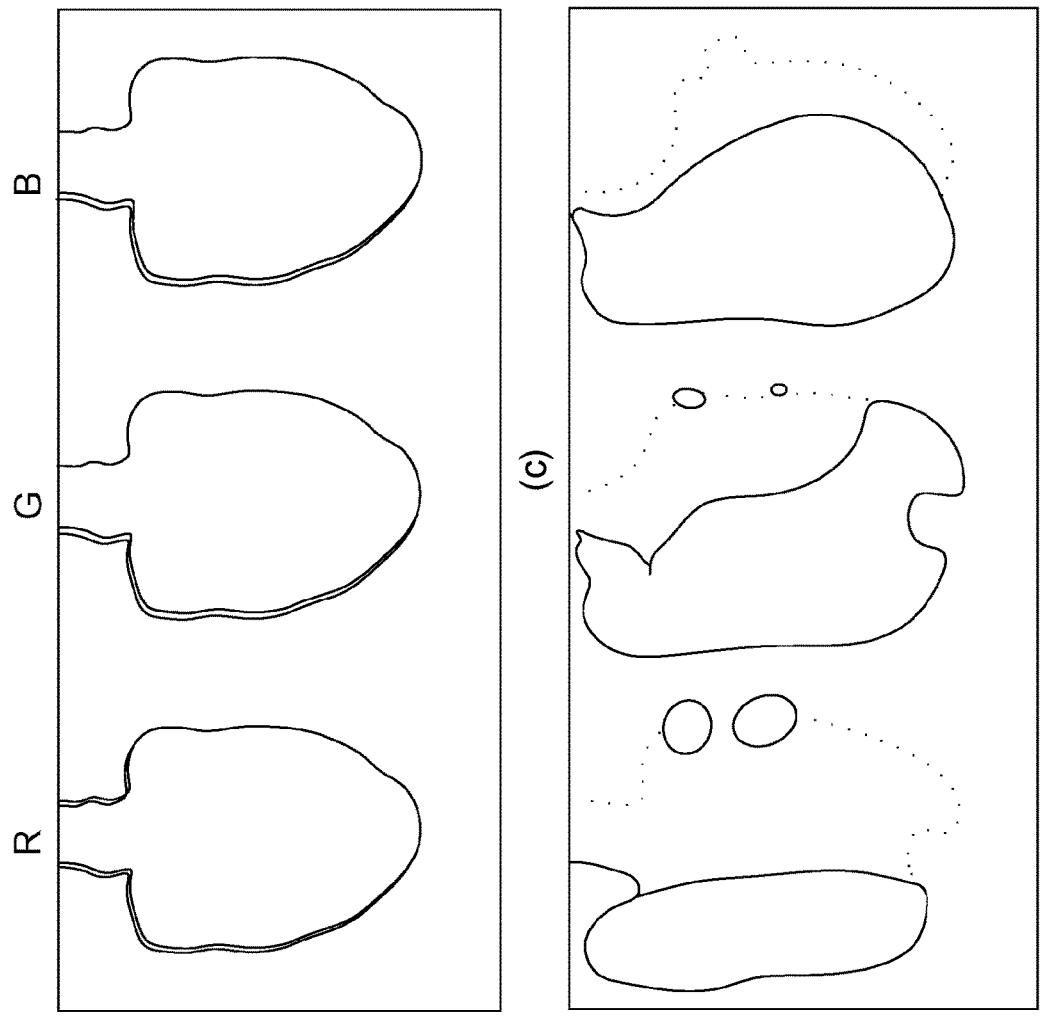
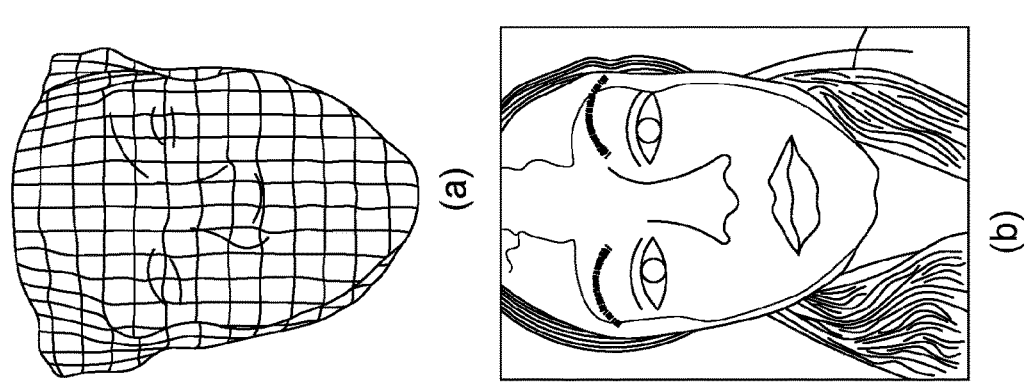
FIG. 15

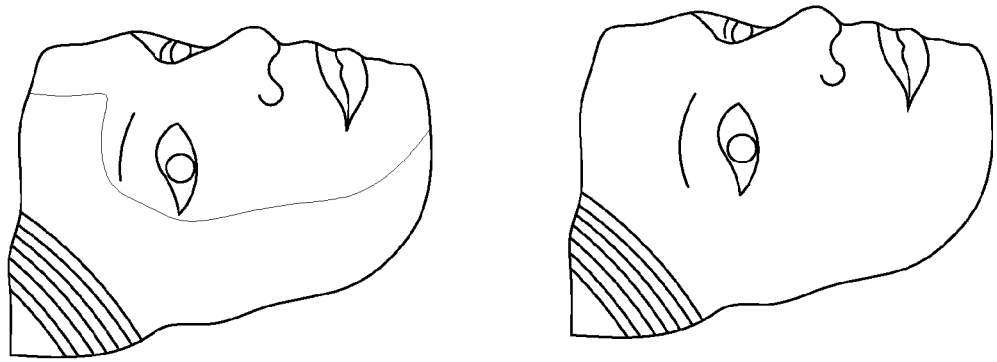
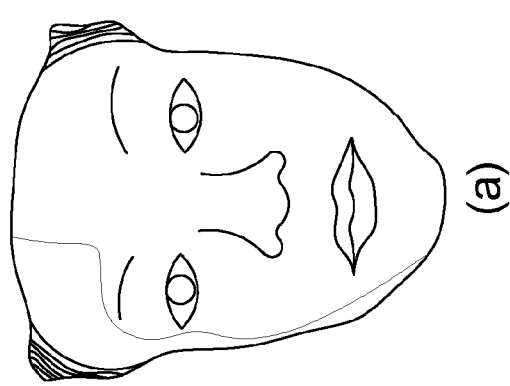
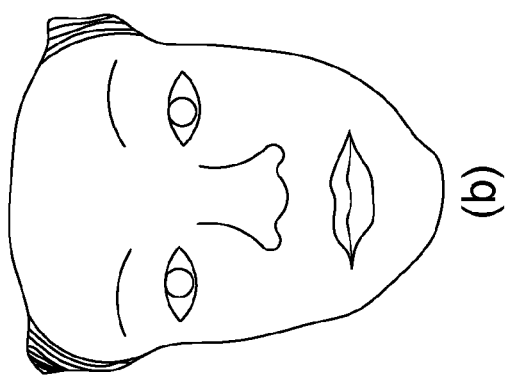
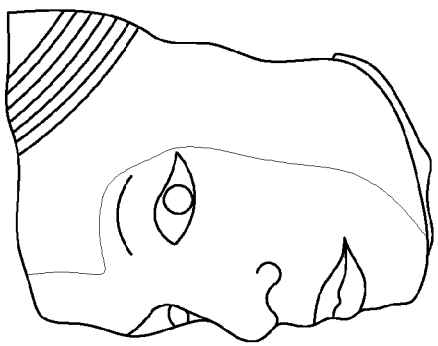
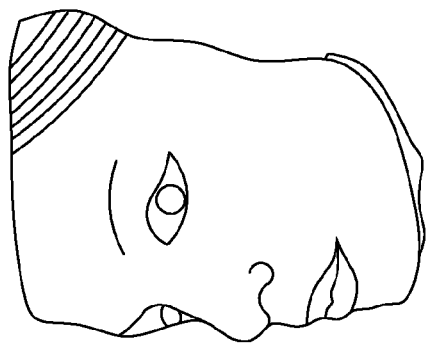
(a) (b)
FIG. 16

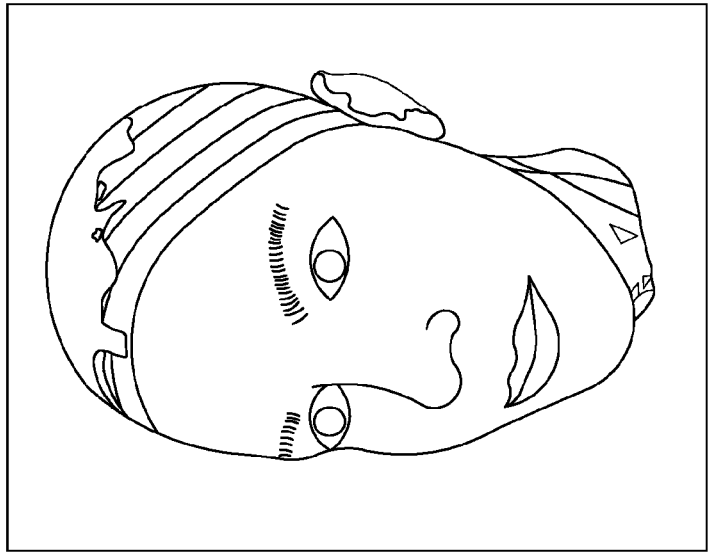
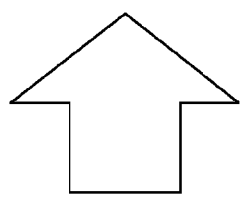
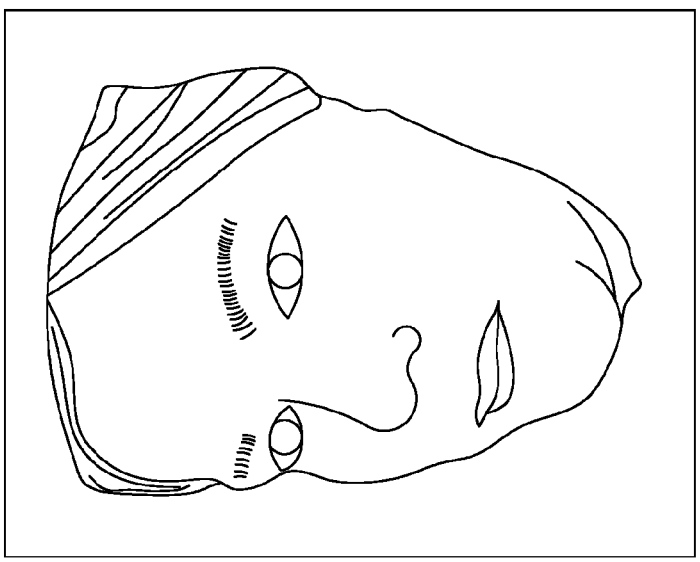
FIG. 21

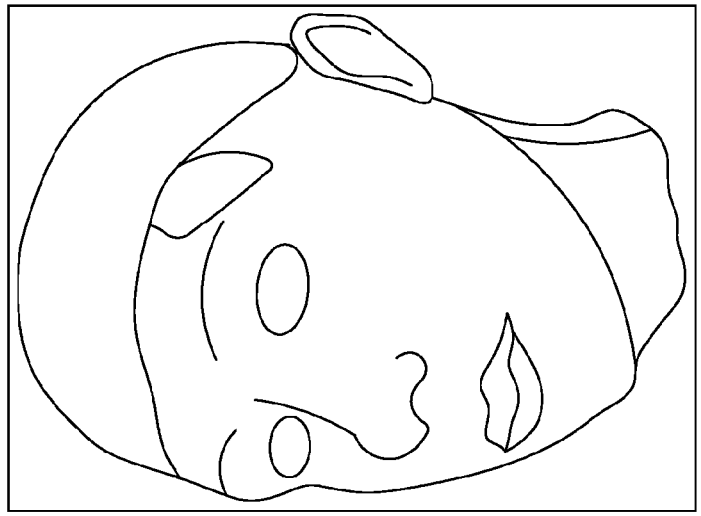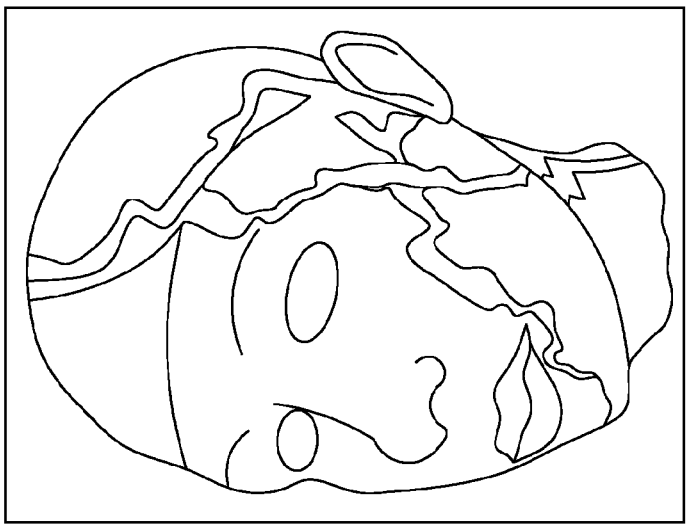
FIG. 22

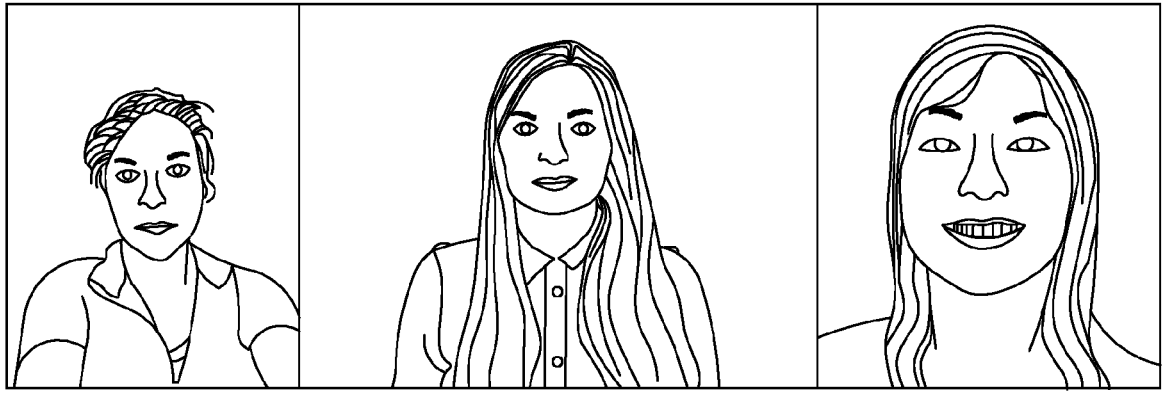
BACK
Taking your photo
Please follow our simple tips to get great results.
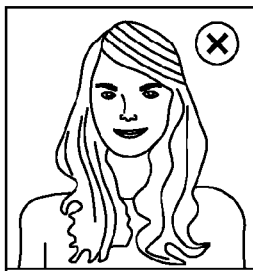
Keep your hair off your face and ears
why?
PERFECT!
Please take off your glasses
why?
Please keep your mouth closed
why?
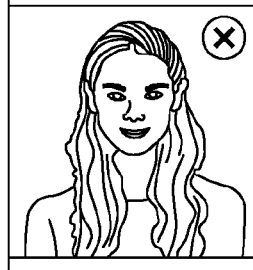
Make sure there are no shadows on your face
why?
More tips to take your photo
UPLOAD ▷
FIG. 24

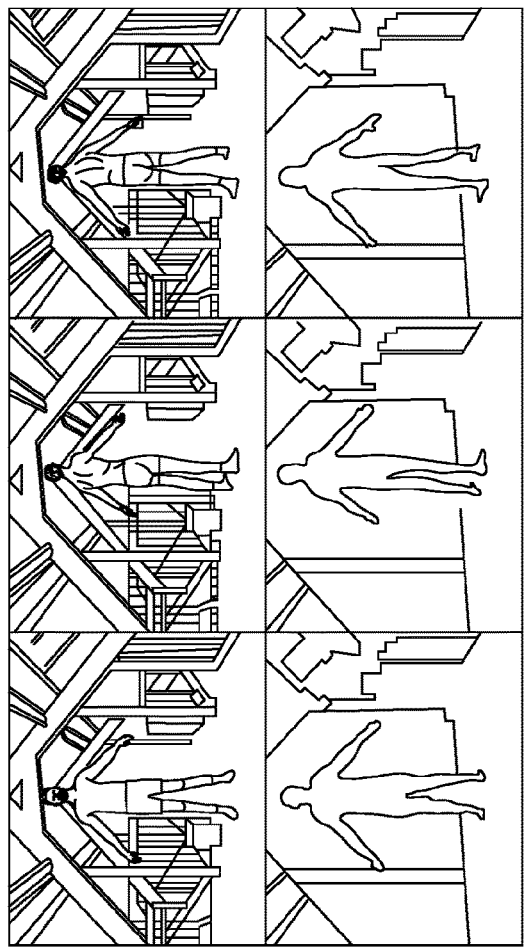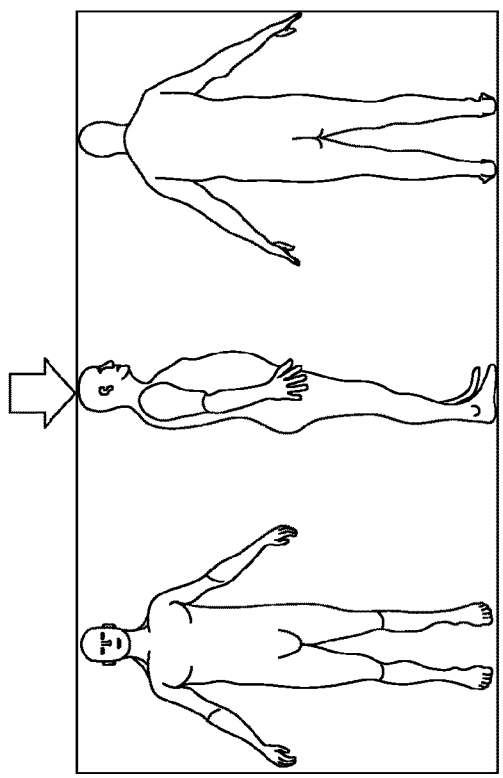
FIG. 28

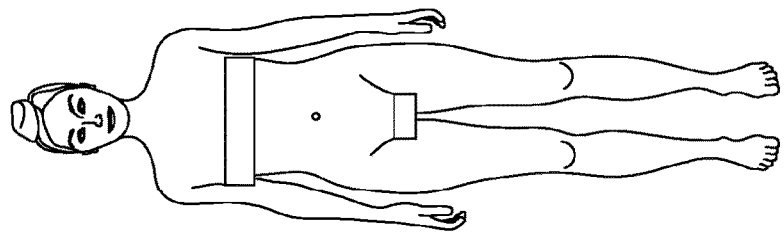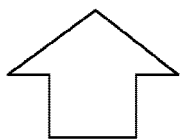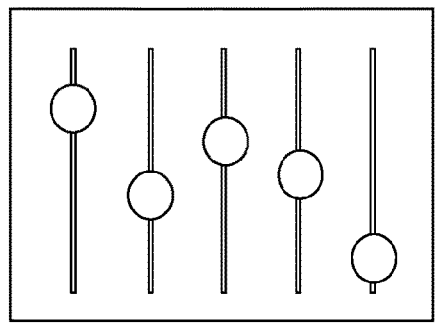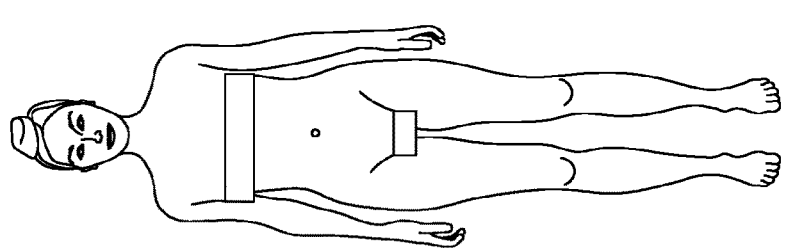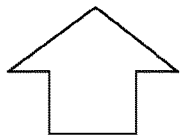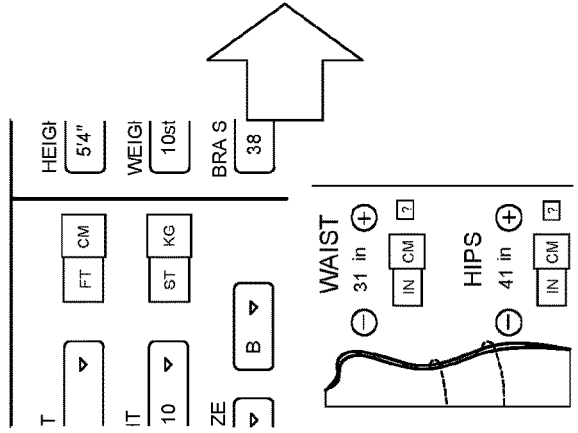
FIG. 29

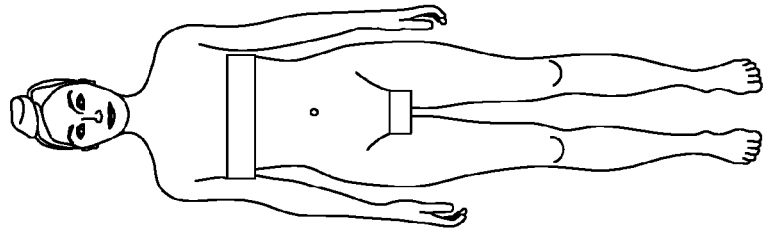
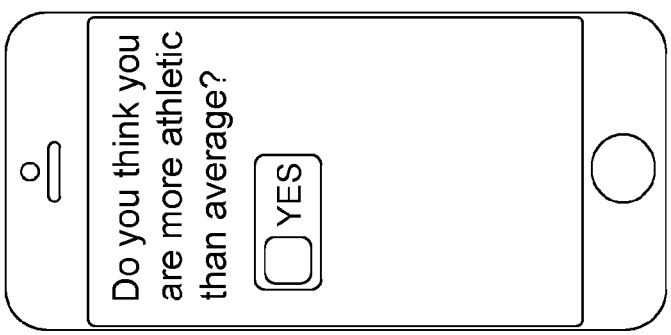
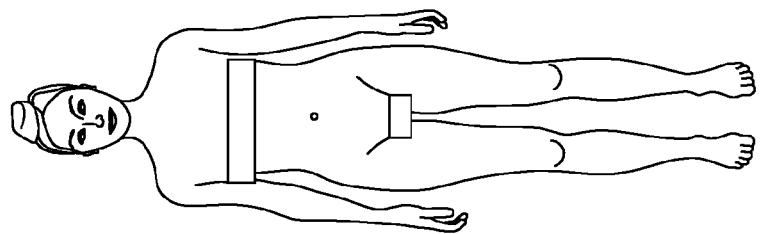
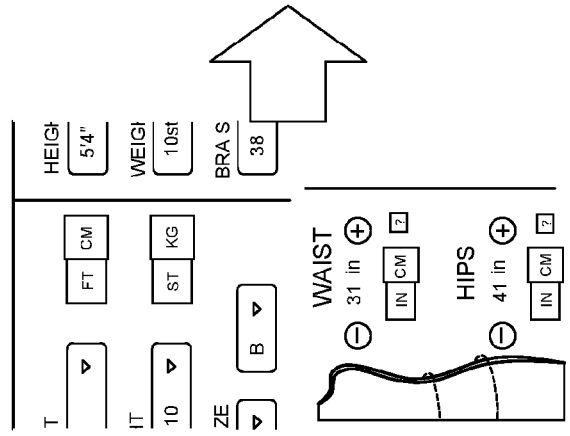
FIG. 31

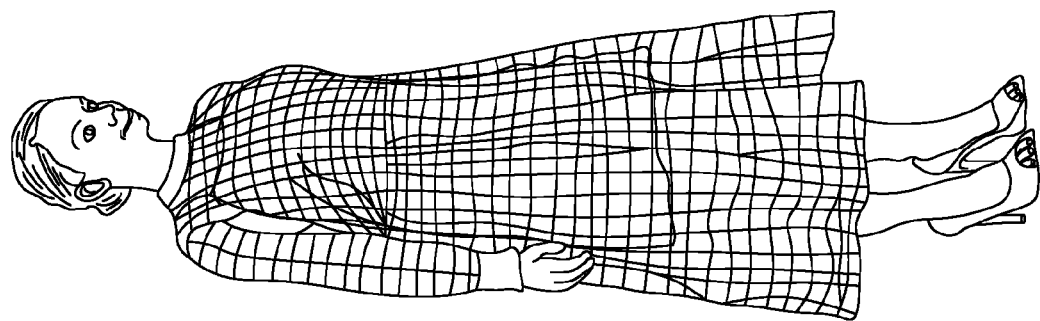
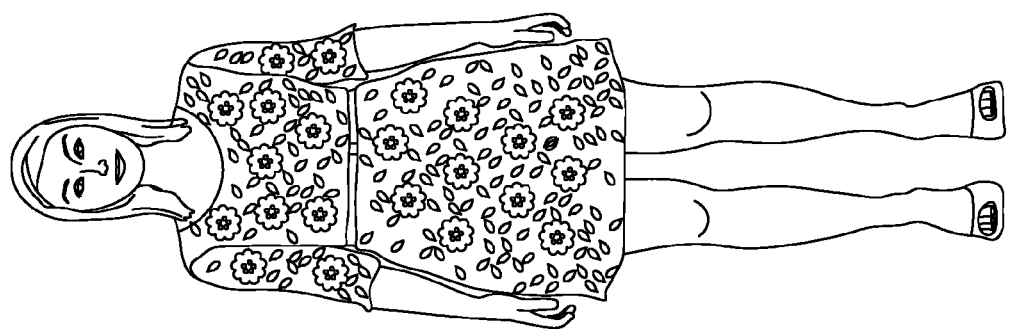
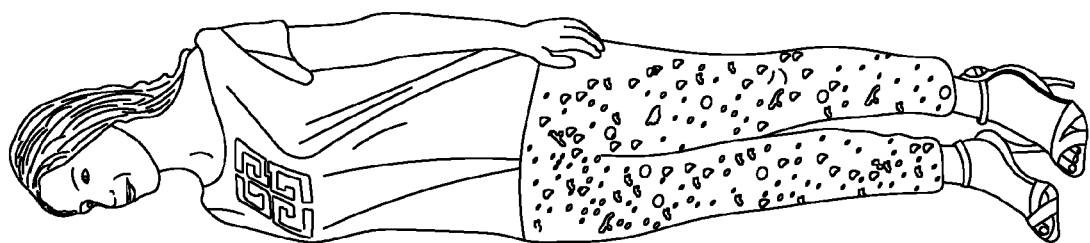
FIG. 32

Skin-tone matched Head Texture
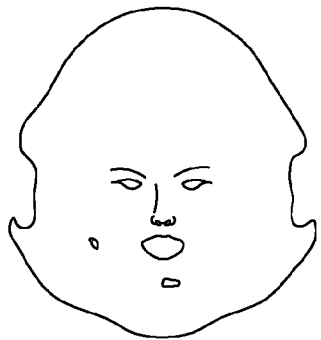
Render →
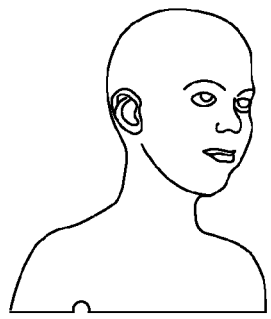
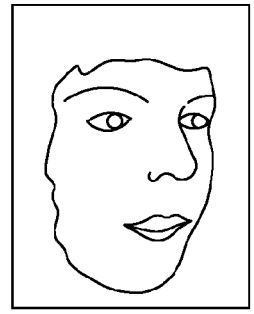
Texturized Face Model
Render Alpha Matting →
Soft Blending →
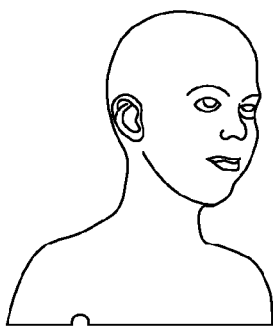
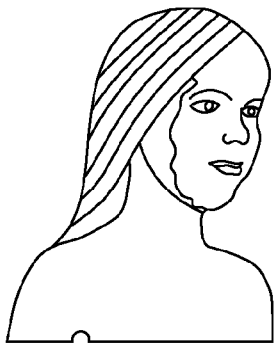 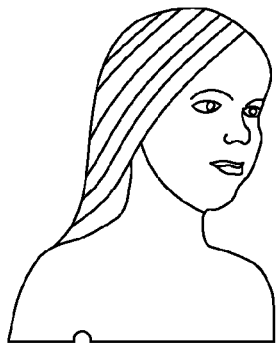
Hard blending vs. Soft blending
FIG. 35

Hair Geometry Model
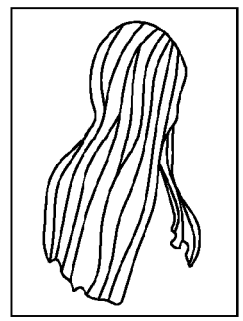
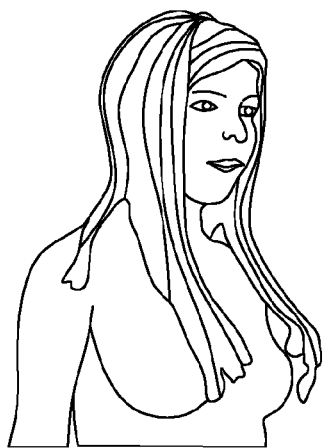
Physics Simulation
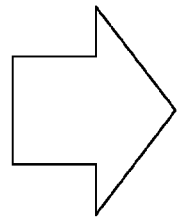
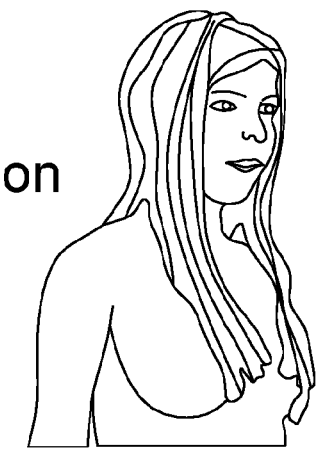
Initialization by
Mesh Skinning
Result
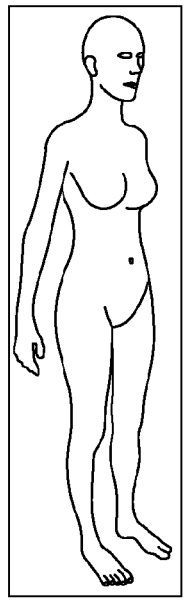
3D Body Shape
As Collision Body
FIG. 37

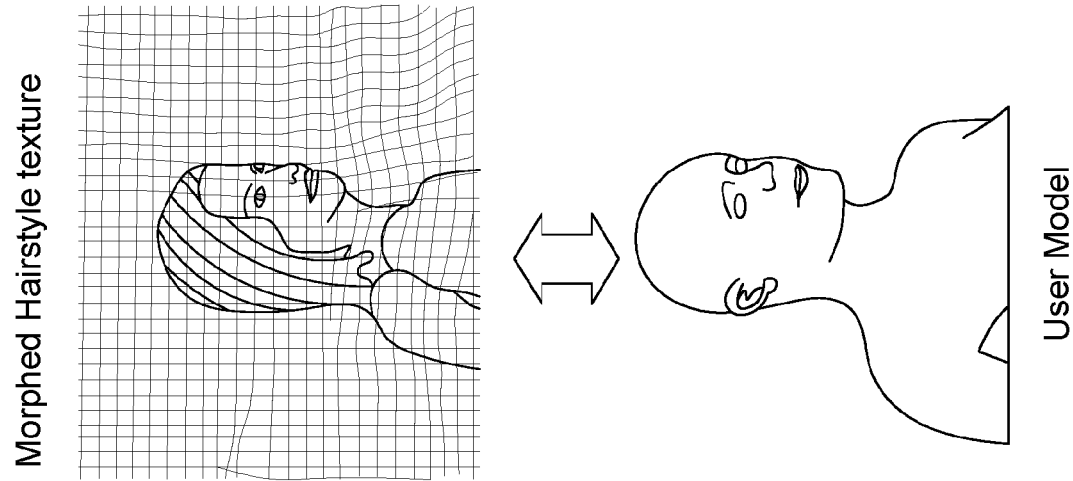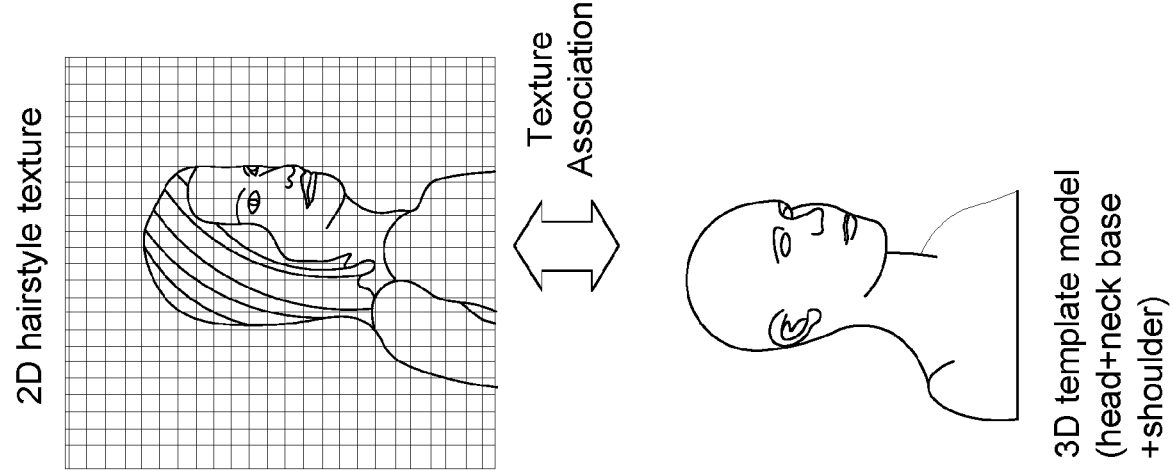
FIG. 39

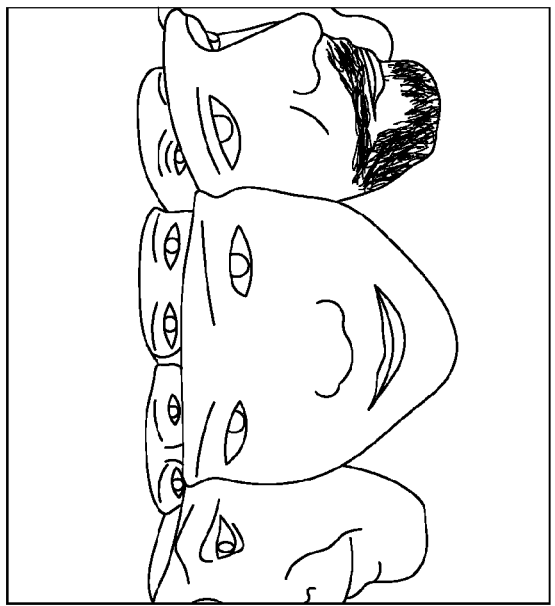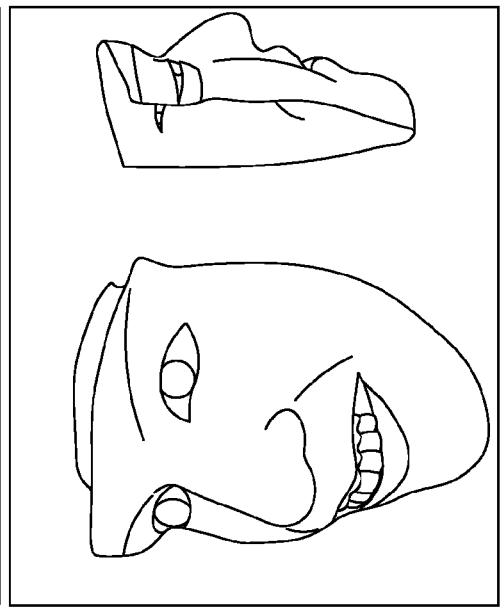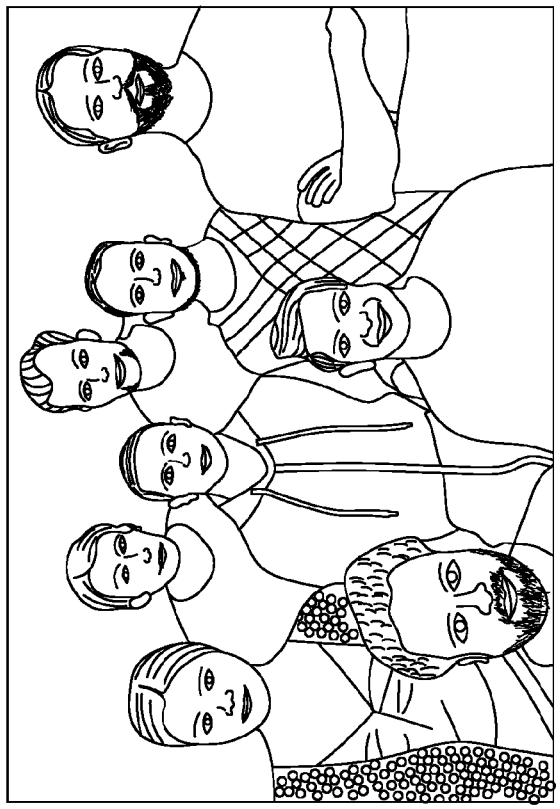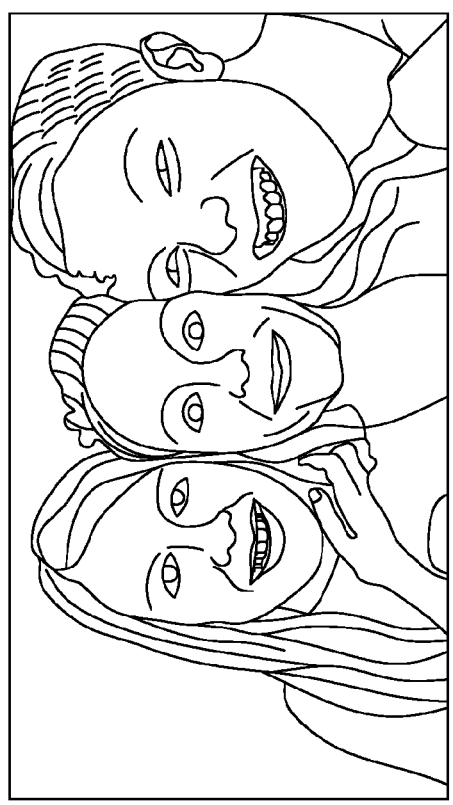
FIG. 46

METHODS OF GENERATING PERSONALIZED 3D HEAD MODELS OR 3D BODY MODELS

CROSS REFERENCE TO RELATED APPLICATIONS

This application claims the priority of PCT/GB2016/052527, filed on Aug. 15, 2016, which claims priority to GB Applications No. GB1514453.8, filed on Aug. 14, 2015; GB1514456.1, filed on Aug. 14, 2015; GB1601086.0, filed on Jan. 20, 2016; GB1601088.6, filed on Jan. 20, 2016; GB1607004.7, filed on Apr. 22, 2016; and GB1609240.5, filed on May 25, 2016, the entire contents of each of which being fully incorporated herein by reference.

BACKGROUND OF THE INVENTION

1. Field of the Invention

The field of the invention relates to methods of generating personalized 3D head models or 3D body models of a user, and to related systems and computer program products.

2. Technical Background

Online body shape and garment outfitting visualisation technology, often known through virtual fitting rooms (VFR), emerged in the last decade and has now been adopted by many online retailers. The VFR system, represented by e.g. Metail [1], allows e-shoppers to create a 3D avatar representing their own shape, and interactively to dress the avatar to provide a photo-realistic visualisation of how clothes will look and fit on a representative body model. The more closely the avatar resembles the user, the more compelling the user may find the technology and the more they may trust the technology.

It is typically impractical to set up a photography studio so that users may be photographed to high quality, so that a high quality 3D head model or a high quality 3D body model may be produced using high quality input photos. It is practical to receive photos taken by users of themselves using a smartphone, but so far there has been no way of using such photos to produce a high quality 3D head model or a high quality 3D body model.

This patent specification describes not only various ideas and functions, but also their creative expression. A portion of the disclosure of this patent document therefore contains material to which a claim for copyright is made and notice is hereby given: © Metail Limited (e.g. pursuant to 17 U.S.C. 401). A claim to copyright protection is made to all protectable expression associated with the examples of the invention illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

3. Discussion of Related Art

WO2012110828A1 discloses methods for generating and sharing a virtual body model of a person, created with a small number of measurements and a single photograph, combined with one or more images of garments. The virtual body model represents a realistic representation of the users body and is used for visualizing photo-realistic fit visualizations of garments, hairstyles, make-up, and/or other accessories. The virtual garments are created from layers based on photographs of real garment from multiple angles. Furthermore the virtual body model is used in multiple embodiments of manual and automatic garment, make-up, and, hairstyle recommendations, such as, from channels, friends, and fashion entities. The virtual body model is shareable for, as example, visualization and comments on looks. Furthermore it is also used for enabling users to buy garments that fit other users, suitable for gifts or similar. The implementation can also be used in peer-to-peer online sales where garments can be bought with the knowledge that the seller has a similar body shape and size as the user.

SUMMARY OF THE INVENTION

According to a first aspect of the invention, there is provided a method of generating an image file of a personalized 3D head model of a user, the method comprising the steps of:
 (i) acquiring at least one 2D image of the user's face;
 (ii) performing automated face 2D landmark recognition based on the at least one 2D image of the user's face;
 (iii) providing a 3D face geometry reconstruction using a shape prior;
 (iv) providing texture map generation and interpolation with respect to the 3D face geometry reconstruction to generate a personalized 3D head model of the user, and
 (v) generating an image file of the personalized 3D head model of the user.

The image file may be a well-known format such as a jpeg, png, html or tiff. The image file may be transmitted to a user, via a communications network. The image file may be rendered on a user device, such as a mobile device such as a smartphone or a tablet computer, or on another device such as a laptop or a desktop computer. A processor may be configured to perform steps (i) to (v) of the method, or steps (ii) to (v) of the method.

An advantage is that a high quality personalized 3D head model of the user is provided. Therefore the personalized 3D head model of the user, which may be part of a 3D body model of the user, may be used in online commerce, such as in online garment modelling.

The method may be one wherein the at least one 2D image of the user's face is acquired via a network communication.

The method may be one wherein the at least one 2D image of the user's face is acquired via the network communication, from a smartphone including a camera.

The method may be one wherein the at least one 2D image of the user's face is a front image of the user's face.

The method may be one wherein the at least one 2D image of the user's face is a smartphone camera image of the user's face.

The method may be one wherein the automated face 2D landmark recognition includes using a 2D face landmark detector.

The method may be one wherein the 2D face landmark detector is implemented based on a regression forest algorithm.

The method may be one wherein the automated face 2D landmark recognition includes using a 3D Constraint Local Model (CLM) based facial landmark detector.

The method may be one wherein providing a 3D face geometry reconstruction using a shape prior includes generating an approximate 3D face geometry using 3D head shape priors, followed by refining the 3D face geometry based on the distribution of the recognized 2D face landmarks.

The method may be one wherein generating an approximate 3D face geometry using 3D head shape priors includes finding an approximate head geometry as an initialisation using a generative shape prior that models shape variation of an object category in a low dimensional subspace, using a dimension reduction method.

The method may be one wherein in which a full head geometry of the user is reconstructed from this low dimensional shape prior using a small number of parameters (e.g. 3 to 10 parameters).

The method may be one in which a principal component analysis (PCA) is used to capture dominant modes of human head shape variation.

The method may be one in which using a shape prior selection process is used to find the most suitable shape prior from a library, using selection criteria such as the user's ethnicity, gender, age, and other attributes.

The method may be one in which a machine-learning-based attribute classifier, which can be implemented by e.g. a deep convolutional neural network (CNN), is used to analyze the at least one 2D image of the user's face, and predict attributes (e.g. ethnicity, gender, and age) from the appearance information (i.e. skin colour, hair colour and styles, etc.) in the at least one 2D image of the user's face.

The method may be one in which a selection is performed of an appropriate 3D shape prior from a library based on matching a user's attributes with those defined for each shape prior.

The method may be one in which head geometry is improved for better realism by deforming an initial head model by rectifying the face landmark positions of the 3D model in the directions within an image plane of the at least one 2D image of the user's face, so that a projection of facial landmarks on the 3D face model is a similarity transform of the corresponding 2D facial landmarks in the at least one 2D image of the user's face.

The method may be one in which a 3D thin-plate spline (TPS) deformation model is used to rectify a 3D geometry of a regressed head model to achieve better geometric similarity, so as to generate a smooth interpolation of 3D geometry deformation throughout the whole head mesh from control point pairs.

The method may be one in which the image file is a 3D image file.

The method may be one in which the image file is a 2D image file.

The method may be one in which the image file is an animation file.

The method may be one in which the image file is a personalised sticker set.

The method may be one in which UV texture coordinates are determined for the texture vertices of each mesh triangle of a 3D mesh geometry of the user's face.

The method may be one in which the UV coordinate of a landmark vertex is computed based on the result of the corresponding 2D face landmark position detected by the 2D face landmark detector on the at least one 2D image of the user's face.

The method may be one in which to complete the texture map of the 3D face/head model, a 2D thin plate spline (TPS) model is used for interpolation and to populate the UV texture coordinates over other mesh vertices.

The method may be one in which to construct a TPS model for texture coordinate interpolation, the frontal-view landmark projection of all the face landmarks and its texture coordinates, assigned previously as source-sink control point pairs, are used.

The method may be one in which the at least one 2D image of the user's face comprises at least a front image, a left side image and a right side image, of the user's face.

The method may be one in which following generating an approximate 3D face model from a frontal view image and using it as an initialisation model, a step is performed of performing an iterative optimisation algorithm for revising the initial 3D face geometry, which is implemented to minimise the landmark re-projection errors against independent 2D face landmark detection results obtained on all face images.

The method may be one including the step of the 3D face model being morphed with a new set of landmark positions, using a 3D thin-plate spline model.

The method may be one in which the steps of the previous two sentences are repeated until convergence of the 3D face model is achieved.

The method may be one in which a colour tone difference between images is repaired by adding a colour offset at each pixel, and in which the colour offset values at the boundary are propagated to all image pixels using Laplacian diffusion.

The method may be one in which highlight removal is performed by a) highlight detection and b) recovering true colour.

The method may be one in which for highlight detection, a highlight probability map based on the colour distribution of corresponding facets across all input images is created, and the colour of the highlighted region is then recovered using the gradient of one of the input images.

The method may be one in which camera projection matrices are derived to establish a link between a 3D face model and the input images.

The method may be one in which in the case of face images a model based feature detector, i.e. a 3D Constraint Local Model (CLM) based facial landmark detector, is used, and an associated camera model is used to derive a relative camera position.

The method may be one in which a projective camera model is used to account for potential perspective distortions, and so the initial camera parameters from a CLM tracker are refined using bundle adjustment.

The method may be one in which the bundle adjustment refines 3D vertices and camera poses using a projective camera model.

The method may be one in which a facial mask is approximated as a sum of two masks, which are an ellipse fitting of the 2D facial landmarks from a CLM tracker, and the projection of initial front vertices.

The method may be one in which to address a seam from a refinement, the colour of the front view is updated.

The method may be one in which local highlight detection and removal is performed.

The method may be one in which for highlight detection and removal, a highlight probability map is derived from a colour difference of a single facet, in which to retrieve a colour of the facet the vertices of the facet are back projected onto the input images and a 2D affine transform between views is derived.

The method may be one in which, to create the probability map, a logistic function working as a switch is used, which gives a high probability when the difference between the median of the mean intensities and the maximum of the mean intensities is bigger than a certain thresholdhead size is estimated from body shape parameters.

The method may be one in which recovering colour for a highlighted area is performed.

The method may be one in which hairstyle customisation on the user's 3D head model is supported.

The method may be one in which head size is estimated from body shape parameters.

The method may be one in which an automatic image analysis is performed to help users quickly acquire input data of good quality so that they have a better chance of creating a photo-realistic personalised avatar.

The method may be one in which prior to starting the video or image capture, the user is presented with a live view of the camera feed, and a feedback mechanism analyses the live view and, if necessary, provides the user with recommendations on how to improve the conditions in order to achieve a high quality end result.

According to a second aspect of the invention, there is provided a system configured to perform a method of any aspect of the first aspect of the invention.

According to a third aspect of the invention, there is provided a computer program product executable on a processor to generate an image file of a personalized 3D head model of a user, the computer program product executable on the processor to:

(i) receive at least one 2D image of the user's face;
(ii) perform an automated face 2D landmark recognition based on the at least one 2D image of the user's face;
(iii) provide a 3D face geometry reconstruction using a shape prior;
(iv) provide texture map generation and interpolation with respect to the 3D face geometry reconstruction to generate a personalized 3D head model of the user, and
(v) generate an image file of the personalized 3D head model of the user.

The computer program product may be executable on the processor to perform a method of any aspect of the first aspect of the invention.

According to a fourth aspect of the invention, there is provided a method of generating an image file of a personalized 3D head model of a user, the method comprising the steps of:

(i) acquiring at least one 3D scan of the user's face;
(ii) using a template mesh fitting process to fit the at least one 3D scan of the user's face;
(iii) generating a personalized 3D head model of the user based on the template mesh fitting process, and
(iv) generating an image file of the personalized 3D head model of the user.

The method may be one in which the 3D scan of the user's face is (i) from an image-based 3d reconstruction process using the techniques of structure from motion (SfM) or simultaneous localisation and mapping (SLAM), (ii) from a depth scan captured by a depth camera, or (iii) from a full 3D scan, captured using a 3D scanner.

The method may be one in which the template mesh fitting process is performed in a first stage by introducing a 3D morphable head model (3DMHM) as a shape prior, in which a geometry of the user's 3D scan is fitted by the morphable head model by a bundle adjustment optimisation process that finds the optimal shape morph parameters of the 3DMHM, and 3D head pose parameters, and in a second stage, using the result of the first stage as the starting point, apply a non-rigid iterative closest point (N-ICP) algorithm, which deforms the resulting mesh to achieve a better surface matching with the at least one 3D scan of the user's face.

The method may be one in which the image file is a 3D image file.

The method may be one in which the image file is a 2D image file.

The method may be one in which the image file is an animation file.

The method may be one in which the image file is a personalised sticker set.

The method may be one in which the head size is estimated from body shape parameters.

The method may be one in which a texture map is generated for a registered head mesh.

According to a fifth aspect of the invention, there is provided a system configured to a perform a method of any aspect of the fourth aspect of the invention.

According to a sixth aspect of the invention, there is provided a computer program product executable on a processor to generate an image file of a personalized 3D head model of a user, the computer program product executable on the processor to:

(i) receive at least one 3D scan of the user's face;
(ii) use a template mesh fitting process to fit the at least one 3D scan of the user's face;
(iii) generate a personalized 3D head model of the user based on the template mesh fitting process, and
(iv) generate an image file of the personalized 3D head model of the user.

The computer program product may be executable on the processor to perform a method of any aspect of the fourth aspect of the invention.

According to a seventh aspect of the invention, there is provided a method of personalised body shape modelling, which helps a user to further constrain their body shape, improve an accuracy of 3D body modelling, and personalise their body avatar, comprising the steps of:

(i) receiving a high-definition 3D body profile usable for outfitting and visualisation, from a full-body scan of the user;
(ii) applying a template mesh fitting process to regularize and normalize mesh topology and resolution deerived from the full-body scan of the user;
(iii) generating a personalized 3D body model of the user based on the template mesh fitting process, and
(iv) generating an image file of the personalized 3D body model of the user.

The method may be one in which in step (ii), a coarse-fitting of body shape and pose under the constraint of a 3D human shape prior is performed.

The method may be one in which in step (ii), optimisation is formulated as a bundle-adjustment-like problem, in which fitting error is minimized over the PCA morph parameters and bone poses.

The method may be one in which in step (ii), given the coarse-fitting result as the starting point, a fine-fitting of the geometry and also refining the bone poses with an ICP algorithm is applied.

The method may be one in which multiple input depth scans of different camera views are used for the mesh fitting.

The method may be one including attaching a personalized 3D head model of the user of any aspect of the first aspect of the invention, to the 3D body model.

The method may be one in which skin tone is adjusted so as to match the skin tone of the 3D head model with the skin tone of the 3D body model.

According to an eighth aspect of the invention, there is provided a system configured to perform a method of any aspect of the seventh aspect of the invention.

According to an ninth aspect of the invention, there is provided a method including the steps of:

(i) providing an interactive UI to help users refine their 3D body avatar and edit their own body tone easily, in which the UI is built based on a dimension reduction algorithm (e.g. PCA), which models the distribution of 3D modelling error of the body shape regressor and allows the users to fill in their missing body shape variation efficiently.

The method may be one in which, in a first stage, a user can generate an initial 3D body avatar from the input of their body measurements through regression.

The method may be one in which in a second stage, a plurality of sliders are then displayed to the user for the user to refine the body shape interactively from the initial 3D body avatar generated in the first stage.

The method may be one in which the shape modes of a residual model are used to define the fine-gained body shape variation, in which each slider corresponds to a particular principal component of the model.

According to a tenth aspect of the invention, there is provided an end-to-end method or system for virtual fitting, which combines a personalized 3D head model of a user of any aspect of the first aspect of the invention, in attachment with a personalized 3D body model of the user of any aspect of the seventh aspect of the invention, wherein the personalized 3D body model of the user is modifiable using a method of any aspect of the ninth aspect of the invention.

According to an eleventh aspect of the invention, there is provided a commercial social network website configured to transmit an image file of the personalized 3D head model of the user, of any aspect of the first aspect of the invention.

According to an twelfth aspect of the invention, there is provided a web-app, chatbot, or other form of plug-in for messengers or social network applications, configured to transmit an image file of the personalized 3D head model of the user, of any aspect of the first aspect of the invention.

According to an thirteenth aspect of the invention, there is provided a method for processing a photo containing multiple faces of a collection of people, to generate a group animation automatically, comprising the steps of:

(i) from at least one input image of multiple faces, detect all frontal faces in the at least one input image, and the associated 2D face landmarks for each face; (ii) reconstruct the 3D face for each individual in the at least one input image based on the 2D face landmark detection results, and (iii) render an animation that contains some or all of the resulting 3D faces using distinctive time-sequences of head pose parameters defined for each face.

According to an fourteenth aspect of the invention, there is provided a method of reconstructing a user's body shape more accurately using a question and survey based UI, the method comprising the steps of:

(i) identifying existing body metrics and measurements relating to the user;

(ii) providing to the user in a user interface questions about their body shape awareness and lifestyle;

(iii) receiving from the user interface answers to the questions about the user's body shape awareness and lifestyle;

(iv) converting the received answers into a set of numerical or semantic body shape attributes.

The method may be one including the further steps of:

(v) mapping from the set of numerical or semantic body shape attributes, in combination with the existing body metrics and measurements relating to the user, to the subspace of body shape variation using regression tools, and (vi) reconstructing the user's body shape more accurately.

The method may be one including the further steps of:

(v) performing multiple regressors/mappings from body measurements to the parameters of the morphable body model, with each regressor trained on the data grouped by numerical or semantic body shape attributes, and (vi) reconstructing the user's body shape more accurately.

The method may be one in which an optimisation approach is used to find out the best set of questions to ask in the UI that would yield the most accurate body shapes, which is done based on the criteria of any of the following: 1) minimizing the number of questions or 2) minimizing the 3D reconstruction error of the body shape, or 3) a combination of 1) and 2).

According to an fifteenth aspect of the invention, there is provided a method of reconstructing a user's body shape by requesting additional measurements using a measurement selection process, comprising the steps of:

(i) receiving an indication of a body size from a user;

(ii) identifying a body shape dataset which corresponds to the indicated body size;

(iii) evaluating 3D reconstruction errors of all different body shape regressors based on different sets of measurement input over the identified body shape dataset;

(iv) evaluating the respective decreases of 3D reconstruction errors by introducing each respective new measurement as an extra measurement on top of an existing set of measurements input for body shape regression;

(v) identify the measurement that gives the largest error decrease;

(vi) requesting the user for an input of the identified measurement that gives the largest error decrease;

(vii) receiving the input of the identified measurement that gives the largest error decrease, and (viii) reconstructing the user's body shape using the inputted measurement.

The method may be one in which a UI is integrated with an application programming interface (API) of a digital tape/string/ultrasonic measurement device with Bluetooth data transfer mechanism, which allows the user to easily transfer the measurement data on to the virtual fitting room UI while taking their self-measurements.

BRIEF DESCRIPTION OF THE FIGURES

Aspects of the invention will now be described, by way of example(s), with reference to the following Figures, in which:

FIG. 8 shows an example of predicting the user's attributes (e.g. age, hair colour, skin colour) from the single frontal view face image using machine learning classifiers, as described in Section 2.1.2. In this example, two different deep learning classifiers AlexNet [19] and VGGNet [29] are tested independently on the task of face attribute prediction.

FIG. 10 shows example end results of 3D face reconstruction from a single frontal view image using the approach described in Section 2.1.

FIG. 11 illustrates an example of 3D face reconstruction from multiple images (Section 2.2.1) (a): asking users to take two additional face images in corner views, simply by slightly rotating their head to each side; (b): contrasting result from single view and 3 views. It can be noticed that the nose geometry in the profile view is more accurate in the multi-view reconstruction result when compared with the ground-truth photo.

FIG. 13 shows an example of estimated camera poses from facial landmarks (see Section 2.2.3): (a) and (b): the facial features detected by a CLM tracker; (c): refined camera positions and 3D landmarks using bundle adjustment. The coordinate systems are marked with circles and triangles to represent the camera positions and landmarks before and after the refinement respectively.

FIG. 15 shows an example of colour tone balancing described in Section 2.2.3: (a): the mesh classification result using the method described in Section 2.2.3; (b): the back-projection of boundary vertices on to the front image; (c): the estimated colour offset at the boundary points on each colour channel; (d): the Laplacian diffusion of (c) to all pixels.

FIG. 16 shows an example of Laplacian diffusion as described in Section 2.2.3 before (a) and after (b) the colour tone balancing.

FIG. 21 shows an example illustration of a process of transferring the texture map from the raw scan data to the registered head model, as described in Section 2.3.3.

FIG. 22 shows an example illustration of the texture sampling problem described in Section 2.3.3. A naive texture sampling yields seam artifacts (middle) given a piecewise texture map. A better texture transfer is done by texture augmentation (right).

FIG. 24 shows examples of input face images with different lighting issues and other quality problems as mentioned in Section 3.1.

FIG. 28 shows an example using three Kinect scans (every 120 degrees) for markerless body mesh fitting, as described in Section 4.1.

FIG. 29 shows an example pipeline of the two-stage body model creation process with a measurement-regression followed by a silhouette refinement, as described in Section 4.2.2.

FIG. 31 shows an example pipeline of a two-stage body model creation process with a measurement-regression followed by a quick body-awareness survey, as described in Section 4.4.

FIG. 32 shows examples of the end-to-end visulisation of personalised 3D avatars in outfits. The personalised 3D avatars are generated using the approaches described in Section 5, which correctly merges the face model and the body model of the user in both geometry and texture. It also includes a customisation of hairstyles.

FIG. 35 shows an illustration example of the alpha colour blending process for a smoother colour transition from the face area to the rest of the body model, as described in Section 5.2.2.

FIG. 37 shows an illustration example of transitioning between mesh skinning and physics simulation for modelling the deformation of a 3D hair model, as described in Section 5.3.1.

FIG. 39 shows an illustration example of the texture association approach for 2D hairstyle modelling, as described in Section 5.3.2.

FIG. 46 shows examples of face-roulette renders from group photos using the approach described in Section 6.3.

DETAILED DESCRIPTION

1. Overview

User testing has shown that personalisation is a key factor for increasing adoption and habitual use of online body modelling in e-commerce technology.

Supporting representing users' own faces, body shape accuracy, and customisation of hairstyles, to a high level of quality, are important goals in the technology.

In this document, we provide new systems and associated approaches to create personalised 3D avatars for online users, which can be used for outfitting visualisation, fitting advising, and also 3D printing. We demonstrate how the use of computer vision techniques significantly improve the quality of 3D head and body models and the ease with which they can be created, in particular allowing the users to add their face to the virtual avatar. The key features of the technology include:

1. supporting automatic and accurate reconstruction of a personalised 3D head model from different types of input, e.g. using a single or multiple selfies from a mobile phone, or using depth scan capture;
2. supporting hairstyle customisation on the user's 3D head model;
3. reconstructing a precise and personalised 3D body shape model for the user from different sources of input;
4. creating photo-realistic visualisation of the users' 3D avatar combined with their personalised face model;
5. a fast client-side feedback mechanism to guide users' acquisition of good input data for creating a high quality 3D avatar.

Figure 1:
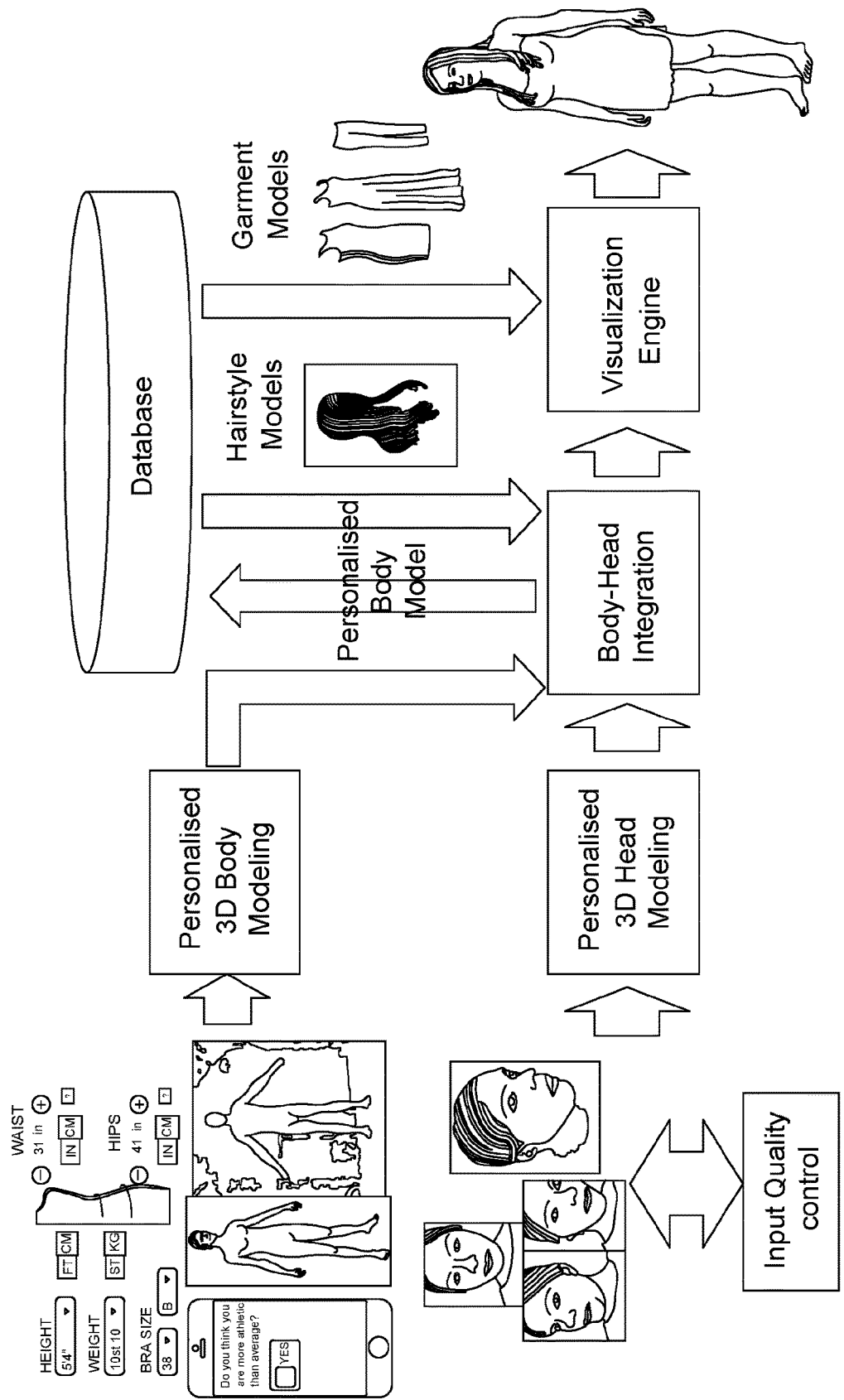
FIG. 1 shows an example abstract diagram which relates to the personalised 3D avatar virtual fitting system described in Section 1.

These innovations will give consumers a better experience and more confidence when shopping online, and significantly increase the proportion of shoppers on a site using virtual fitting room technology. As shown for example in FIG. 1, the provided virtual fitting system for personalised body avatar creation may comprise the following major components:

1. Input quality control module: performs an automatic image analysis on the client side to help users quickly acquire input data of good quality so that they have a better chance of creating a photo-realistic personalised avatar (see e.g. Section 3);
2. Personalised 3D head modelling module: used to create a personalised 3D face and head model of the user from various sources of input (see e.g. Section 2);
3. Personalised 3D body modelling module: used to create a high quality 3D model that explicitly captures the user's 3D body shape from various sources of input (see e.g. Section 4);
4. Avatar integration module: it merges both the geometry and appearance of the 3D head model, the 3D body model and customised hairstyle model into one single unified 3D avatar of the user (see e.g. Section 5).
5. Visualisation engine: performs the garment fitting simulation on the user's 3D personalised avatar with the specified sets of garments, models outfitting, and generates end visualisations of dressed virtual avatars.
6. Databases: stores user information (e.g., body measurements, photos, face images, 3D body scans, etc.), garment data (including image data and metadata), and hairstyle data (e.g. 2D images of photo-graphic hairstyles, or 3D digital hairstyle models). Modules 1-4 are important modules for achieving personalisation. Several variants of end-to-end personalised virtual fitting system can be derived from the example design in FIG. 1. For example, to address different forms of input for creating a user's 3D face model, we can use 1) a single view image input (see FIG. 2 for example), 2) multiple 2D input images in different views (see FIG. 3 for example), and 3) multiple images or a video sequence as input (see FIG. 4 for example).

In the rest of this document, Sections 2 to 5 will address the implementation details and technical steps of the four personalisation modules under different variations of system designs. Finally in Section 6, we present several alternative personalisation applications which are derived from the systems and approaches described in Sections 2 to 5. They may be integrated with commercial social network websites, messengers, and other mobile applications, so that users can create, visualize, and share their personalised 3D models conveniently.

2. Personalised Head Modelling

Figure 2:
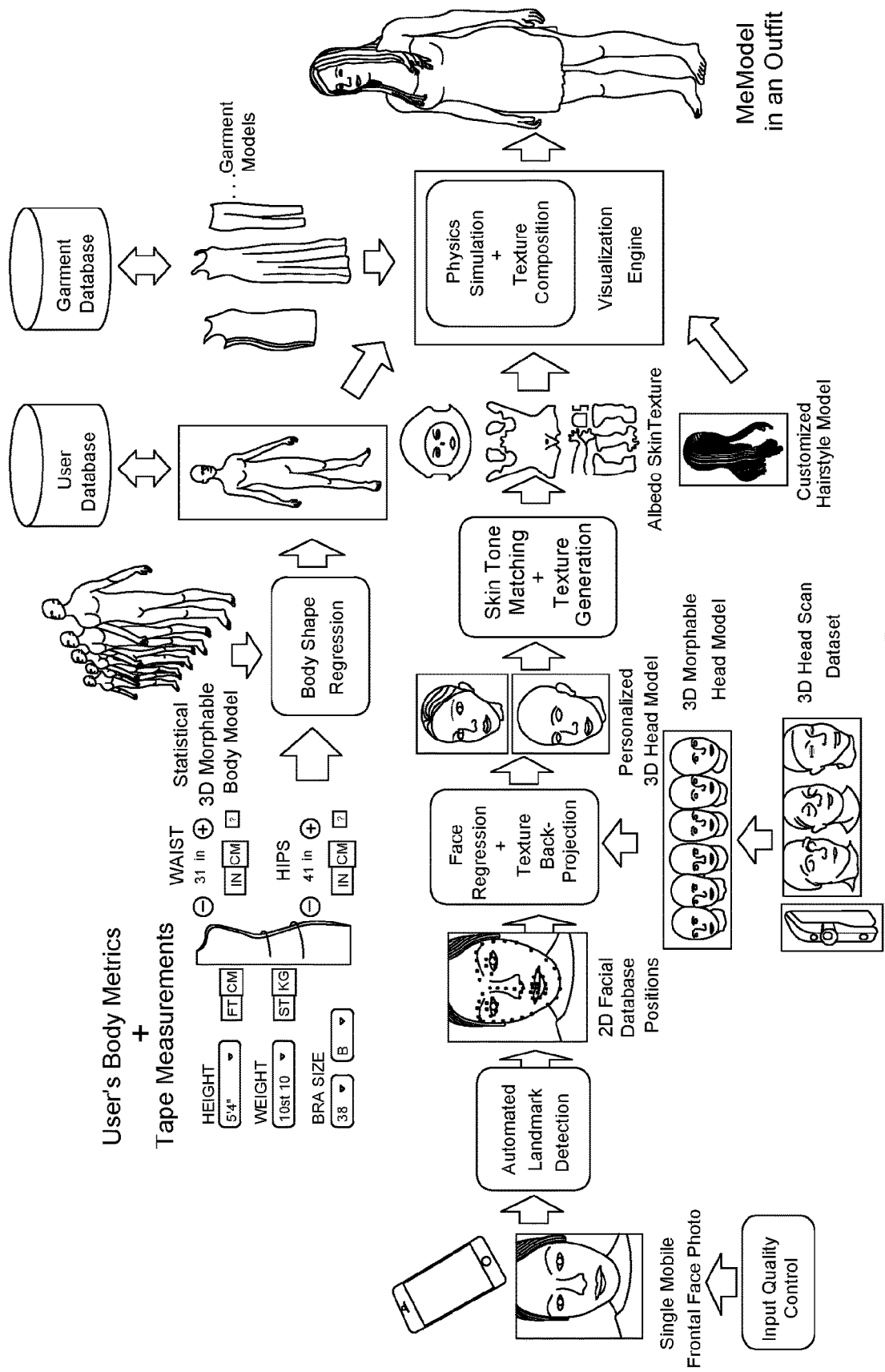
FIG. 2 shows an example architecture of a personalised virtual fitting system using a single frontal view face image of the user as the input for 3D face reconstruction, as described in Section 2.1.
Figure 3:
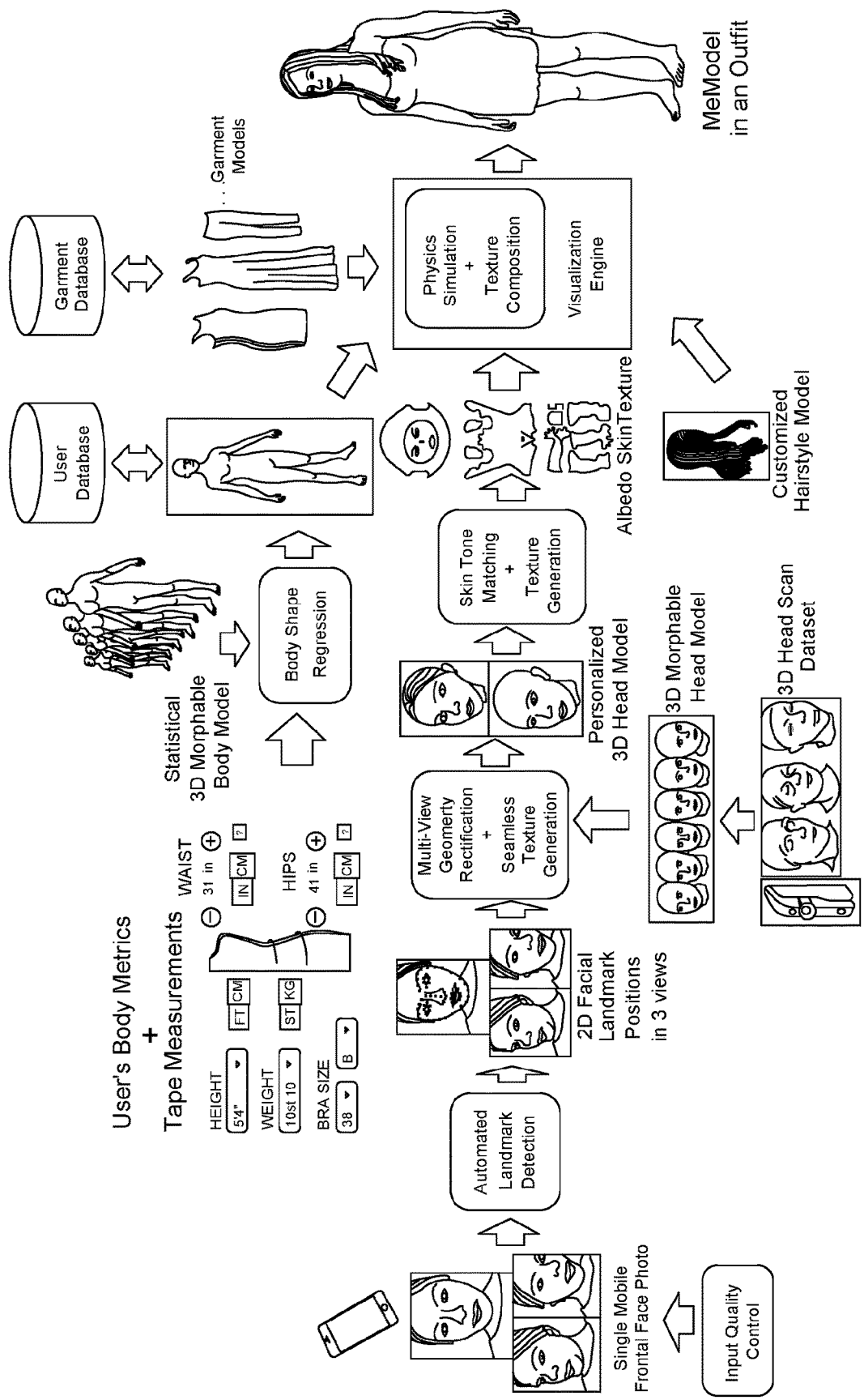
FIG. 3 shows an example architecture of a personalised virtual fitting system using three face images (front, side left, side right) of the user as the input for a 3D face reconstruction, as described in Section 2.2.
Figure 4:
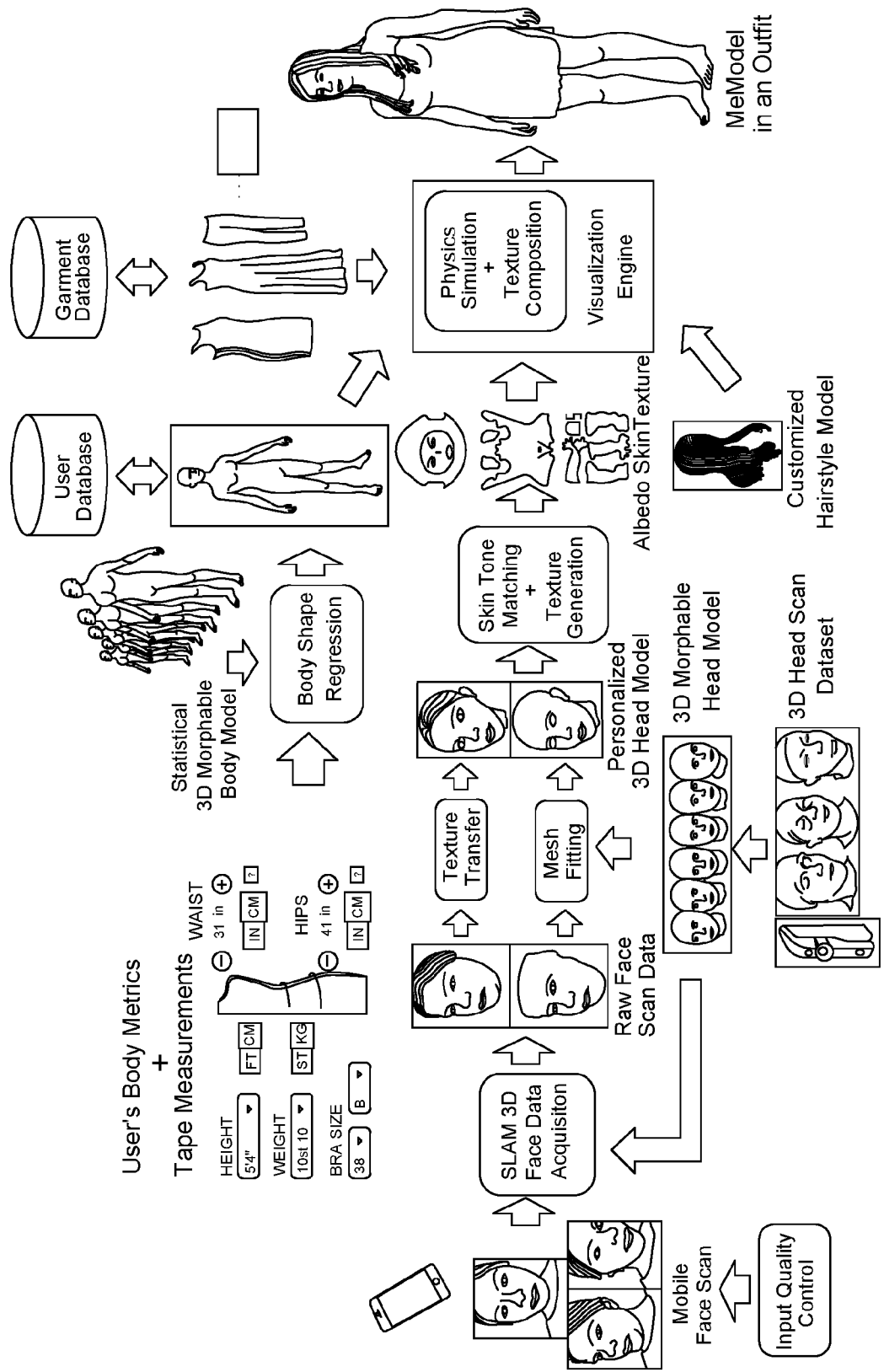
FIG. 4 shows an example architecture of a personalised virtual fitting system using an input of a mobile-based 3D face scanning module based on the SLAM technique for 3D face acquisition, as described in Section 2.3.

Allowing a user to model their own face in 3D is a key feature for personalisation. In this section, we describe several distinctive automated approaches and derived systems that allow a user to create a 3D face/head model of themselves from different sources of input data:

from a single 2D image, e.g. the users are asked to take a single frontal view selfie on their mobile phone or upload a portrait of themselves (see e.g. Section 2.1 and FIG. 2).

from multiple 2D images, e.g. the users are asked to take several selfies in distinct camera views (see e.g. Section 2.2 and FIG. 3).

from a 3D scan, which can be acquired using a depth camera, a 3D scan, or using computer-vision-based 3D reconstruction approach from an image sequence (see e.g. Section 2.3 and FIG. 4).

The following subsections will describe the technical details of each branch of the 3D head/face modelling approaches.

2.1 3D Face Reconstruction From a Single 2D Frontal View Image

Figure 5:
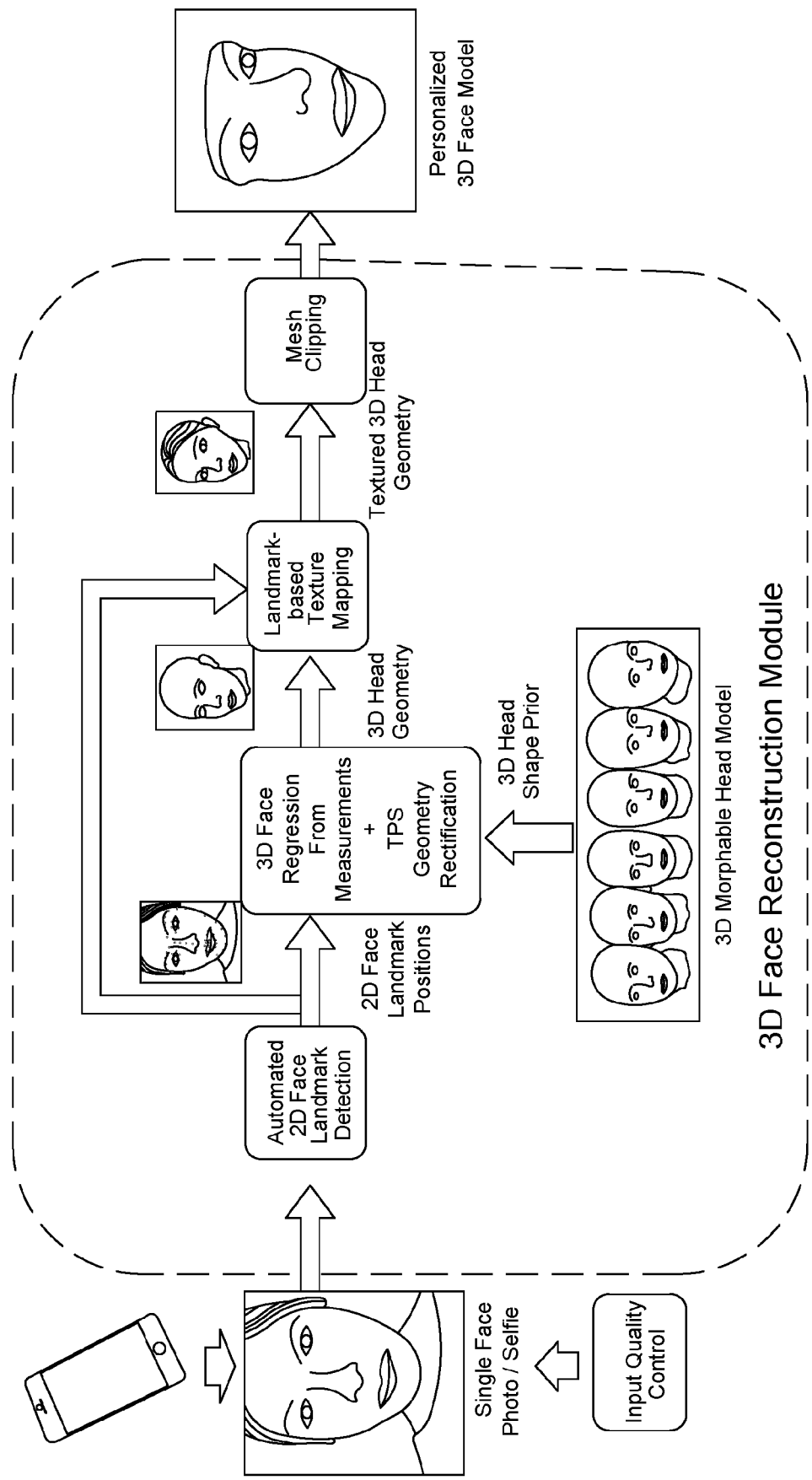
FIG. 5 shows an end-to-end diagram of an example single-view-based 3D face reconstruction module that uses a morphable head model as the shape prior to recover the missing depth information of the user's face, as described in Section 2.1.

This subsection describes a fully automatic pipeline that allows users to create a 3D face or head model of themselves from only one single frontal face photo quickly and easily. A typical end-to-end process for the single-view-based 3D face reconstruction is illustrated for example in FIG. 5. In summary, it includes the following three key steps:

Automated face landmark detection (Section 2.1.1);

Single-view 3D face geometry reconstruction using a shape prior (Section 2.1.2);

Texture map generation and interpolation (Section 2.1.3);

Details are described as follows.

2.1.1 2D Face Localisation and Automatic Landmark Detection

Figure 6:
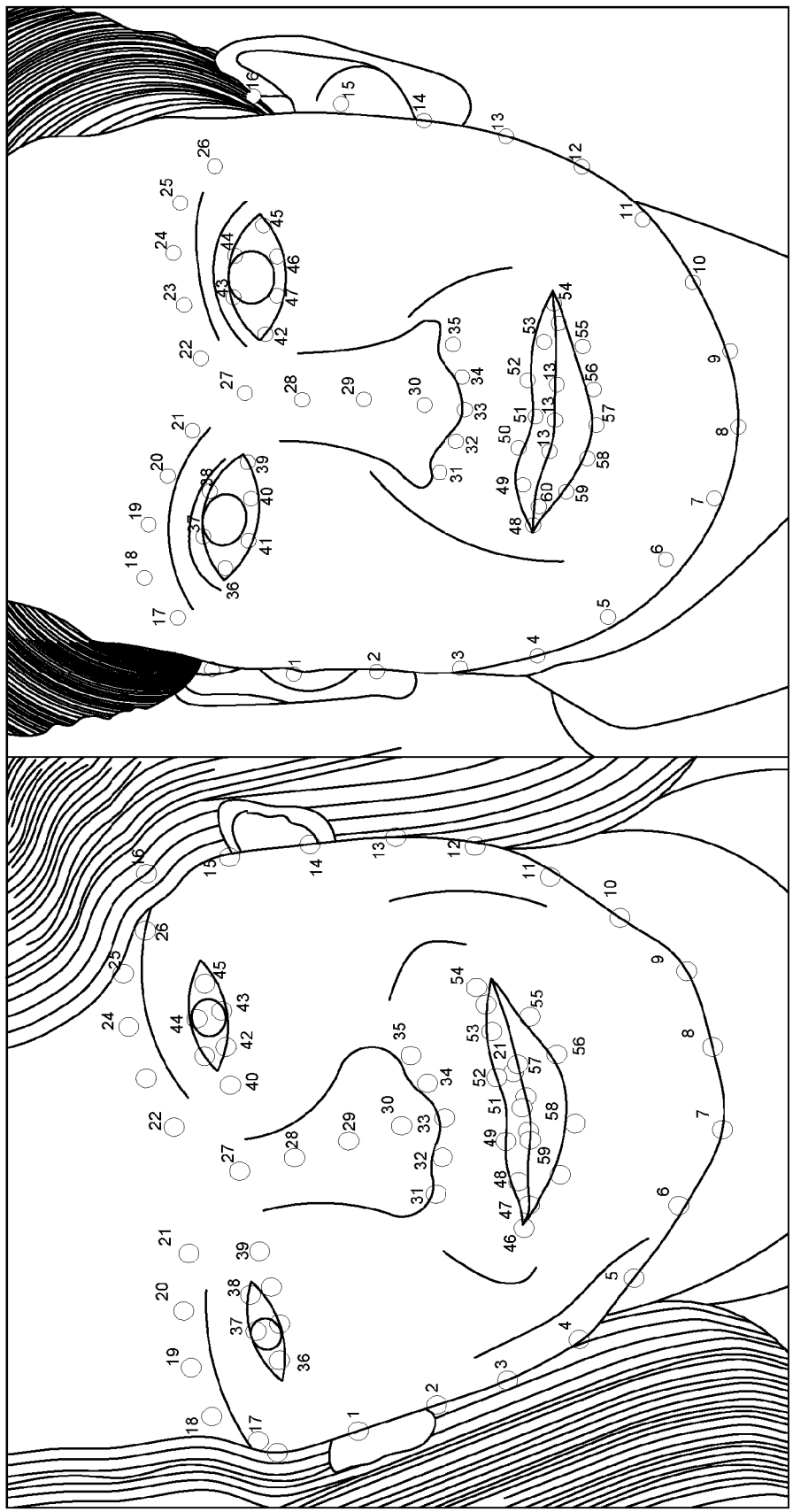
FIG. 6 shows examples of landmark layouts adopted by the face landmark detectors described in Section 2.1.1.

To reconstruct a user's 3D face, we first analyze the input image and extract the shape features of the user's face. To achieve that, we detect the 2D facial landmarks automatically in our pipeline by integrating a 2D face landmark detector, which, in an example, can be provided by an open source image processing and computer vision library, e.g. DLib or OpenCV. In an example, the detector we adopted is implemented based on a regression forest algorithm [18]. It is able to detect $N_L$=68 face landmarks from the image (see FIG. 6 for example), which characterise the positions and silhouettes of eyes, eyebrows, nose, mouth, lips, the jaw line, etc. This detector is proved to be reasonably robust against input images with different lighting conditions, head pose changes, and facial expression. The module can, however, be replaced by other more sophisticated 2D or 3D face landmark detectors or trackers, e.g. the 3D Constraint Local Model (CLM) based facial landmark detector [11].

2.1.2 3D Face Geometry Reconstruction

The next step is to reconstruct the user's 3D face model from the face shape features (i.e. the 2D facial landmarks) extracted in Section 2.1.1. The geometry reconstruction process involves two stages. We first generate an approximate 3D face geometry using 3D head shape priors, then we refine the 3D geometry based on the distribution of the 2D face landmarks detected in Section 2.1.1. The details are as follows.

Generate an Approximate Geometry Using Shape Priors:

In the first stage, we find an approximate head geometry as an initialisation using a generative shape prior that models shape variation of an object category (i.e. the face) in the low dimensional subspace with a dimension reduction method. The full head geometry of the user can be reconstructed from this low dimensional shape prior with a small number of parameters. A representable approach for head modelling is to learn a 3D morphable head model (3DMHM) [8], in which principal component analysis (PCA) is used to capture dominant modes of human head shape variation. In 3DMHM the parameters are the PCA weights w={$w_p$}$_{p=1}^P$. Each principle component vector $u_p$ will represent a mode of head/face shape variation as follows:

$$X = X_{mean} + \sum_{p=1}^{P} w_p u_p = X_{mean} + wU. \quad (1)$$

Figure 7:
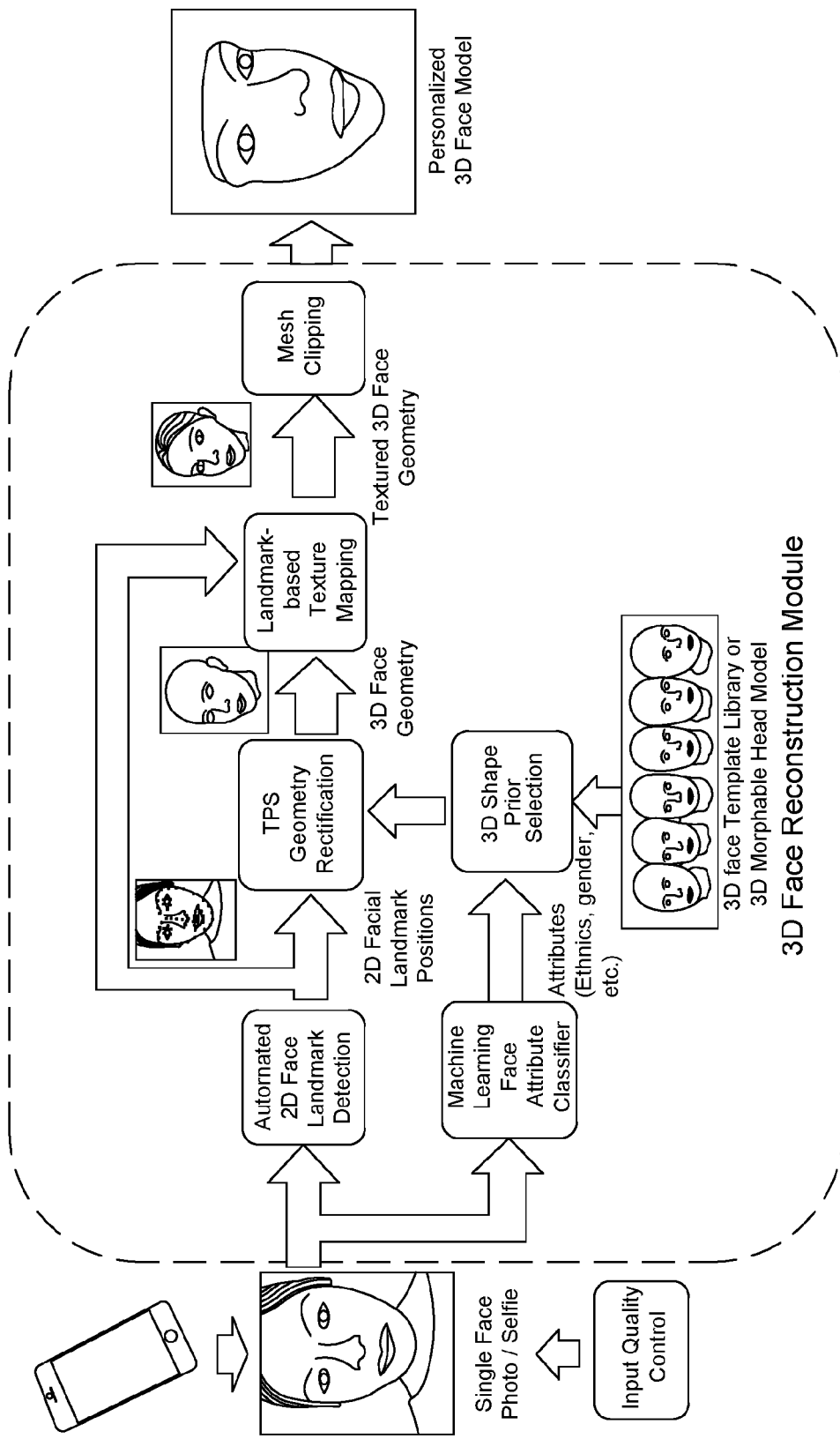
FIG. 7 shows an end-to-end diagram of an example variant of a single-view-based 3D face model reconstruction module, in which we use a machine learning attribute classifier to analyze the user's photo and predict his/her attributes (e.g. ethnics and gender) from the image, and then select the appropriate 3D shape prior from the library to recover the missing depth information of the user's face more accurately, as described in Section 2.1.2.
Figure 9:
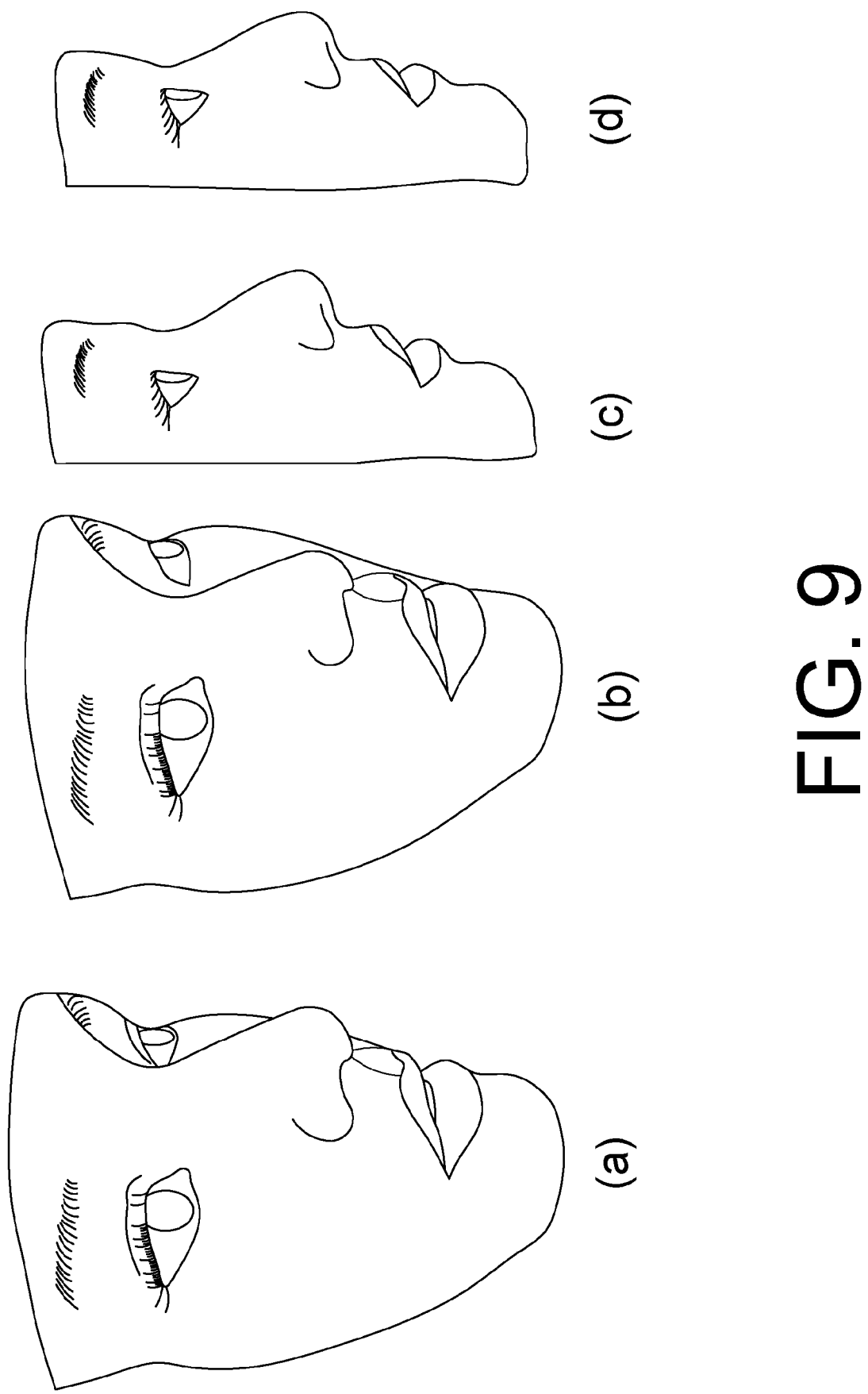
FIG. 9 shows an example of reconstructing the 3D model of a Korean user with different shape priors as described in Section 2.1.2. (a) and (c) are the results by using an European shape prior of the 3D face, whereas (b) and (d) are the results by using Asian shape prior, which give more realistic nose geometry in the profile view.

In the implementation the approximate head geometry can be generated by the following schemes:

1. simply using the mean $X_{mean}$ of the 3DMHM as the shape prior, which corresponds to a mean head shape of the population;

2. using a shape prior selection process to find the most suitable shape prior from a library using selection criteria such as the user's ethnicity, gender, age, and other attributes. The system diagram example of this solution is illustrated in FIG. 7. In the pipeline, we introduce an additional machine-learning-based attribute classifier, which can be implemented by e.g. a deep convolutional neural network (CNN) [19, 21, 29], to analyze the user's photo, and predict attributes (e.g. ethnicity, gender, and age) from the appearance information (i.e. skin colour, hair colour and styles, etc.) in the image. We select the appropriate 3D shape prior from the library based on matching a user's attributes with those defined for each shape prior. This method can recover the missing depth information of the user's face more accurately. It is useful for building a product that will work across different ethnic regions. See FIG. 8 for an example of image-based face attribute classification implemented by CNN classifiers.

1. predicting the PCA weights of the 3DMHM from 2D landmark positions. This is done by training a regressor R that gives a mapping from the M normalised 2D landmark positions $\hat{L}=\{\hat{l}_i\}_{i=1}^M$ to the underlying model parameters $\{w_p\}_{p=1}^P$ of the 3D morphable head model, where each 2D landmark position $l_i=(l_{i,x}, l_{i,y})$ is first normalised by the dimension $H_i$, $W_i$, and the centre $c_i=(c_{i,x}, c_{i,y})$ of the face detection bounding box.

$$\hat{l}_i = (\hat{l}_{i,x}, \hat{l}_{i,y}) = \left(\frac{l_{i,x} - c_x}{W_i}, \frac{l_{i,y} - c_y}{H_i}\right) \quad (2)$$

From the morph weights $\{w_p\}_{p=1}^P$, we can reconstruct the full 3D head geometry $X_{user}$ of the user as follows.

$$X=X_{mean}+wU=X_{mean}+R(\hat{L})U. \quad (3)$$

2. Predicting the full 3D head model from the face measurements by defining intuitive face biometrics based on the 2D facial landmarks (i.e., eye distance, eye-to-mouth distance, nose height, nose length, jaw width, etc.), as a variant of face regression. Then a linear regression can be applied to map these biometric measurements to PCA morph parameters.

Landmark-Driven Geometry Refinement:

In the second stage, we improve the head geometry for better realism by deforming the initial head model. We rectify the face landmark positions of the 3D model in the directions within the image plane (i.e. X and Y directions), so that the projection of the facial landmarks on the 3D face model will be a similarity transform of the corresponding 2D facial landmarks $\{I_i\}_{i=1}^{M}$ in the image. This process will make the generated 3D head model appear much more similar to the user's face in the input photo, particularly in near-frontal views. This refinement stage will not change the depth (i.e. the Z direction) of the head or face model.

In the algorithm, we first find a similarity transform T* (a 3×2 matrix) based on the layout of the 2D image landmarks $\{I_i\}_{i=1}^{M}$ to the frontal projection $\hat{L}_i=(L_{i,x}, L_{i,y})$ of the corresponding 3D landmarks $L_i=(L_{i,x}, L_{i,y}, L_{i,z})$ (i=1, 2, ..., M) of the 3D head model $X_{user}$ obtained from the shape regression above. This can be obtained by solving the following least squares problem in (4).

$$T^* = \arg\min_{T} \sum_{i=1}^{N} \|\hat{L}_i - [I_i, 1]T\|^2. \tag{4}$$

We then use a 3D thin-plate spline (TPS) deformation model [9] to rectify the 3D geometry of the regressed head model $X_{user}$ to achieve better geometric similarity. To implement that, we define the M source and sink control point pairs $\{(s_i, t_i)\}_{i=1}^{M}$ of the 3D TPS model as:

$$s_i = L_i = (L_{i,x}, L_{i,y}, L_{i,z}), \tag{5}$$

$$t_i = (J_{i,x}, J_{i,y}, J_{i,z}) = ([I_i, 1]T, L_{i,z}), i=1, 2, \ldots, M \tag{6}$$

where $J_i = [I_i, 1]T = (J_{i,x}, J_{i,y})$ are the revised XY coordinate of the 3D face landmark. This TPS model will generate a smooth interpolation of 3D geometry deformation throughout the whole head mesh $X_{user}$ from the above M control point pairs. See Section 7 for the detailed formulations for the TPS model.

Finally, the 3D face model of the user is generated by clipping the mesh of the user's head model with a 3D plane (defined by 2 vertices on the forehead and 1 vertex on the jaw) using the mesh-clipping algorithm described in [28]. This will yield a 3D mesh of the user's face with smooth boundaries. The 3D face model above is further refined into a watertight 3D face mask mesh using an off-the-shelf mesh solidification algorithm. The result can be used for 3D printing of personalised 3D face masks.

2.1.3 Appearance Model Creation

Based on the techniques described in Section 2.1.2, we can reconstruct the 3D mesh geometry X={V, T} of the user's face, where V and T stand for the set of vertices and triangles of the mesh respectively. Then, we need to generate the appearance model (i.e. the texture map) of the 3D model so that we can render the user's 3D face model photo-realistically. By determining UV texture coordinates $\{(u_{t,1}, v_{t,1}), (u_{t,2}, v_{t,2}), (u_{t,3}, v_{t,3})\}$ for the texture vertices of each mesh triangle t∈T. For the single-view-based solution this texture-mapping process is relatively straightforward. Firstly, we assign the UV texture coordinates of those vertices $\{v_{l_i}\}_{i=1}^{L}$, which are the L vertices pre-determined as the 3D face landmarks (with vertex indices $\{l_1\}_{i=1}^{L}$) on the face template. The UV coordinate $(u_i, v_i)$ of a landmark vertex $v_{l_i}$ (i=1,2, ..., L) is computed based on the result of the corresponding 2D face landmark position $f_i=(f_{i,x}, f_{i,y})$ detected by the 2D face landmark detector on the input image I (see Section 2.1.1), as the following equation shows.

$$t_{l_i} = (u_{l_i}, v_{l_i}) = \left(\frac{f_{i,x}}{W_I}, 1 - \frac{f_{i,y}}{H_I}\right), \tag{7}$$

where $W_I$ and $H_I$ refer to the width and the height of the input image, respectively. Secondly, to complete the texture map of the 3D face/head model X, we adopt a 2D thin plate spline (TPS) model [9] for interpolation and populate the UV texture coordinate over other mesh vertices. For each vertex v∈V, we first estimate its front-view projection $\hat{p}_i$ from its 3D vertex position $P=\{p_x, p_y, p_z\}$ based on a perfect frontal view perspective camera model as (8) shows.

$$\hat{p} = \left(\frac{p_x}{p_z + d_{camera}}, \frac{p_y}{p_z + d_{camera}}\right), \tag{8}$$

where $d_{camera}$ is an empirical average distance of the camera to the user's face estimated from experiments. We here set $d_{camera}$=40 cm.

To construct a IPS model for texture coordinate interpolation, we use the frontal-view landmark projection $\{\hat{p}_{2_i}\}_{i=1}^{L}$ of all the face landmarks $\{l_i\}_{i=1}^{L}$ and its texture coordinates $\{t_{l_i}\}_{i=1}^{L}$ assigned previously as the source-sink control point pairs. This will finally give us a global mapping from the frontal-view 2D projection $\hat{p}$ of any vertex v∈V to its texture coordinate t. See Section 7 for the general formulations of the TPS model. In the implementation we ignore some of the facial landmarks, e.g. those indicating the inner silhouettes of the lips, to balance the density of the control points resulting in the generation of a smoother texture interpolation.

The texture mapping solution provided above is robust under a range of different face expression and lighting conditions, as shown for example in FIG. 10.

2.2 3D Face Reconstruction From Multiple Images

The single-view-based approach described in Section 2.1 is able to generate a 3D face model with reasonably good quality in terms of geometry and appearance realism when rendered from a near-front view. However the geometric realism degrades on the side views, the major issue being inaccurate nose shapes. This artifact is mainly caused by the loss of explicit depth information in the single front view image.

In view of the problem above, we also provide an approach based on 3D reconstruction from multiple input images by giving users the option to upload additional face photos of themselves in distinct camera views. The additional images will give new constraints to the 3D reconstruction problem thereby improving the geometry accuracy of the side and profile views. The typical set-up is to use three selfie photos of the user in different camera views as the input: i.e. the centre frontal view photo, a side-left view photo, and a side-right view photo (see FIG. 11(a)). The approaches of geometry rectification from multiple images will be described in detail in Section 2.2.1.

Generating a good appearance model (i.e. the texture map) is another challenging task. A high quality texture map plays an important role in realistic rendering. For example the perceived render quality of a less accurate 3D model can be easily improved by attaching a high quality texture map.

Similarly, an inadequate texture map can deteriorate the result significantly even though underlying geometry is good enough.

In the multi-view-based system a good texture map generally gathers information from multiple images of different viewing angles to cover the whole surface of a 3D model combined into a single image atlas corresponding to a parameter space of a model [33]. Therefore, any small misalignment between two adjacent texture patches could create a noticeable stitching seam. Furthermore, even if they are aligned correctly, the different lighting condition of each input image might create visual artifacts at the boundary, e.g. colour tone difference. An ideal solution for this would be taking albedo images which do not contain any specular reflection. However, this is not feasible for our working scenario using a mobile device.

Since our final goal is realistic rendering of a face model, an area with which humans are very familiar, a flawless texture map is highly required. In our user interface, the user is allowed to take multiple input images from a single rotation of a hand held camera around the face. This can give us a sufficient number of images to cover the wide viewing range of a face model (see FIGS. 12(a) and (b)). To produce a plausible result in this case, we found that the following three problems should be addressed:

Stitching seams from the different lighting direction of each image;

Ghost-effects created by a small facial movement (e.g. eye blinking);

Highlights on face which can give a wrong impression of depth when rendering.

The details of how we addressed the three challenges are given in Section 2.2.2.

2.2.1 Geometry Rectification

To reconstruct a better 3D face model in the multiple-view setting, we provide a two-stage geometry rectification algorithm. Firstly, we use the approach described in Section 2.1 to generate an approximate 3D face model $F_0$ from the single frontal view image $I_C$ and use it as the initialisation. Then, we implemented an iterative optimisation algorithm for revising the initial 3D face geometry $F_0$. The goal is to minimise the landmark re-projection errors against independent 2D face landmark detection results obtained on all face images (e.g. for the 3-view setting "Centre" $I_C$, "Left" $I_L$, and "Right" $I_R$) with the following process.

We denote the above image collection as $I=\{I_C, I_L, I_R\}$. Firstly, for each view $v \in I$, we estimate the approximate extrinsic camera matrix P. (3×4) based on the corresponding 3D landmark positions $L_i$=1, 2, . . . , $N_L$) of the current face geometry (approximated) and their 2D image landmark positions $I_{i,v}$ (i=1, 2, . . . , $N_L$) detected in the view v, as (9) shows.

$$P_v = \arg\min_{P} \sum_{i=1}^{N_L} \|I_{i,v} - dehom2d(K_0 P[L_i^T, 1]^T)\|^2, \qquad (9)$$

where $K_0$ stands for a camera intrinsic matrix which is known assuming we know the camera model on the device, and $$dehom2d([x, y, z]^T) = \left[\frac{x}{z}, \frac{y}{z}\right]^T$$

stands for an operation of converting a 2D homogenous coordinate into the regular 2D coordinate. In an implementation example, the above optimisation problem is solved using the "PnPSolver" function of OpenCV library.

Secondly, in each view $v \in I$, we estimate the landmark projection discrepancy vectors $\{\delta I_{i,v}\}_{i=1}^{N_L}$ by (10).

$$\delta I_{i,v} = I_{i,v} - dehom2d(K_0 P_v[L_i^T, 1]^T), \qquad (10)$$

We then back-project the 2D landmark projection discrepancy vector $\delta I_{i,v}$(i=1,2, . . . , $N_L$) to the 3D space using the estimated extrinsic camera matrix $P_v$, and we estimate the 3D deviation $\Delta L_{i,v}$ of each 3D landmark $L_i$ on the face model F in the directions of the image plane by (11).

$$\Delta L_{i,v} = dehom3d(P_v^{-1}[K_0^{-1}[I_{i,v}^T + \delta I_{i,v}^T 1], 1]), \qquad (11)$$

where $$dehom3d([x, y, z, w]^T) = \left[\frac{x}{w}, \frac{y}{w}, \frac{z}{w}\right]^T$$

is an operation converting a 3D homogenous coordinate into the regular 3D coordinate. We then average the 3D deviation vectors $\Delta L_{i,v}$ in all views to revise the 3D landmark position $L_i$ for each landmark, as follows:

$$\Delta L_i = \frac{1}{\|I\|} \sum_{v \in I} \Delta L_{i,v}. \qquad (12)$$

Thirdly, we morph the 3D face model F with the new set of landmark positions $L^*_i = L_i + \Delta L_i$, using a 3D thin-plate spline model as described in Section 7. The source and sink control point pairs are the 3D landmark positions before and after the revision:

$$(L_i, L^*_i), (i=1,2, \ldots, N_L).$$

We repeat the above three steps for several iterations until convergence. The end-to-end process of the multi-view geometry rectification algorithm is summarised below in the summary of Algorithm 1. We find that this method can considerably improve the geometry accuracy of the face model in the profile views (see FIG. 11 for example).

Algorithm 1: A summary of the face geometry rectification algorithm from multiple face images in different camera views, as described in Section 2.2.1.

Input: A collection of faces images in distinct views: I.

Output: Rectified 3D face geometry.

1. Perform a single view reconstruction from the frontal-view image ($I_C$) to get an approximate 3D face geometry $F_0$, using the approach described in Section 2.1.2).

2. Perform face landmark detection described in Section 2.1.1 independently on each view $v \in I$. This will give us three sets of 2D landmarks $\{I_{i,v}\}_{i=1}^{N_L}$ in each view $v \in I$.

3. Perform a 3D geometry revision F with an initialisation of F0, and then iterate over the following steps 4-8:

4. For each view $v \in I$, estimate the approximate extrinsic camera matrix $P_v$ based on the corresponding 3D landmark positions $L_i$ of F and the detected 2D image landmark positions $I_{i,v}$(i=1,2, . . . , $N_L$) according to (9).

5. For each view $v \in I$, estimate the 3D deviation $\Delta L_{i,v}$ of each 3d landmark $L_i$(l=1,2, . . . , $N_L$) of F by backprojecting image landmark positions $I_{i,v}$(i=1,2, . . . , $N_L$) according to (10) and (11).

6. For each landmark $L_i$, average the 3D deviation vectors $\Delta L_{i,v}$ in all views I according to (12), and update the 3D landmark positions.

7. Morph F using a 3D TPS model in Section A to generate a revised 3D face model F*. based on the new set of 3D landmark positions.

8. Reassign F=F*.

2.2.2 Multi-View Texture Synthesis and Enhancement

This subsection describes the algorithmic technology for overcoming the aforementioned challenges (i.e. texture seam, ghost artifact, local highlight) in the process of appearance model creation in a multi-view-based system.

Figure 12:
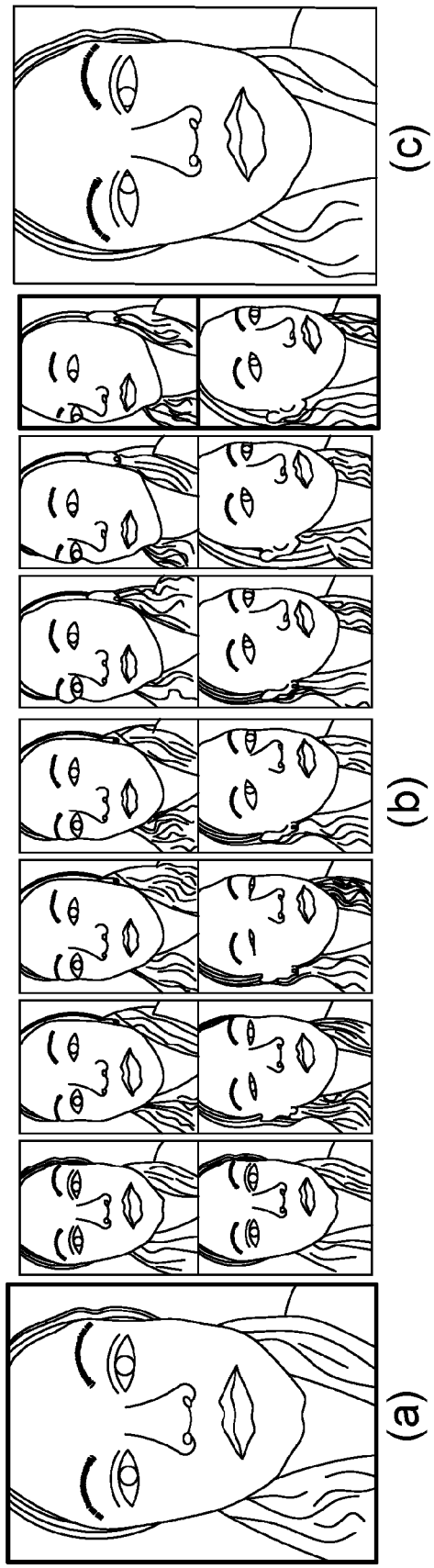
FIG. 12 shows an example of input images from a single rotation mentioned in Section 2.2.2: a) the front image; b) images from left and right camera rotation, where the images in black frames are used to create a final texture map and the other input images are used to identify highlight; c) a simple colour averaging can result in ghost-effect particularly around eyes, which can deteriorate the quality of rendering significantly.

Instead of fusing all input images, we use only three images to create a final texture map, such as far left, far right, and front view (e.g. the images in black frames in FIG. 12). The other input images are used to identify highlights on these three images. To fuse the images of three camera views seamlessly, the provided method initially classifies each facet of a 3D face model for 3 classes (i.e. front, left, and right) and assigns one of the three images for each class. Since the texture map for eyes is particularly important (see an example of a bad result from a standard image stitching method in FIG. 12(c)), we use a state-of-the-art facial landmark detector [4] to detect major facial features on the front image and make the corresponding meshes have the same class ID. This minimises the number of cases of a stitching seam crossing major facial landmarks (i.e. eyes, mouth, etc.)

We repair the colour tone difference between images by adding a colour offset at each pixel. Since we know the preferred colour offset at the stitching boundary, we propagate the offset values at the boundary to all image pixels using Laplacian diffusion. Since most facial areas are generally textureless (e.g., cheeks), such smooth propagation is sufficient to repair the skin tone difference.

However, we found that the problem of highlight removal more challenging. Even though highlight detection has been studied for a long time in the computational photography community, it remains a difficult problem because a successful detection relies on many factors, e.g. the shape of an object, the lighting condition at the time, and the camera position.

To make the problem more tractable we break down the problem into two parts: a) highlight detection and b) recovering true colour. For highlight detection, we create a highlight probability map based on the colour distribution of corresponding facets across all input images. This can allow us to identify quickly the affected regions. The colour of the highlighted region is then recovered using the gradient of one of the input images.

More details about seamless stitching and highlight removal are given in Section 2.2.3 and 2.2.4, respectively.

2.2.3 Seamless Texture Stitching

Camera Pose Estimation

To establish the link between a 3D face model and the input images, we need to estimate the camera projection matrices. In fact this is a camera tracking problem which can be solved by a range of computer vision techniques, e.g. sparse bundle adjustment [22] or SLAM technique [12]. However, these approaches generally produce a reliable result when there are well distributed point correspondences between images. Unfortunately, we cannot expect this from face images. Standard image matching algorithms fail to detect image features around cheeks for setting up image correspondence because of the lack of patterns.

In the case of face images, we use a model based feature detector, i.e. a 3D Constraint Local Model (CLM) based facial landmark detector [11]. A CLM based facial landmark detectors robustly detects facial landmarks using pre-trained 3D facial landmarks [32], and estimates a relative camera positions based on an associated camera model [4].

However, many CLM trackers adopt an orthographic projection model for computational simplicity. This approximation is generally sufficient for long range images but if an object is close to a camera as it is in our case, a projective camera model should be used to account for potential perspective distortions. To address this we refine the initial camera parameters from a CLM tracker using bundle adjustment.

FIG. 13(c) shows an example of refined camera poses from bundle adjustment. In this example, a CLM tracker initially estimates i) relative camera poses, ii) 2D positions of the predefined facial landmarks on each image, and iii) 3D vertices corresponding to the 2D facial landmarks. Bundle adjustment then refines both the 3D vertices and the camera poses using a projective camera model. Since the location of the 2D chin points are not accurate at times (see FIG. 13(a)), they are normally excluded in the refinement process. However, if required, it is also possible to add more facial features using a general image feature detector (e.g. SIFT or SURF [27]), as more point correspondences generally help to improve the stability of the bundle adjustment.

Mesh Vertex Classification

The estimated camera poses help us to classify the face model as well. For example, we can determine a vertex class based on either the angle difference between vertex normal and camera viewing direction, or the vertex distance to camera centre. This simple classification is fast and parallelizable but it is not aware of facial features. To address this, the provided method updates the initial class ID of a side vertex to the front, if its projection to the front image falls into a facial mask. The facial mask is approximated as a sum of two masks, i.e. the ellipse fitting of the 2D facial landmarks from a CLM tracker, and the projection of the initial front vertices. This combination can make a resulting mask cover the forehead and chin areas reliably.

For computational simplicity we also assume that the internal camera parameters are always fixed and there is no severe radial distortion. Therefore a projection matrix of an input image can be approximated as a simple linear transform from three parameters: an internal camera matrix K, a rotation matrix R, and a transition vector $\vec{t}$.

The provided reclassification is straightforward but we need to know the vertex visibility before the projection. To address this, we assume that a face is convex and has a single global maximum on the nose, so that it is safe to think that the left side of a face is always visible from the front and the all camera views on the left, e.g. the top row of FIG. 12(b). Similarly, the other side of face is visible from the front and the all camera views on the right, e.g. the bottom row of FIG. 12(b). With this approximated vertex visibility array, the extra runtime occlusion computation by checking the depth buffer can be avoided.

Figure 14:
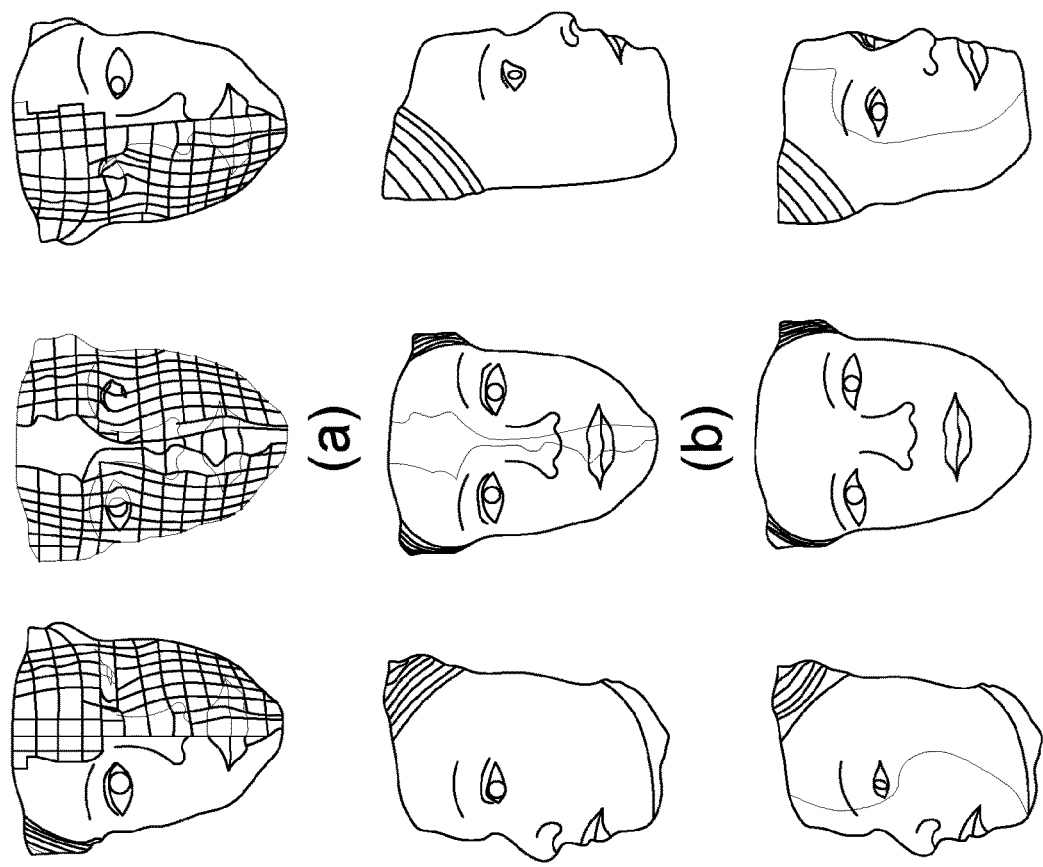
FIG. 14 shows an example of the initial vertex classification for creating the appearance model (see Section 2.2.3): (a): the initial classification result based on a simple heuristics; (b): rendering result of (a); and (c): the reclassification result of (a) in which there is no seam on major facial landmarks.

FIG. 14(a) shows an example of an initial classification. As mentioned earlier, this initial classification normally creates some artifacts around facial features (see FIG. 14(b) for example). However, the refined classification helps avoid this as the colour of major facial landmarks are defined in the same image (see FIG. 14(c) for example).

Colour Balancing between Adjacent Views

The provided mesh classification will not introduce any stitching seam crossing major facial landmarks (e.g. eyes). But that does not mean that there is no seam. In fact, what it does is simply to move the seam outside the facial mask on the front view.

To address the seam from the refinement, the provided method basically updates the colour of the front view. For example, suppose that colour value at the pixel position $\vec{x}$ on the front image $I_C$ is represented as $I_C(\vec{x})=[rgb]^T$. The new colour at $\vec{x}$, $I'_C(\vec{x})$, will be defined as $$I'_C(\vec{x})=I_C(\vec{x})+D_C(\vec{x}), \quad (13)$$

where $D_f(\vec{x})$ is three-channel colour offset at the pixel) $\vec{x}$, i.e. $[r_d g_d b_d]^t$. We can define the preferred colour offset at the boundary, i.e., $$D(\vec{x}_b)=I_L(\vec{x})-I_C(\vec{x}), \quad (14)$$

where $\vec{x}_b$ is the projection of a boundary vertex $v_b=[x\ y\ z]^T$, i.e. $\vec{x}_b=\text{proj}(\vec{v}_b, K, R, \vec{t})$, and proj(.) is a function that projects a 3D vertex to the front image using an internal camera parameter matrix K, and camera pose R and $\vec{t}$. $\vec{v}_b$, can be found easily by checking the class ID of its neighbour vertices, e.g. $\vec{v}$ is a left boundary vertex when at least one of its neighbours have 'left' class ID, i.e. $\vec{v} \in C_C$ and $|N(\vec{v}_b) \cap C_L| > 0$, where N and $C_L$ represent a set of vertices that are neighbouring to $\vec{v}_b$, are having left class ID L, respectively.

The colour offset at a boundary (see FIG. 15(c) for example) is propagated to all image pixels assuming that the offset colour $D(\vec{x})$ is a discrete approximation of a $C^2$ function. Thus, we can estimate the unknown offset values based on the Laplacian condition (see FIG. 15(d) for example), i.e.

$$4D(\vec{x}_c) - \sum_{\vec{x}_i \in N_4(\vec{x}_c)} D(\vec{x}_i) = 0, \quad (15)$$

where $N_4(\vec{x}_c)$ is 4-connected neighbours of a pixel $\vec{x}_c$. Some examples of the processing results of this process can be found in FIG. 15(d) and FIG. 16(b).

2.2.4 Local Highlight Detection and Removal

Highlight Detection

The highlights on the images is another important visual cue that can help us to perceive better the shape of an object. In other words, if we simply combine multiple images from inconsistent illumination conditions, the resulting texture map could deteriorate the realism in rendering.

Highlights are generally caused by a strong specular reflection. Therefore, we need to know underlying geometry and an illumination model to recover true colour properly. Estimating this information from an image is an ill-posed problem and it normally takes a long processing time. To make the problem more feasible, we develop an image-based algorithm that does not need the colour reflection model. This is motivated by the many recent highlight detection algorithms, which can achieve reasonably good results purely based on colour information, e.g. the colour chromaticity [30].

Figure 17:
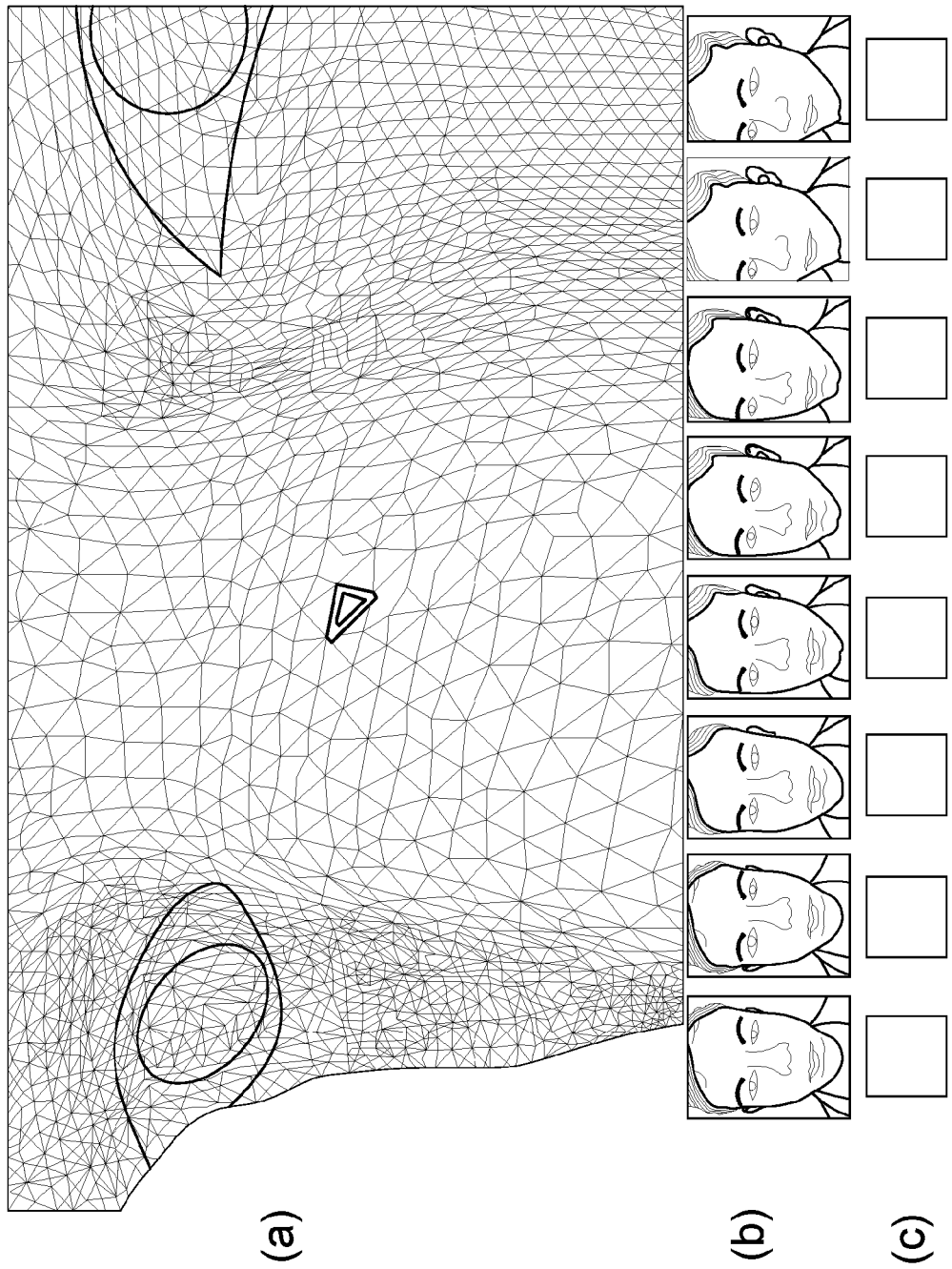
FIG. 17 shows an example of highlight on a close range face image (see Section 2.2.4). The back-projection of a single triangle (a) onto every input image (b) can show how much the colour can vary due to the change of lighting direction in (c). The provided method estimates the probability of highlight for each triangular face based on the intensity distribution.

FIG. 17 (originally in colour) shows an example of how much the colour can vary at a highlighted region. Based on this observation, we come up with a new highlight detection algorithm that can estimate a highlight probability map from the colour difference of a single facet. To retrieve the colour of a facet we back-project the vertices of a facet onto the input images and estimate a 2D affine transform between views. For example, suppose that $f_k$ is the k-th facet of a 3D face model. Since we use a triangular facet, the projection of a single facet is good enough to define a single 2D affine transform between images, i.e.

$$A_{ij}^k \vec{x}_k^i = \vec{x}_k^j, \quad (16)$$

where $A_{ij}^k$ represents an affine transform which can map a pixel $\vec{x}_k^i$ on the i-th image to a pixel $\vec{x}_k^j$ on the j-th image and the subscription k represents that the pixel $\vec{x}_k^i$ is the projection of a 3D vertex in $f_k$.

We then define a rectangular region fitting the projected points on the front view, collect the pixel intensities of this region, and estimate the average intensity. Let the mean intensity of a facet $f_k$ on the i-th image be $m_k^i$. Since we have multiple input images, we can estimate all mean intensities as well as the median of the mean intensities $\{m_k^i\}_{i=1}^n$ of the k-th facet $f_k$ as follows:

$$m_k = \text{median}(m_k^1, \ldots, m_k^n), \quad (17)$$

where n is an index for an input image.

To create a probability map, we use a logistic function working as a switch, which gives a high probability when the difference between the median of the mean intensities and the maximum of the mean intensities is bigger than a certain threshold, i.e., $$p_a(f_k) = \frac{1}{1 + \exp\left(-\left(\frac{m_k - \max(M_k)}{\max(M_k) - \min(M_k)} + \alpha\right)\right)}, \quad (18)$$

where $M_k = \{m_k^0, \ldots, m_k^n\}$ and $\alpha$ is the threshold for the intensity difference. In our implementation $\alpha \approx 70$.

We also find that the highlight regions are generally defined when the median of the mean intensities is high, i.e., a brighter facet is more likely to be a highlighted facet than a darker one. To include this behaviour, we define another logistic function $p_b(f_k)$ as follows:

$$p_b(f_k) = \frac{1}{1 + \exp(-\beta(m_k - \gamma))}, \quad (19)$$

where $\beta \approx 0.25$ and $\gamma \approx 160$ in our system. The final probability function of a facet $f_k$ is simply defined by multiplication of the two probabilities, i.e.

$$p(f_k) = p_a(f_k) p_v(f_k). \quad (20)$$

Figure 18:
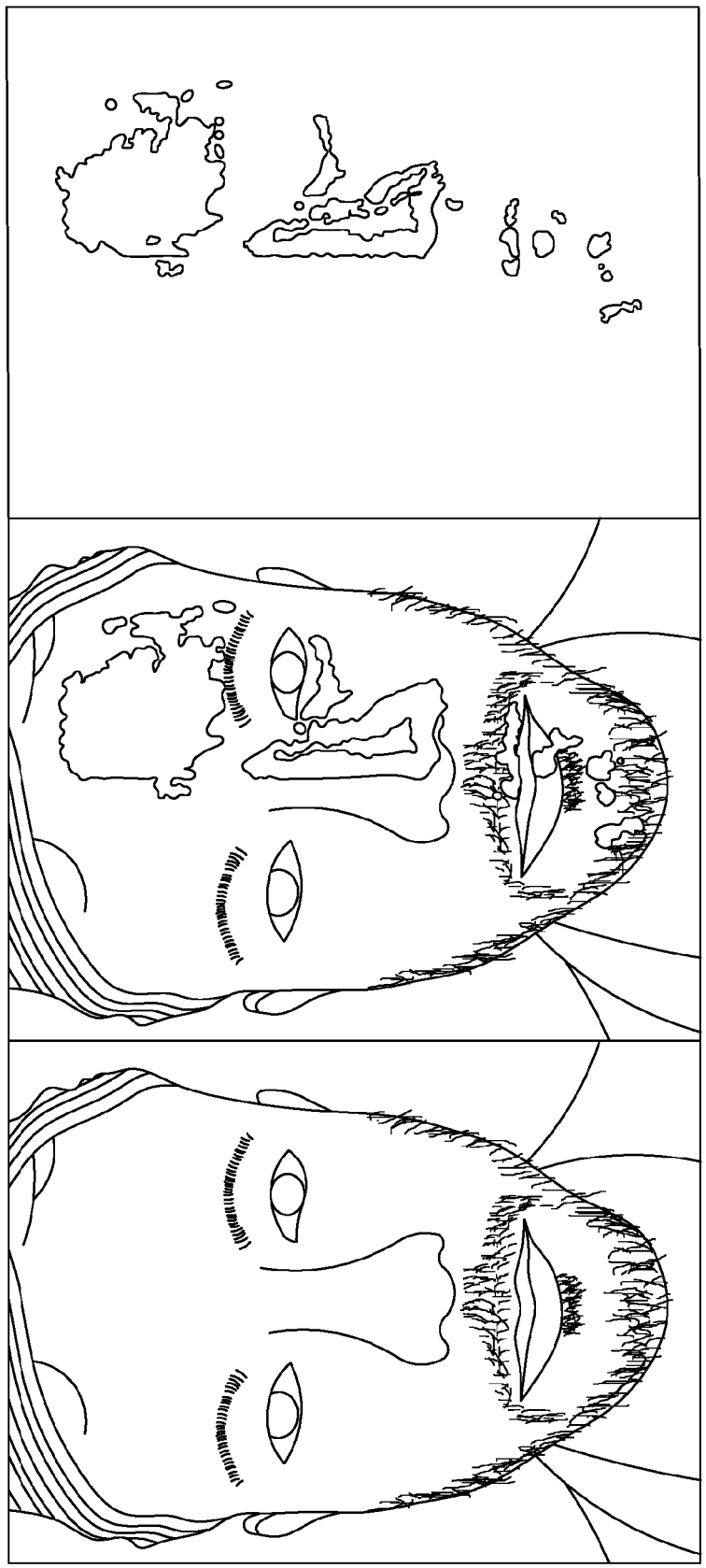
FIG. 18 shows an example of the detected highlight based on the method in Section 2.2.4. (a): the input image; (b): the highlight map overlaid on (a) where the emphasized pixels represent a high probability of being a highlighted pixel; (c): the highlight mask from (b).

Highlight detection results on some face images using the method described above are exemplified in FIG. 18.

Recovering Highlight Free Colour Recovering colour for the highlighted area is a slightly different problem to the colour balancing problem explained in Section 5, i.e. smooth propagation of the colour offset cannot recover the sharp facial features. To address this, we exploit the gradient map of one of the input images as a guide for colour diffusion. This is similar to Poisson image stitching [25]. In other words, the provided method minimises the difference between the gradient of a new front image $\nabla I'(\vec{x})$ and the gradient of the median image, $G_m(\vec{x})=\nabla I_m(\vec{x})$. Therefore, $$\nabla \cdot \nabla I'(\vec{x}) = \text{div} G_m(\vec{x}) \quad (21)$$

so that (15) can be modified into:

$$4I'(\vec{x}_c) - \sum_{\vec{x}_i \in N_4(\vec{x}_c)} I'(\vec{x}_i) = \frac{\partial G_m(\vec{x}_i)}{\partial x} + \frac{\partial G_m(\vec{x}_i)}{\partial y}. \quad (22)$$

To estimate $I_m$ in (22), we combine the median colours of all facets. We may simply implement this by transferring the colour from a different input image to the front image using an affine transform and smoothing the resulting image using a Gaussian filter.

Figure 19:
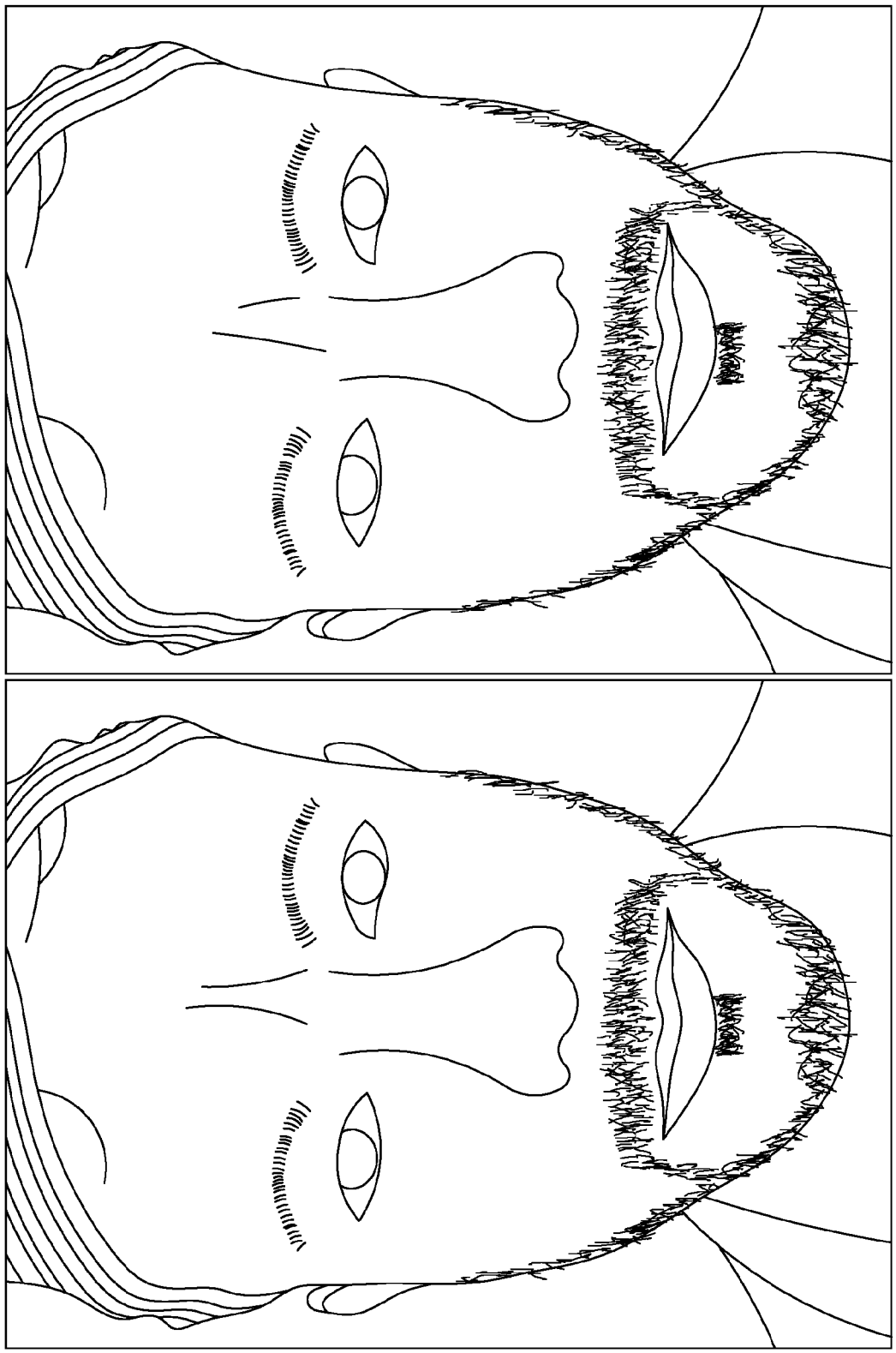
FIG. 19 shows an example of the highlight removal using the method described in Section 2.2.4 before (a) and after (b) using the provided highlight removal approach.

As shown for example in FIG. 19, we can detect the highlight on the nose and the forehead successfully, and replace the affected colour values with new values. One thing to mention about the provided method is that the new colours are estimated based on the assumption that the gradient of one of the input images is close enough to that of the albedo image. Therefore, if all input images are consistently highlighted, it cannot fix the highlight properly, e.g. some forehead regions of FIG. 19(*b*) are still brighter than expected.

The same pipeline may be applied to both side images but our experiment shows that repairing highlights on the front image is sufficient in general.

2.3 From a Raw 3D Face Scan

The third stream of approaches for 3D personalised face reconstruction is to create a user's 3D head model from an arbitrary depth scan or a 3D scan of their face. A raw 3D scan of a user's face can be obtained from three sources:

Source 1: from an image-based 3d reconstruction process using the techniques of structure from motion (SfM) [14] or simultaneous localisation and mapping (SLAM) [12].

Source 2: from a depth scan captured by a commercial depth camera (e.g. Microsoft Kinect, Intel RealSense F200/R200);

Source 3: from a full 3D scan, captured using a 3D scanner, e.g. Artec Eva. Below we describe the detailed processes for creating the 3D geometry and appearance model from the face scan input.

2.3.1 Geometry Processing: Fitting the Raw Face Scan

Although the 3D geometry of the user's face is captured in the input scan data, usually a template mesh fitting process is still required for three reasons:

1. we will have to complete the geometry of the head, as the input scan generally only contains the frontal face geometry (e.g. for Source 1 and 2 scan data);

2. we will need to normalise the mesh topology and resolution;

3. we have to resolve the scale ambiguity for some scan data (e.g. from Source 1).

Figure 20:
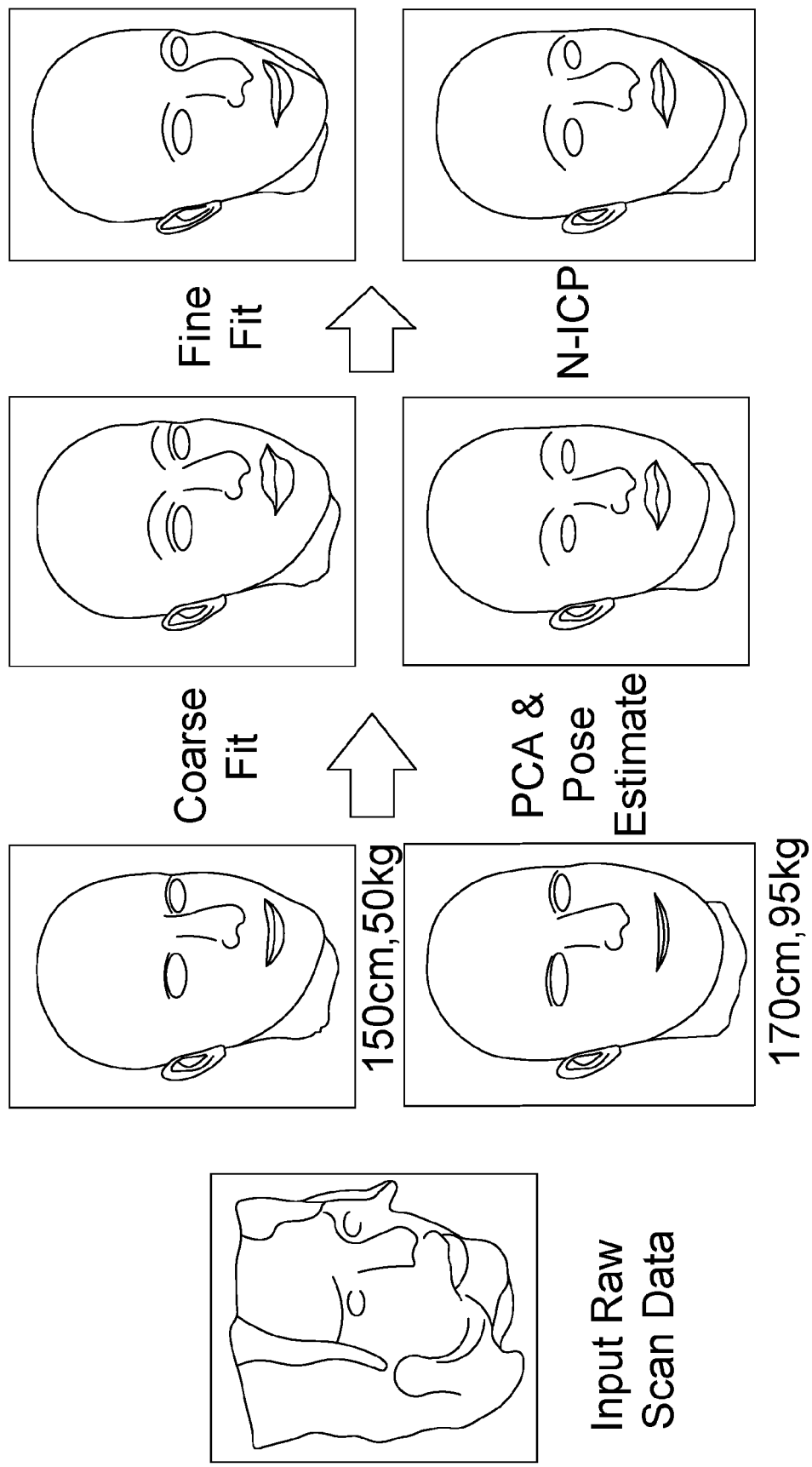
FIG. 20 shows an example illustration of head size estimation using the shape prior, as described in Section 2.3.2. In this example, to model the shape of a user's head, we are using head geometry of the body model predicted from different body measurements as the shape prior to model the shape of the user's head from the scan data.

In the implementation, this can be done using a two-stage mesh fitting process, for example as shown in FIG. 20. In the first stage, i.e. "coarse fit" stage, we introduce a 3D morphable head model (3DMHM) as the shape prior (see e.g. Equation (1)). The geometry of the user's head/face scan Y may be fitted by the morphable head model X by a bundle adjustment optimisation process that finds the optimal shape morph parameters w of the 3DMHM, the 3D head pose parameters p, and an estimation of the global scale s when the scale ambiguity is present. The following equation formulates the problem above for each iteration:

$$\{w^*, p^*, s^*\} = \underset{w,p,s}{\text{argmin}} \|Y_i - sR_3(p) \otimes I_{N \times N}(X_{mean} + wU)\|^2 + \alpha_h \|p - p_0\|^2 + \beta_h (s - s_0)^2, (i = 0, 1, \ldots, I), \quad (23)$$

where $R_3(p)$ denotes a 3×3 matrix parameterized by the pose parameters p, which models a global 3D rotation; $\otimes$ denotes the operator for Kronecker product, which yields a 3N×3N matrices that impose the 3D rotation $R_3(p)$ on all N template mesh vertices; $Y_i$ is the collection of nearest vertices on the input scan data Y which correspond to each of the vertices on the morphable head model at iteration i, and this correspondence is subject to change in each iteration; $p_0$ is a pose prior based on the pose estimation; $s_0$ is a size prior which is an average head scale estimation of the input data; and $\alpha_h$ and $\beta_h$ are the hyper-parameters controlling the weights of the terms. To solve the optimisation problem above, we iterate between 1) finding the nearest vertex set $Y_i$ based on the current morphable model, and 2) solving the minimisation problem using Levenberg-Marquardt algorithm [13] with each iteration. The registered 3D head model of the user X* after the coarse fit stage can be simply reconstructed by $$X^* = X_{mean} + w^*U. \quad (24)$$

In the second stage of the fitting process, i.e. "fine fit" stage, we use the result of the coarse fit X* as the starting point, and further apply a non-rigid iterative closest point (N-ICP) algorithm [3], which deforms the resulting mesh to achieve a better surface matching X with the input face scan data Y, as shown in FIG. 20**.

2.3.2 Head Size Estimation From Body Shape Parameters

The approaches described in Section 2.1.2, 2.2.1 and 2.3.1 model a user's face geometry, but it doesn't model the information about the rest of the head which is not captured in the input image, i.e. the shape of the skull, the volume of the head, etc. To fill in the missing information about the size of the head, we look into the shape prior of a full body morphable model trained on the CAESAR dataset [10] in which the 3D body shape can be estimated from a set of body measurements (e.g. height, weight, bust, waist, and hips). The head part of the regressed body model from tape measurements captures the correlation of head size with respect to body shape over the population and provides a good shape prior (noted as $X_0$) for estimating the shape of the full head model X of the user.

To incorporate the shape prior in the shape predictor or registration process described in Section 2.1.2, 2.2.1 and 2.3.1, we need to reformulate the associated optimisation problems for shape regression and mesh fitting. For each original optimisation problem with an objective function $\Omega$ and a parameter set p, the objective function $\tilde{\Omega}$ of the new optimisation problem with the additional quadratic constraints of head size shape prior can be formulated as follows:

$$p^* = \operatorname*{argmin}_p \tilde{\Omega}(p) = \operatorname*{argmin}_p \Omega(p) + \eta \| M \circ (X(p) - X_0) \|^2, \quad (25)$$

where $\eta$ is a hyper-parameter controlling the influence strength of the shape prior; M is a mask weighting function defined on every vertex v on the head template, which maps the mesh vertices inside the face area to be 0, those outside to be 1, and those close to the boundary region to be a value between 0 and 1 for a smooth transition; a denotes an element-wise multiplication on each vertex. The revised problems in (25) can be solved using the same optimisation methods e.g. ICP [7] or Levenberg-Marquardt [13] algorithms. It is also applicable to the linear regression problem in Section 2.1.2, where the revised regressor becomes a ridge regressor. FIG. 20 gives an example of incorporating the head shape prior in the mesh fitting process described in Section 2.3.1 to model the shape of a user's head from the scan data.

2.3.3 Texture Map Generation for Registered Head Mesh

We also need to transfer the texture from the raw face scan to the registered head model, as illustrated for example in FIG. 21. One technical challenge for generating the texture map of the registered head mesh is that the original texture map(s) of the raw 3D face scan is (are) usually made up of several discontinuous texture patches (see FIG. 22 (left) for example). In such a case, a naive texture sampling scheme, i.e. re-sampling of UV texture coordinate according to their bari-centric coordinates in the triangles of the original mesh and re-using the original texture map generally gives poor results. Since the mesh topology has been changed during the process of 3D registration, the UV texture coordinates of the three vertices of a resampled mesh triangle may belong to different texture patches in the original texture map (we call these "boundary" triangles) and hence they are non-adjacent in UV space. This results in severe texture seam artifacts over those boundary triangles when rendering the re-sampled mesh using a standard rendering engine (e.g. DirectX, OpenGL) which is based on an interpolation mechanism. See FIG. 22 for an example of the seam artifacts after a naive texture sampling.

Figure 23:
FIG. 23 shows an example of augmented texture map used for seamless texture map generation for the registered head model.

In the light of this problem, we may re-generate a different texture map image for the registered face/head model by augmenting the original texture map image of the input face scan. In addition to the original texture, we first re-render those boundary triangles from a camera view in the surface normal direction as additional texture patches in the augmented texture map image, and then re-assign the UV texture coordinates of the triangle to those new texture patches accordingly. This method will resolve the seam artifacts after the mesh re-sampling. See FIG. 23 for examples.

3. Client-side Input Image Quality Control 3.1 Problem Description

To create the face model with the approaches described in the previous sub-sections, a user has to take a selfie (Section 2.1) or a short video of their head turning from one side to the other (Section 2.2 and 2.3), typically using the front facing camera of a mobile device. This image or video is then used as the input to the later modules in the system to reconstruct or digitise a 3D face model and a corresponding texture map.

The accuracy of the output 3D face model is dependent on the quality of the input image or video. The system must ensure that the end result is lifelike and pleasing otherwise there is a risk of the user abandoning the service. It is also important that the user can achieve the desired results without a large amount of trial and error, which again risks causing frustration and ultimately results in a bad user experience.

As the input face images or videos provided by users are mostly taken in an uncontrolled environment, they often contain severe photography issues; from user testing, some typical photography issues can be classified into two types, including:

Illumination issues, i.e. Lighting imbalance or shadows; strong spot highlights (e.g. on forehead or on one side of the face); strong back-lighting (e.g. with a window behind); overall too bright or too dark; coloured lighting; etc.

Contextual problems: i.e. user wearing glasses, wide mouth opening, the user's hair covering key landmarks (e.g. eyes and eyebrows), etc.

See FIG. 24 for some real examples. These bad input images or videos often result in bad head/face models and personalised avatar after the 3D reconstruction and consequently damage the users' satisfaction with the product.

Figure 25:
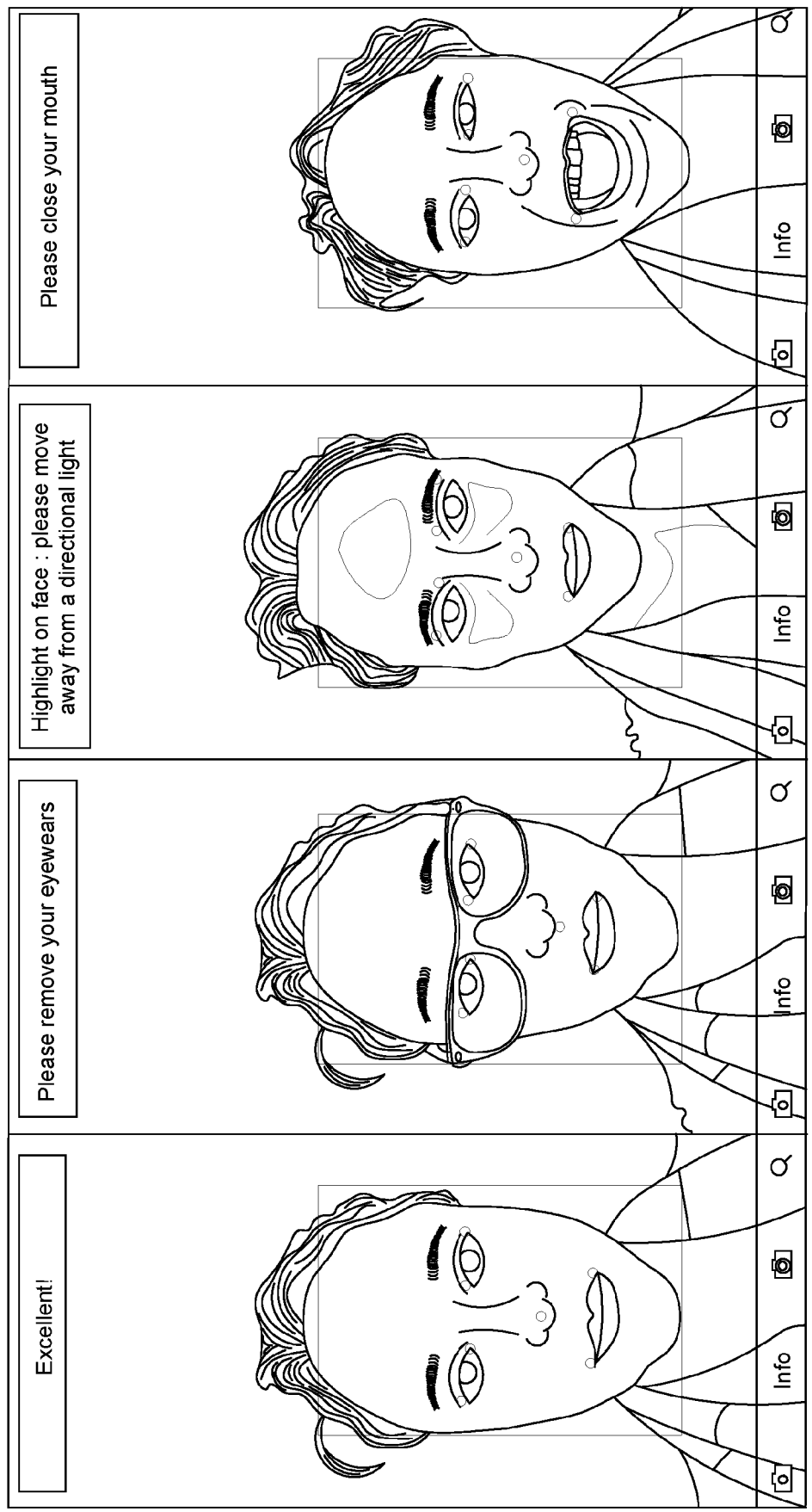
FIG. 25 shows example user interfaces of the client-side input quality detection tool implemented on the mobile device, as described in Section 3.1.

In the light of the problem, we provide a new module in our end-to-end system as a product feature; this new module is responsible for automatic detection of pathological input patterns on the client side before the 3D face reconstruction module. See FIG. 25 for an example UI on iOS. This creates a real-time feedback mechanism to assist the user in the acquisition of good quality image or video.

Prior to starting the video/image capture, the user is presented with a live view of the camera feed. The feedback mechanism analyses the live view and, if necessary, provides the user with recommendations on how to improve the conditions in order to achieve a high quality end result. This mechanism provides a fast feedback loop for the users to quickly correct photography issues themselves and generate a good input before the 3D face/body reconstruction starts. It can help enhance the satisfaction and engagement level of the product by greatly increasing the chance of users to successfully create good-looking head/face models. More implementation details are given in Section 3.2.

3.2 Detailed Implementation

After analysing the sensitivities of the model extraction algorithms, we can identify two broad groups of input quality issues: illumination related problems and contextual problems, as mentioned in Section 3.1.

Incorrect illumination can cause problems both for structure and texture extraction. For example, the location of strong highlights on the face is dependent on the direction of the incident light and tends not to move together with the rest of the face landmarks as the user rotates their head in the video. This effect is problematic for structure extraction algorithms as the highlights can be misinterpreted as static landmarks or obstruct real facial features. Similarly, strong directional lighting, or light sources with high colour content can result in uneven and unnatural skin tones after texture extraction.

Contextual problems cause difficulty mostly during structure extraction and arise owing to the assumptions made and limitations of the algorithms employed. For example, if the user's fringe is covering a portion of their forehead, or if the user is wearing glasses, these structures will be incorporated into the extracted 3D mesh, which as a result shows little resemblance to the shape of a human face.

Quality analysis of the input image is then an image classification problem. We must decide whether any of the problematic conditions is present in the input image. Given enough reference data, we train a machine learning classifier, e.g. a deep convolutional neural network [21, 19, 29], to identify these quality issues. Availability of reference images already classified by in other ways (typically by humans) is a key necessity when applying machine learning. While it is trivial for a human to judge whether someone is wearing glasses or not, it is more difficult to objectively assess illumination problems when manually classifying reference input. Also, the quality analysis must run sufficiently fast on a mobile device to provide real-time feedback during the live video preview. This performance requirement limits our use of some computationally expensive machine learning techniques.

The trade-off we have made is to use machine learning techniques to identify contextual issues, and use heuristics-based statistical image features for illumination-related problems. Contextual issues tend to vary relatively slowly (e.g. it is unlikely that the user will keep taking their glasses on and off at high frequency) hence they can be analysed during alternate frames. Observed illumination can change faster, for example as the user moves through a room, or as the automatic exposure and white balance control of the camera adapts to the lighting conditions. This necessitates analysing illumination at a higher rate, in order to keep the system responsive. We can utilise a lot of prior information based on knowing that the input image contains a frontal face. We can use e.g. average facial proportions and shape, average chromaticity of skin colour and typical skin texture in specific areas, as indicators of the illumination condition.

Figure 26:
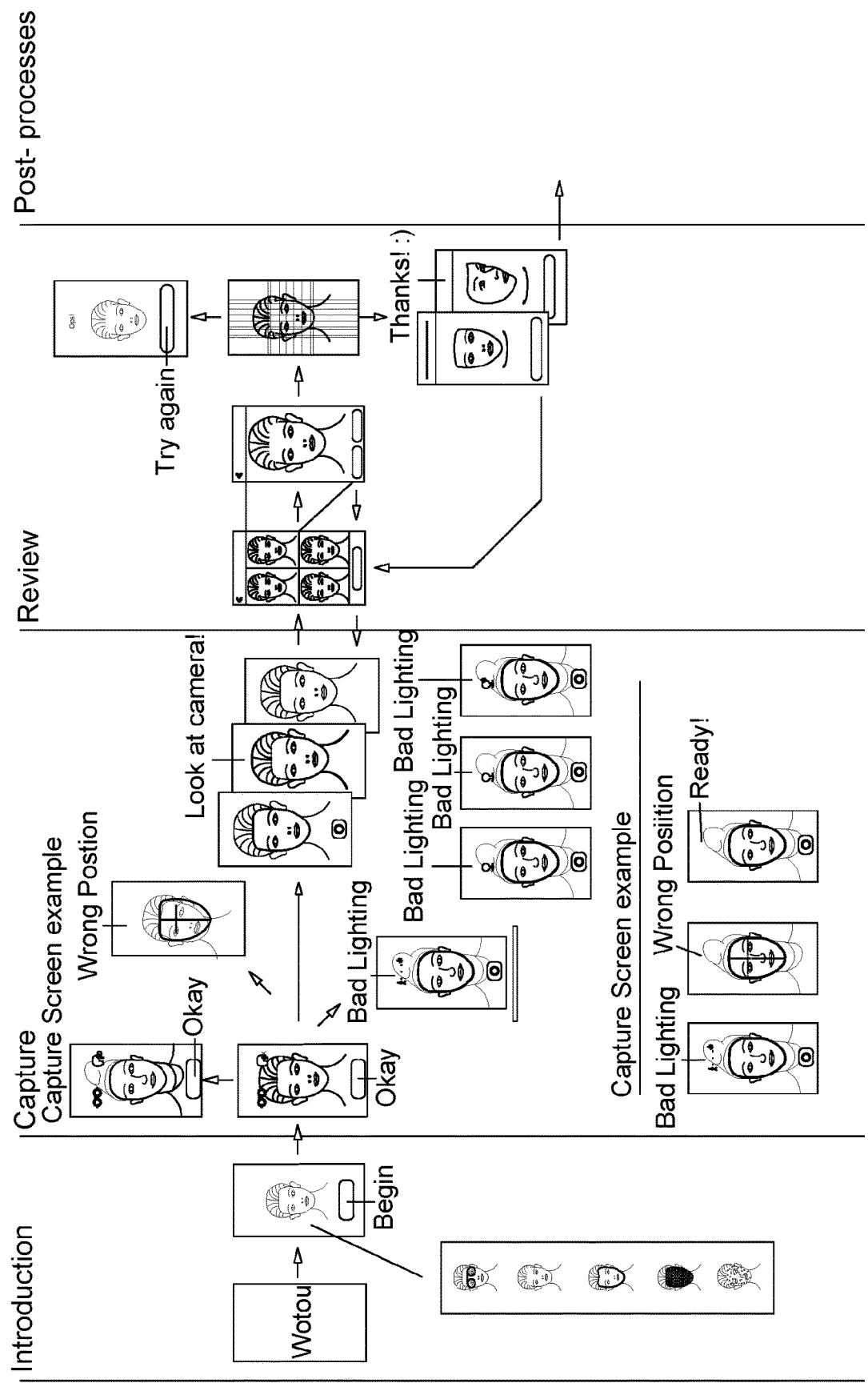
FIG. 26 shows an example of a detailed user flow for single-view-based 3D face model creation mobile application using the approach described in Section 2.1. In the user flow, an input quality analysis module described in Section 3 is integrated.

In summary, we have implemented the quality analysis as a multistage algorithm, which analyses the live video preview one frame at a time, while utilising the inter frame correlation for increasing efficiency. The output is a set of scores in a predefined range which are indicative of the presence of a quality issue. The summary of the algorithm is given in Algorithm 2. Also, FIG. 26 gives a detailed example user flow of a mobile application for single-view-based 3D face model creation (Section 2.1) with an input quality analysis module integrated.

Algorithm 2—An algorithm summary of the input image quality analysis module.

1. Use Viola-Jones face detection [31] for finding the coarse location of the face in the frame. The search is restricted to a region around the location of the face in the previous frame.

2. We use a fast machine learning based algorithm to accurately locate a few important facial landmarks. Using known typical spatial relations amongst the facial landmarks, we compute a more precise estimate for the location and orientation of the face within the frame.

3. Based on the facial landmarks and precise position estimate, we can extract normalised sub regions from the frame.

4. The normalised sub regions are scored for illumination problems using heuristics designed for the specific conditions as they would manifest in a normalised image.

5. Individual contextual problems are scored on alternate frames using convolutional neural networks 6. A set of standardised quality scores is presented to the recommendation logic. The problem of computing an improvement recommendation can be considered another classification problem. The inputs in this case are the scores from the image quality analysis algorithm, and the possible output classes represent the most pressing problem with the image. This final classification can then be used to provide the user with feedback on how to alter the input to achieve good results.

4 Personalised Body Shape Modelling

In this section, we describe several distinctive approaches and user interface (UI) designs for body shape modelling, which can be used to help users create personalised 3D body avatars that can capture their own body shape characteristics precisely.

A typical statistical body shape modelling mechanism used for online virtual fitting is based on a regression-based approach [10]. In the algorithm, a regressor (including but not limited to a linear regressor, a Gaussian processes regressor [10], or a neural network [21]) is taught from a set of pairwise training data to provide a mapping from the user's commonly used body metric (including but not limited to height, weight, and cup sizes) and most well-known tape measurements (including but not limited to bust, weight, and hips) to the parameters of a low-dimensional statistical morphable body model, which can be used to reconstruct the full 3D body shape. For example, the parameters will be weights of principle components, if PCA-based morphable body model is implemented [2]. The current regression-based approach gives an average modelling error of 2-3 cm over major body measurements when 6 input measurements (i.e. height, weight, cup size, underbust, waist, and hips) are provided [10]. Since the regression-based approach uses a small number of measurements as input, and it doesn't fully capture the complete body shape details of the user owing to information loss and the lack of constraints involved in the shape reconstruction process. As a consequence, two major pathological problems of the existing body shapes are noted based on the feedback of user testing:

The body avatar has poor accuracy over those body areas where no measurement is defined. For example, with a 6-measurement body regressor (height, weight, cup size, underbust, waist, and hips), many users find that the leg length, the thigh width, or the arm length of their avatar appear wrong.

Users also find that subtle body shape variations (e.g. lumps and bulges around the stomach area, muscle tones) of their body shapes are not captured in the avatar. This is caused by the fact that the resulting body avatar generated by the regressor which models a smoothed statistical average of all the body shapes which have the specified input measurements.

In the subsections below, we describe several distinctive approaches and related user interface (UI) designs that can help the user further constrain their body shape, improve the accuracy of 3D body modelling, and personalise their body avatar in view of the problems above. These approaches can also be combined together to achieve better body modelling accuracy.

4.1 Using a Third-Party Full-Body Scan

The first approach is to create high-definition 3D body profiles usable for outfitting and visualisation directly from full-body scans of the users if they have got access to a laser scanner.

Although the full body scan input data captures most of the 3D geometry of the user, the scans can be noisy with holes and outliers. A template mesh fitting process is thus necessary for regularizing and normalizing the mesh topology and resolution. Unlike the body scan data in CAESAR dataset [26], for most of the third-party laser scan data no anthropometric landmarks (markers) are available. This poses a challenge for achieving the good shape registration based on iterative closest point (ICP) [7] and derived algorithms. This is because the ICP algorithm optimises over the transform parameters of every vertex, and the algorithm is hard to converge into a global minimum without good initialisation and guidance of correspondence. Markers (a.k.a. landmarks) can give constraints on global shape correspondences, without them it is highly likely that the ICP algorithm will converge on a local optimum.

Figure 27:
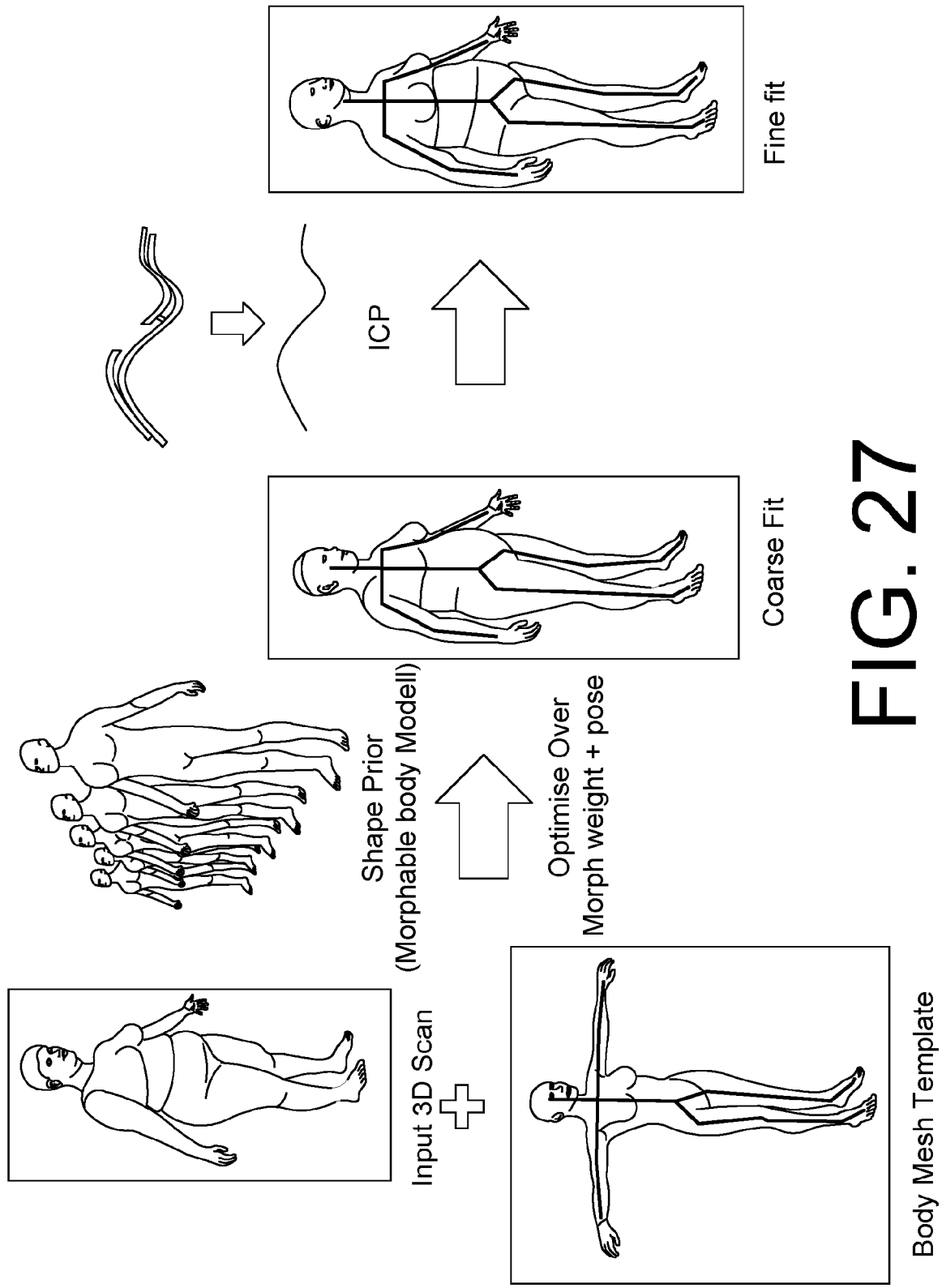
FIG. 27 shows an example pipeline of the two-stage markerless body mesh fitting algorithm provided in Section 4.1.

To address the problem above, we provide to use a two-stage algorithm which is similar to the one described in 2.3.1 for the purpose of markerless human mesh fitting, as illustrated for example in FIG. 27. To substitute for the missing shape constraints provided by the marker correspondences, we use a morphable skeleton body model $M_b$, which is pre-trained on the CAESAR dataset [10], as a shape prior of human body shape to give additional global constraints for the optimisation problem.

In the first stage of the mesh fitting process, we perform a coarse-fitting of body shape and pose under the constraint of the 3D human shape prior. The optimisation is formulated as a bundle-adjustment-like problem, in which we minimise fitting error E over the PCA morph parameters w and bone poses p in each iteration, as the following equation (26) shows:

$$\{w^*, p^*\} = \underset{w,p}{\operatorname{argmin}} E(w, p) = \underset{w,p}{\operatorname{argmin}} \|M \circ (Y_i - M_b(w, p))\|^2 + \alpha_b \|p - p_0\|^2 + \beta_b \|w\|^2, i = 0, 1, \ldots, I, \quad (26)$$

where $Y_i$ is the collection of nearest vertices on the input scan data Y which are corresponding to each of the vertices on the morphable body model at iteration i, and this correspondence is subjected to change in each iteration; M is a binary mask defined on each vertex of the template model with 1 in the region of interest and 0 otherwise, which is used to exclude the noisy (i.e. producers of positional noise) body regions (e.g. the head, hands, and feet) in the mesh fitting process; $p_0$ is a pose prior based on a rough body pose estimate of the input laser scan data; and $\alpha_b$ and $\beta_b$ are hyper-parameters regularizing the parameters to avoid unrealistic body shape and pose combinations. To solve the optimisation problem above, we iteratively find the nearest vertex set $Y_i$ based on the current morphable model, and optimise the model parameters $\{w, p\}$ using the Levenberg-Marquardt algorithm [13] with the new point-correspondence. In the implementation we optimise on 30 morph parameters and 18 joint parameters. After the mesh fitting stage, we can obtain a mesh fitting result with about 3 mm RMS error to the input scan data.

In the second stage, given the coarse-fitting result as the starting point, we then apply a fine-fitting of the geometry and also refine the bone poses with an ICP algorithm [2]. Given that the geometry of coarse-fitting result is normally sufficiently close to that of the input scan and as it gives such good initialisation, the ICP algorithm will have a good chance to converge into the global optimum we expect. This final fitting result is able to achieve about 0.5 mm RMS error compared with the input scan data.

The two-stage approach above can be generalised to take into account multiple input depth scans of K different camera views for the mesh fitting. For example, the optimisation problem in (26) becomes one of minimizing fitting error over the PCA morph parameters w and pose parameters $\{p^*_k\}_{k=1}^K$ in the K distinct views for each iteration, as follows.

$$\{w^*, \{p^*_k\}_{k=1}^K\} = \underset{w,\{p_k\}_{k=1}^K}{\arg\min} E(w, p) = \underset{w,\{p_k\}_{k=1}^K}{\arg\min} \sum_{k=1}^K \|M \circ (Y_{k,i} - M_b(w, p))\|^2 + \alpha_b \sum_{k=1}^K \|p_k - p_{k,0}\|^2 + \beta_b \|w\|^2, i = 0, 1, \ldots, I, \quad (27)$$

where $Y_{k,i}$ is the collection of nearest vertices on the input scan data $Y_k$ in the k-th view (k=1,2, ..., K), which are corresponding to each of the vertices on the morphable body model at iteration i, and their correspondences are subjected to change in each iteration; $p_{k,0}$ is a pose prior based on a rough body pose estimate of the input laser scan data in k-th view and the known setting of the camera. An example of using K=3 depth scans from Microsoft Kinect camera to reconstruct the user's body shape, as shown in FIG. 28.

4.2 Using an Interactive Interface for Body Shape Refinement

The second approach we provide is to use an interactive UI to help users refine their 3D body avatar and edit their own body tone easily. The UI is built based on a dimension reduction algorithm (e.g. PCA), which models the distribution of 3D modelling error of the body shape regressor and allows the users to fill in their missing body shape variation efficiently.

4.2.1 Modelling Body Shape Residuals

We assume a training data set T, which contains a number (say M) of 3D body shape instances $\{X_1, X_2, \ldots, X_M\}$ (e.g. in the form of 3D laser scans) and their associated measurements $\{m_1, m_2, \ldots, m_M\}$ defined at specified fit points (e.g. bust, underbust, waist, hips, thigh girth), is available. An example of such a dataset is Civilian American and European Surface Anthropometry Resource Project (CAESAR) [26]. Let X be the 3D geometry of the template mesh fitting result of a 3D body scan in the training dataset T. Mathematically, X is in the form of a 3N-d vector, which concatenates the 3D positions of all its N mesh vertices $\{v_1, v_2, \ldots, v_N\}$ as follows:

$$X = [v_{1x}, v_{1y}, v_{1z}, v_{2x}, v_{2y}, v_{2z}, \ldots, v_{Nx}, v_{Ny}, v_{Nz}]. \quad (28)$$

Let m be the vector of body measurements at defined fit-points corresponding to body shape. Let X' be the reconstructed 3D body shape from measurement vector m using the regressor R, which is trained on either the dataset T or on a different training set T'.

$$X' = R(m). \quad (29)$$

We assume that there is a vertex correspondence between X and X'. The shape residual r of a body shape instance is modelled by $$r = X - X' = X - R(m), \quad (30)$$

which defines the difference between the regressed body shape and the ground truth (i.e. the template mesh fitting result of the original body scan).

By using (30), we compute all those shape residuals $\{r_1, r_2, \ldots, r_m\}$ on all the body shape instances $\{X_1, X_2, \ldots, X_M\}$ in the training set T, in which we compute the regressed body shapes $\{X'_1, X'_2, \ldots, X'_M\}$ from their corresponding measurements $\{m_1, m_2, \ldots, m_M\}$ given in the dataset using the body regressor R. We then apply a dimension reduction algorithm, (including but not limited to principal component analysis (PCA)), to the above shape residuals to learn a low-dimensional subspace model M, which captures the body shape modelling error of the body regressor R over shape residuals $\{r_1, r_2, \ldots, r_M\}$ across the population of the dataset T. In the case when PCA is used as the dimension reduction approach, the shape modes will be corresponding to the first K principal components $(pc_1, pc_2, \ldots, pc_K)$.

4.2.2 UI Designs for Refining Body Shapes

For the user interface, we adopt a two stage process as illustrated in FIG. 29. In the first stage, the user can generate an initial 3D body avatar X' from the input of their body measurements m through regression, as shown in (28). In the second stage (see FIG. 29), a few sliders (say K sliders) are then displayed to the user for the user to refine the body shape interactively from the initial 3D body avatar X' generated in the first stage. Each slider will control a unique mode of body shape variation. We use the shape modes of the residual model M defined in Section 4.2.1) to define the fine-gained body shape variation. The k-th slider (k=1,2, ..., K) corresponds to the k-th principal component of the model M. When the data distribution of the body shape residuals are approximately of a multi-variate Gaussian distribution, a PCA model can be used to model residuals. The range of the k-th slider (k=1,2, ..., K) is defined by $$[-t\sqrt{\lambda_k}, t\sqrt{\lambda_k}], \quad (31)$$

where $\lambda_k$ refers to the eigenvalue corresponding to the k-th principal component $pc_k$ (k=1,2, ..., K) of the model M, and the square root of which corresponds to the standard deviation of the data distribution in the direction of such principal component; t defines the range of the slider in the unit of standard deviations, and we choose t=3 in the implementation. When a PCA model is used to model residuals, the refined body shape X" is generated by the formula:

$$X'' = X' + \sum_{k=1}^{K} w_k pc_k, \quad (32)$$

where the weight $w_k$ (k=1, 2, ..., K) is obtained from the reading of the corresponding slider for refining body shape variation, and $pc_k$ (k=1, 2, ..., K) represents the shape morph defined by each principal component. More generally, if an arbitrary K-parameter subspace model M is used to model residuals, the refined body shape X" is then generated by the formula:

$$X''=X'+M(w)=X'+M(w_1,w_2,\ldots,w_K), \quad (33)$$

where the weight $w_k$ (k=1,2, ..., K) is again obtained from the reading of the corresponding slider for refining body shape variation.

In the UI design, some tools can be implemented to help the users revise their body models more accurately, e.g. a side-by-side display or an overlaying display of the user's photo and the rendered avatar X" so that the user can match the silhouette of the body avatar with theirs. Additionally, the vector of body shape variation weights $w=(w_1, w_2, \ldots, w_K)$ (i.e. the value of the sliders) can be automatically initialised through an optimisation process, in which we minimise the difference between the silhouette $S_{user}$ of the user's body shape, which is extracted from a frontal view photo of the user and is normalised by the body height, and the silhouette S(X") of the frontal projection of X", which is normalised by the body height, as follows:

$$w^* = \underset{w}{\operatorname{argmin}}\, d(S_{user}, S(X'')) = \underset{w}{\operatorname{argmin}}\, d(S_{user}, S(X' + M(w))), \quad (34)$$

where $d(\cdot,\cdot)$ refers to a distance metric that compares the differences of two silhouettes, which includes but is not limited to Chamfer matching [5] and Hausdorff Distance [17].

4.2.3 Summaries and Possible Extensions

The modes of subtle body shape variation generated in Section 4.2.2 are defined in the residual shape space. Hence, they are orthogonal to the shape space of the regressor, which is defined by the input measurements. This implies that when the user makes adjustment to their body shape through the UI, the change would have minimal ramifications to the measurements over those keys fit-points defined by the input. This property will ensure that a garment size/fit-advice based on the fit-point measurements (e.g. bust, waist, and hips) are unaffected by the provided body shape editing.

The dimension reduction and subspace approach has the property of energy compaction. This implies that a user could potentially use a minimum number of sliders (i.e. the parameters of the subspace model) to model the residual body shape variation missing in the regressor output.

The range of each body shape variation slider is bounded by the distribution of data which are used to train the statistical model, e.g. we can define the range to be t=±3 standard deviations for each principal component, if PCA is applied. As a consequence, the combination of different modes of body shape variation generated from the UI will fall within the modelling range of the statistical model. This helps prevent the user from generating an unrealistic body shape through the UI.

The provided interactive method can also be applicable to model body shape variation of a new ethnic group and improve the result of a body shape regressor trained on an existing dataset. This is done by filling in the shape variation between the current regressor and the target body shapes, when an additional training dataset (i.e. T' mentioned in Section 4.2.1) is present for the purpose of model calibration.

4.3 Requesting Additional Measurements Using a Measurement Selection Process The third approach for body shape personalisation is a UI in which users will be instructed to provide their body measurements incrementally to further constrain the body shapes. In the UI, users will be shown a small subset of candidate measurements, called the most informative measurements. They could choose to provide one or more of these provided measurements based on their knowledge or self-measurements.

Figure 30:
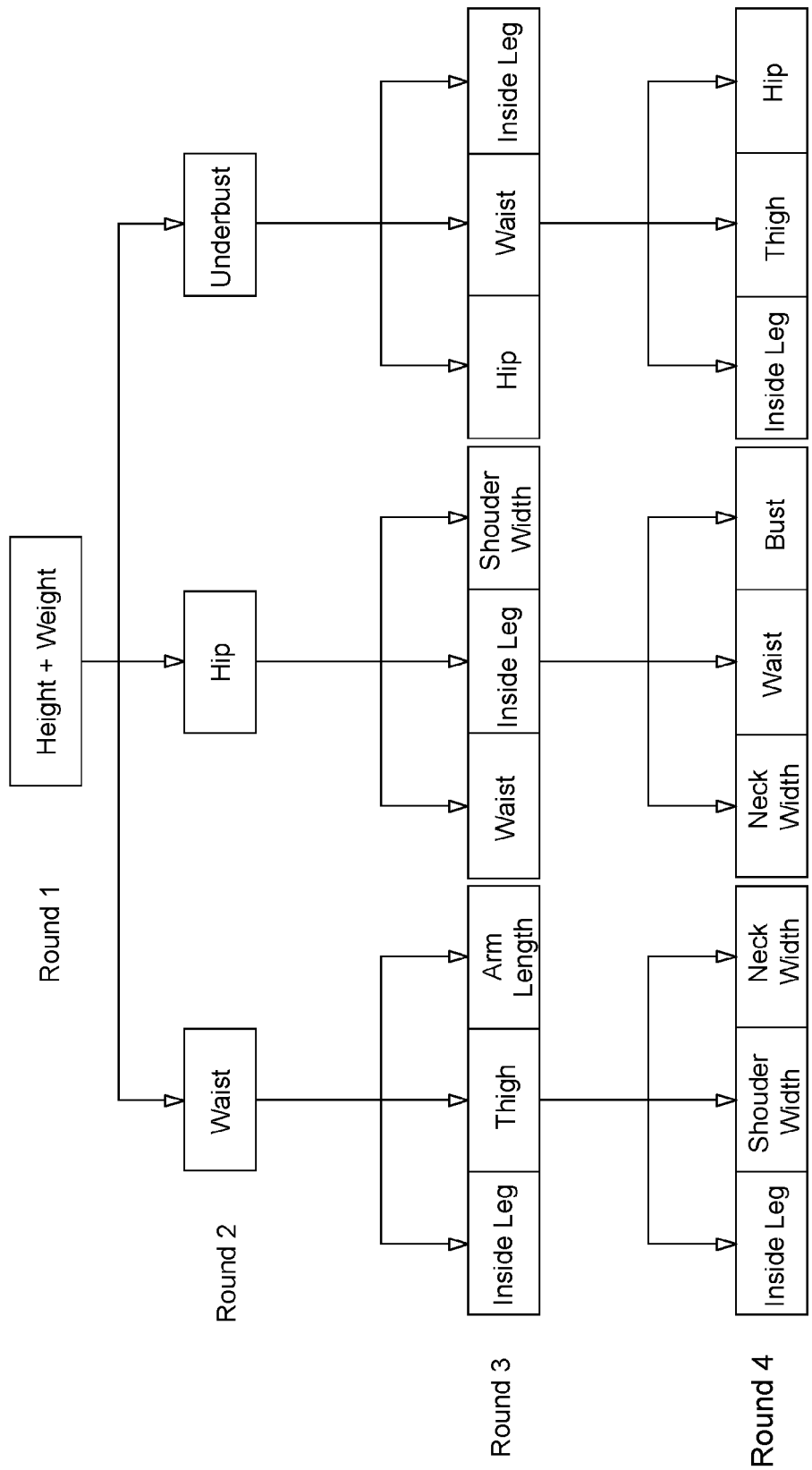
FIG. 30 shows a simplified example of a most informative measurement selection process based on a decision tree, as described in Section 4.3.

To select the candidate measurements, a decision tree (see FIG. 30) can be used to decide what is(are) the next measurement(s) that would provide the most constraints to the body shape based on the current set of measurements which the user has supplied. The process of selecting additional measurements is incremental and it is based on a criterion of maximizing information or minimizing probable residual body shape variation given the existing set of measurements. This can be in the sense of either 1) minimizing the total body shape residual error in (30) for the next measurement, or 2) maximizing the reduction in the prediction error to the given next measurement. As an example illustrated in FIG. 30, given the user provided measurements of height, weight, and waist, the three most-informative measurements that will help the user to constrain their body shape most are: inside leg length, thigh circumference, and arm length. If the user supplies their thigh circumference, the next three informative measurements will be the inside leg length, shoulder width, and arm length. The aim is to allow the user to reconstruct a most accurate body model with a minimum set of measurements. An example of the implementation is as follows:

1. Evaluate the 3D reconstruction errors of all different body shape regressors based on different sets of measurement input over a specified body shape dataset;
2. Evaluate the decrease of 3D reconstruction errors by introducing each new measurement as the extra measurement on top of the existing set of measurement input for body shape regression;
3. Pick the measurement(s) that will give the maximum error decrease. The UI allows a user to supply most informative measurement one after another to refine the body shape incrementally.

The UI can be integrated with the API of digital tape/string/ultrasonic measurement devices with Bluetooth data transfer mechanism. This would allow users to easily transfer the measurement data on to the virtual fitting room UI while taking their self-measurements. The UI may give users the feedback of a body shape, and ask them which area they believe has the largest error in order to guide the next measurement selection process.

4.4 Using Additional Questions and Surveys

The fourth approach for body shape personalisation is to use a question and survey based UI. A simplified example pipeline of a two-stage survey-based UI is given in FIG. 31. Besides the standard body measurement inputs (e.g. height, weight, underbust, waist, hips, cup size, etc.), this UI will involve presenting users with a short survey that will ask users additional questions about their body shape attributes, shape-awareness, and their lifestyle. This would include but is not limited to:

"Do you classify yourself as being athletic?";
"How many hours of exercise you do every week?";
"How would you classify your type of body shape? (hourglass, column, pear, or apple)", etc.

The answers to these questions, in the form of a set of numerical or semantic body attribute labels, will deliver additional information to constrain body shape information from users. We can learn: 1) a mapping from a set of numerical body definition labels or semantic attributes (encoded as binary or discrete variables) in combination with other numerical body measurements to the subspace of body shape variation (i.e. the morph parameters of the morphable model) using regression tools (e.g. linear regression), which is similar to the process described in Section 4.2.1, or 2) multiple regressors/mappings from body measurements to the parameters of the morphable body model, with each regressor trained on the data grouped by semantic body definition labels or attributes. Then, along with the existing body metrics and measurements we have from the user, we could reconstruct the user's body shape more accurately. An optimisation approach is used to find out the best set of body attribute questions to ask in the UI that would yield the most accurate body shapes. This is done based on the criterion of both minimizing the number of questions and minimizing the 3D reconstruction error of the body shape.

4.5 Using Mobile Photography or Scans

The fifth approach is to use mobile photography or scans to capture local shape variation of the user. Besides the standard body measurement inputs, users will be instructed to use the camera on the mobile device (a phone or a tablet) to take a short video sequence or a few photos of themselves (in different camera viewpoints) either of their full body or around a particular body region, e.g. the waist area. An algorithm based on image feature detection (e.g. using a SIFT [23] or Harris corner [15] detector), and structure from motion (SfM) [14] or simultaneous localisation and mapping (SLAM) [12] can be used to reconstruct the 3D surface of the user body shape over the specified body region. This reconstructed geometry can then be used to 1. Estimate or refine the tape measurements over the specified body region (e.g. waist circumference); or extract new additional measurements automatically from the scan.
2. Define and complement the detailed shape variation and/or body tone over the specified regions on the virtual avatar. We can use visual edge detection techniques [15, 24] coupled with accelerometer data to measure the horizontal extent of body.

4.6 Exploiting the Correlation between User's Face Shape and User's Body Shape

The sixth approach is to mine out additional body shape information about the users from their face image input by exploiting the correlation between the face geometry and appearance, and their body shapes.

Users' face geometry and appearance usually deliver some information of their body shape. For example, the shapes of jaw, cheeks, and neck are good indicators of the body fat percentage of the user. A mapping can be learned from the features of a user's face geometry and appearance (including the 2D face landmark positions, the face skin colour, etc.) to the subspace of body shape variation residues using regression tools (e.g. linear regression). Combined with the existing body metrics and measurements we have from the user, we could reconstruct the user's 3D body shape more accurately.

5 Unified Body Modelling by Integrating Head, Body, and Hairstyle Models Once we have obtained the individual components of the user's 3D face/head model and their 3D body shape model via the processes described in Section 2 and 4 respectively, we may combine the elements to create a unified visualisation of the user's personalised 3D avatar. This requires us to overcome the following challenges:

Head geometry attachment: i.e. we need a solution to merge the 3D geometry of the body model and the head model in a natural manner. See Section 5.1 for details.

Skin tone matching: i.e. we need to perform a skin-tone matching between the user's face/head model and the rest of their body, to generate a consistent appearance model for the whole body. See Section 5.2 for details.

Hairstyle modelling. To complete the visualisation of the user's body avatar, we will also need to include a hairstyle model. This involves solving the problem of how to render a photo-realistic hairstyle on a user's head model and how to model hairstyle for different body shapes. See Section 5.3 for details.

The avatar integration module mentioned in Section 1 incorporates algorithmic features to address the three challenges above, and it manages to achieve the unified personalised 3D avatar as shown in FIG. 32. The rest of the section will describe these approaches in detail.

5.1 Head Attachment and Geometry Merging

Let H be the 3D head model created by approaches in Section 2 and it is modelled by a N×3 matrix which contains the 3D position of all its N vertices. $H_B$ refers to the head part of the user's body shape model B (which is created by approaches in Section 4). In the head attachment process, we assume that the vertex correspondences are given between H and $H_B$. This can be achieved by sharing the same mesh topology between the head template and the body template which are used in all the 3D shape registration and regression processes, as described in Section 2 and 4 respectively.

As the first step of the head attachment process, we need to estimate a linear transform T that will re-position and re-scale the head model H so that the transformed result $H_T$=TH will align with the head of the body shape model B. We start with estimating an affine transform $T_{affine}$ from all the corresponding vertices $\{v_{H,i}\}_{i=1}^{N}$ and $\{v_{H_B,i}\}_{i=1}^{N}$ of H and $H_B$ using a least-squares direct linear transformation (DLT) [16] as follows.

$$T_{affine}=(\tilde{H}^T\tilde{H})^{-1}\tilde{H}^T\tilde{H}_B, \quad (35)$$

where $\tilde{H}$=[H, 1] is the homogeneous counterpart (a N×4 matrix) of the head vertex position matrix H.

Then, in order to maintain the rigidity of the head model after the transform, we further apply a QR factorisation to the transform matrix estimated from the DLT, $$T_{affine}=QR, \quad (36)$$

where Q is an orthogonal matrix and R is an upper triangular matrix. We then remove the skew components of $T_{affine}$ by replacing the upper triangular matrix R of the transform with a diagonal matrix $\Lambda_R$=diag($S_R$, $S_R$, $S_R$, 1), where the scaling factor $$s_R = \sqrt[3]{\det|R|}.$$

The final transform T is in the form of:

$$T=Q\Lambda_R. \quad (37)$$

And finally, the transformed head model $H_T$ can be computed as:

$$\tilde{H}_T=T\tilde{H}, \quad (38)$$

where $\tilde{H}_T$ and $\tilde{H}$ are the homogeneous counterparts of $H_T$ and H respectively. After the above head geometry alignment process, we apply a weighted geometry blending around the set of boundary vertices $V_{boundary}$ of the head model H in order to generate a smooth merge with the body shape model around the neck area.

$$v^*_i=(1-w_i)v_{H,i}+w_iv_{H_B,i}, \quad (39)$$

where the weighting factor $w_i$=max(1, n/$N_r$) if vertex i is an n-ring neighbour (n=0,1,2, . . . , $N_r$) to any vertex v∈$V_{boundary}$. We choose $N_r$=3 in our implementation. The weights $w_i$ can also be computed based on the mesh edge distance to $V_{boundary}$ or using other diffusion models.

Figure 33:
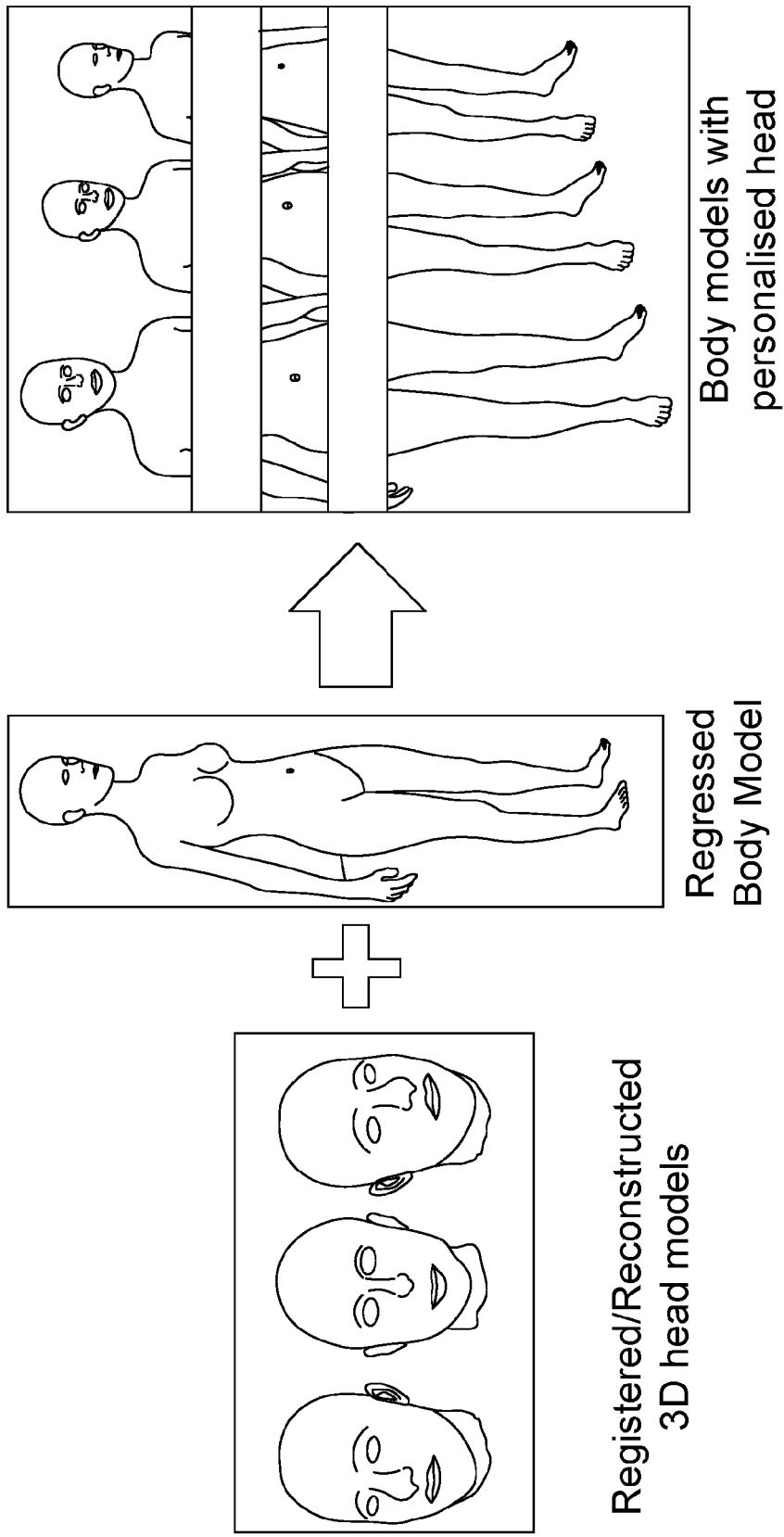
FIG. 33 shows an illustration example of attaching different head models onto the same body shape model, as described in Section 5.1.

The approach described above allows us to attach and merge a user's 3D head model onto an arbitrary 3D body shape model generation in Section 2. Examples are given in FIG. 33. It can also be applied for applications that involves e.g. 1) swapping the heads of two users who are friends, or 2) transplanting a user's head model onto the body model of a celebrity and vice versa, etc.

5.2 Automatic Skin-Tone Matching and Skin Texture Blending

Being able to match the skin tone of the virtual avatar to that of the user's face is an important product feature for photorealism of the personalised virtual avatar. To generate a personalised skin texture, we first estimate a global colour transform from the body skin colour space to the head skin colour space (see Section 5.2.1) and then use this colour transform to propagate the face skin-tone to the texture of the rest of the body. To achieve a better colour transition between the face and the body, we apply alpha colour blending when rendering the personalised avatar (see Section 5.2.2), and also implement a re-lighting algorithm (see Section 5.2.3) to improve the lighting balance of the input face texture. Below we describe each of the features above in detail.

5.2.1 Skin-Tone Matching With an Estimation of Linear Colour Transform

Figure 34:
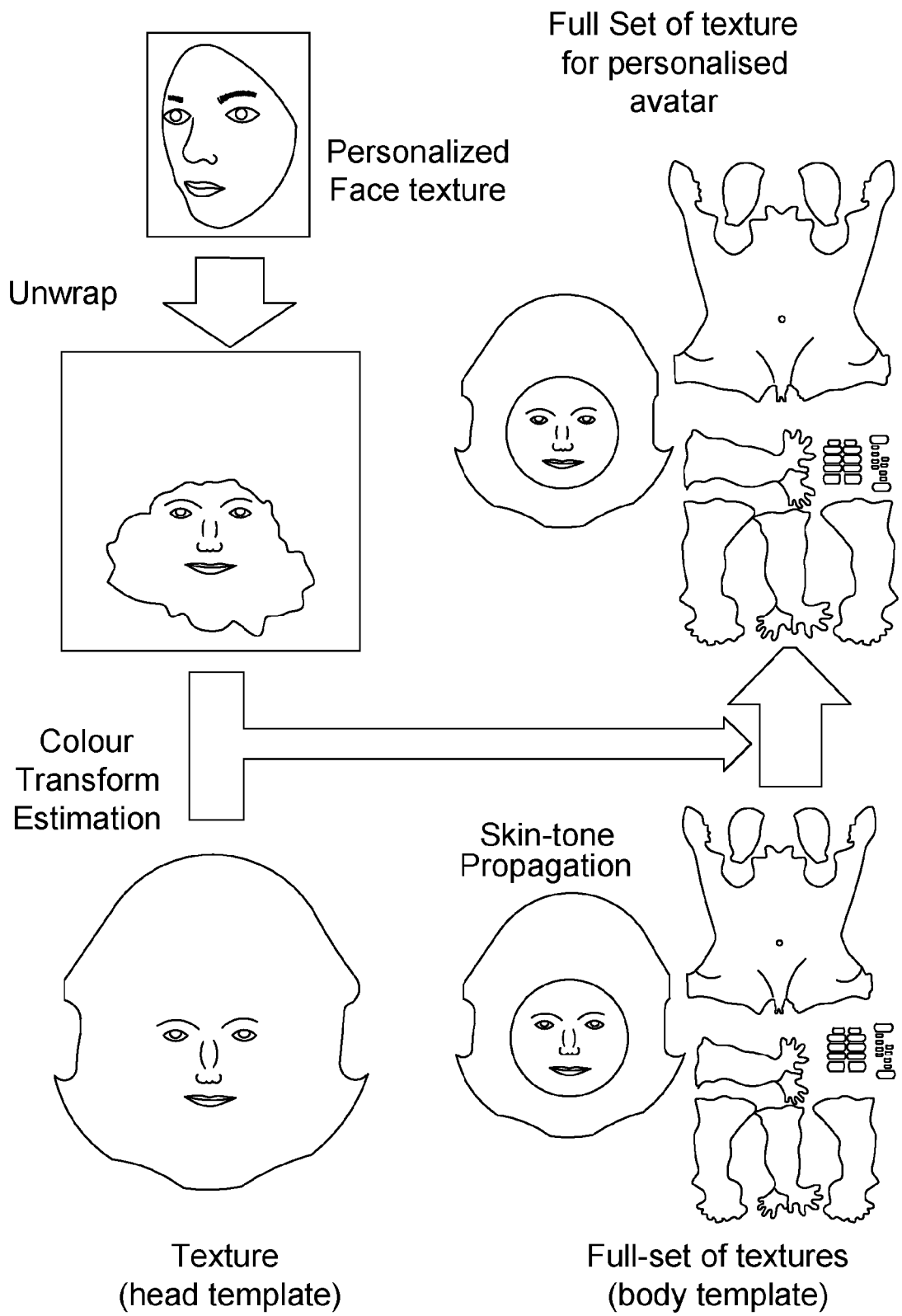
FIG. 34 shows an illustration example of the skin tone matching process based on a linear colour transform, as described in Section 5.2.1.

Given the vertex correspondence between a user's head model H and the head part of the target body model $H_B$, we can obtain the correspondence of UV texture coordinates between H and $H_B$ naturally. This allows us to map and unwrap the head texture onto the canonical albedo skin texture map of the body model $H_B$ (shown for example in FIG. 34). To generate a personalised albedo skin texture map for the user, we will then need to propagate the skin colour of the user from the face region to the remaining body parts on the skin texture map.

Firstly, we try to find a global colour transform $T_C$ that will map from the skin colour space of the original template body model to the target skin colour space in the user's face image. See FIG. 34 for an example of a skin tone matching process.

We define a region of interest $A_{ROI}$ on the skin texture maps of both the head and the body models, which specifies the corresponding face area. The colour transform $T_C$ (a 4×3 matrix) is then estimated by a least-squares linear regression based on the corresponding RGB colour samples $c_{H,p}$ and $C_{B,p}$ on all the corresponding pixels p∈$A_{ROI}$ as the following equation shows:

$$T_C = \left(\sum_{p \in A_{ROI}} \tilde{c}_{B,p}^T \tilde{c}_{B,p}\right)^{-1} \cdot \sum_{p \in A_{ROI}} \tilde{c}_{B,p}^T c_{H,p}, \quad (40)$$

where $\tilde{c}_{B,p}$=[$c_{B,p}$, 1] is the homogenous representation of the RGB colour sample.

Given $T_C$, we can then transform the colour of the whole albedo skin texture image of body model, including the head part (including the scalp and all other areas which are not captured in the image face texture), the torso part, and the limbs.

5.2.2 Alpha Colour Blending Around the Boundary $T_C$ in (40) gives a least-squares estimation of the global colour transform, there is however no guarantee of colour consistency along the face boundary (See for example FIG. 35) owing to the local lighting and colour variation.

To address the problem, we apply a soft alpha blending for a smooth colour transition, in which we assign the alpha value $\alpha_i$ to each vertex i of the face model F automatically based on its distance to the mesh boundary, as the following equation shows:

$$\alpha_i=255\times n/K, \quad (41)$$

if vertex i is an n-ring neighbour (n=0, 1, 2, . . . , K) to the boundary vertices $V_{boundary}$. We choose K=3 in our implementation. In an example, the pixel shader of a standard render engine (e.g., DirectX or OpenGL) may be used to interpolate an alpha value for all the pixels projected from the affected mesh triangles. We then re-render the original face mesh F with the above alpha matting scheme just described. This will normally give a much smoother colour transition in the final visualisation of the personalised virtual avatar.

5.2.3 Lighting Correction and Re-Lighting

While the input-quality detection module will reject most of those input images with poor lighting conditions, in practice when applying colour blending in camera views, we observe that there can still be some minor issues of lighting imbalance remaining. To correct such minor lighting imbalance, we implemented a de-lighting and re-lighting module to revise the input face texture image based on the spherical harmonic (SH) analysis [6].

It has been shown that a wide variety of the lighting conditions can be accurately modelled using the first nine spherical harmonic basis $h_i(n)$ ($i=1, 2, \ldots, 9$), which are functions of the surface normal n direction [6]. For an RGB input image, this will require us to estimate $9 \times 3 = 27$ spherical harmonic coefficients to capture the lighting distribution of the environment.

By intrinsic decomposition, an image I captured under a certain lighting condition can be factorised into the albedo component $I_{albedo}$, which characterises the intrinsic colour of the objects, and the shading component S which describes the illumination and reflectance distribution caused by the external lighting environment. For an RGB image, we then have $$I^{ch}(u, v) = I^{ch}_{albedo}(u, v) S(n(u, v)) \approx I_{albedo}(u, v) \sum_{i=1}^{9} c_{ch,i} h_i(n(u, v)), \quad (42)$$

$$ch \in \{R, G, B\},$$

where (u, v) is the image pixel coordinate, n is the surface normal, and $c_{ch,i}$ ($i=1, 2, \ldots, 9$, $ch \in \{R, G, B\}$) are the spherical harmonic coefficients of each colour channel.

Given the assumption that the skin of the user's face has a uniform colour in the albedo image, we can estimate the 27 spherical harmonic (SH) coefficients $c_{ch,i}$ over colour samples in the face skin area (e.g. excluding the eyes, mouth, nostrils, etc.) by a least-squares approach. This will also allow us to perform re-lighting on the input face image if a new set of spherical harmonic coefficients $\hat{c}_{ch,i}$, which are estimated from a face image of perfect lighting condition, is supplied. The image $I_r$ after re-lighting can be computed by the following equation:

$$I^{ch}_r(u, v) = I^{ch}_{albedo}(u, v) \frac{S_r(n(u, v))}{S(n(u, v))} \approx I^{ch}_{albedo}(u, v) \frac{\sum_{i=1}^{9} \hat{c}_{ch,i} h_i(n(u, v))}{\sum_{i=1}^{9} c_{ch,i} h_i(n(u, v))}. \quad (43)$$

Figure 36:
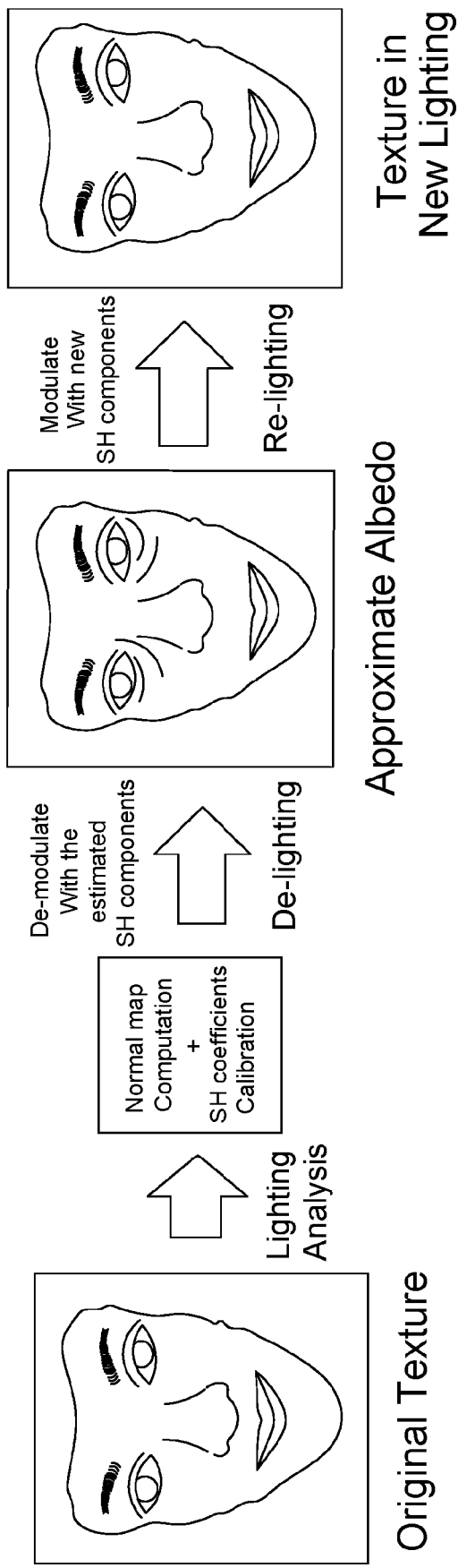
FIG. 36 shows an illustration example of de-lighting and re-lighting process based on spherical harmonic (SH) analysis, as described in Section 5.2.3.

An illustration example of the aforementioned de-lighting and re-lighting process described above is given in FIG. 36.

5.3 Customised Hairstyle Modelling

Apart from the personalised face model, we also allow the user to select different hair models to customise the hairstyle on their 3D avatar in the personalised virtual fitting system. In the system, the hairstyle models are created off-line and stored in a database. Users can then select from a range of available hairstyle models to try on at runtime.

To model the hairstyle of the virtual avatar, we provided two distinct solutions which are suitable to different scenarios:

3D Computer Generated digital hairstyles, in which we invite 3D artists to design these digital assets or use off-the-shelf assets available for gaming. As advantages, this solution will naturally support 360 degree visualisation, 3D head rotation, and 3D draping simulation. Also, it is usually easier for designers to create models of different hair colours by reusing the geometric model while recolouring the texture map. See Section 5.3.1 for details.

2D Photographic hairstyles: in which we map the 2D textures to the 3D geometry in several specified discrete camera views. Although the available viewpoints are limited, the advantages of this 2D solution are on its scalability. These 2D hairstyle models are normally easier and cheaper to create while achieving a good photorealism. Also, modelling a 2D hairstyle is normally faster as computing the 2D texture deformation is less computationally expensive than the 3D one. See Section 5.3.2 for details.

5.3.1 Using 3D Digital Hairstyle Models 3D digital hairstyles are widely used in computer games and other applications. They are normally in the form of 3D assets that are manually created by 3D artists using commercial software (e.g. Maya and 3DSMax). The two challenges for supporting a 3D digital hairstyle model are:

1. How to model the deformation of the hairstyle on the head and the body of different users,
2. How to render the translucent model like hairstyle properly to give a good visualisation.

Below we describe the approaches we have incorporated in our system to address these two challenges.

Model the geometry deformation: To model how a hairstyle will deform on the head and the body of each user, we provide a hybrid approach of mesh skinning and physics simulation.

For the computational efficiency, the mesh skinning approach is appropriate for modelling the deformation of short hairstyles where hair mesh vertices are close to the vertices of the target head model H. For each hairstyle model $S_0$, we can pre-compute the skin weights $w_{i,j}^s$ of each of its mesh vertices $s_{i,0}$ ($i=1,2, \ldots, N_s$) based on their distance to the nearby J head mesh vertices $\{h_{j,0}\}_{j=1}^{J}$ on the template head model $H_0$.

$$w_{i,j}^s = 1/(\gamma + \|s_{i,0} - h_{j,0}\|^2), \quad (44)$$

where $\gamma$ is a regularisation constant, normally set to 1. At the runtime, the deformed position of each hair-vertex $s_{i,skinning}$ ($i=1, 2, \ldots, N_s$) on the new head model H can be quickly computed as a linear weighted average in (45).

$$s_{i,skinning} = \frac{\sum_{j=1}^{J} w_{i,j}^s (s_{i,0} - h_{j,0} + h_j)}{\sum_{j=1}^{J} w_{i,j}^s} \quad (45)$$

For a long hairstyle that drapes below the bottom of the head, a physics simulation needs to be applied for modelling more realistic draping and accurate collision points of the hair model against the user's body shape model. Performing a highly-detailed physics simulation of the 3D hair model can be computationally expensive. To model how a long hairstyle model will deform on the head and the body of each user, we adopt a multi-resolution simulation approach.

We first create a coarse finite-element model of the hairstyle based on a low-resolutional mesh geometry $S_0^1$ simplified from the original hairstyle model $S_0$. This can be achieved using mesh simplification algorithms (e.g. quadratic decimation). The physics simulation of $S_0^1$ can be done in a reasonably short amount of time using a commercial physics simulation engine (e.g. nVidia PhysX library). Then given the simulation result $S^1$ of the low resolutional hair model $S_0^1$, the full resolution hair geometry $S$ after the physics simulation can be recovered from $S^1$ using the per-computed skinning weights $w_{i,j}^1$ that associates each vertex $s_i^1$ (i=1, 2, ..., $N_l$) of the low-resolution hair model $S_0^1$ with the J nearby vertices (with indices $\{m(j)\}_{j=1}^J$) on the high-resolution hair model $S_0$, as the following equation shows:

$$s_{i,simulation} = \frac{\sum_{j=1}^{J} w_{i,j}^l (s_i^l - s_{i,0}^l + s_{m(j),0})}{\sum_{j=1}^{J} w_{i,j}^l} \quad (46)$$

We choose J=4 in the implementation.

We finally introduce a linear blending between the mesh skinning result and the physics simulation result through a weighted-average mechanism, as shown in (47), $$s_i = t_i s_{i,skinning} + (1-t_i) s_{i,simulation}, \quad (47)$$

where the weighting factor $t_i$ (i=1, 2, ..., $N_s$) is a monotonic function of the height $y_i$ of the i-th hair mesh vertex as follows:

$$t_i = \frac{1}{1 + \exp - \frac{y_i - y_{th}}{\sigma}}, \quad (48)$$

where the height threshold $y_{th}$ is set to be the nose height of the body model, and the transition bandwidth $\sigma$ is set to be 8 cm. Effectively, we apply mesh skinning on the top of the hair and simulate the lower part for the long hairstyles (see FIG. 37 for an illustration example).

Modelling Translucency

To achieve a more photo-realistic visualisation of a hairstyle we need to correctly capture the hair translucency when rendering. The challenge of rendering a piece-wise translucent mesh such as a hairstyle model is that alpha blending is not a commutative process. The colour c one can observe from an arbitrary N overlaying translucent layers can be modelled as:

$$c = \alpha_1 c_1 + \alpha_2 (1 - \alpha_1) c_2 + \ldots + \alpha_N \prod_{i=1}^{N-1} (1 - \alpha_i) c_N, \quad (49)$$

where $c_i$ and $\alpha_i$ (i=1, 2, ..., N) are the RGB colour and translucency of layer i respectively.

To obtain the correct translucency in a given camera viewpoint, we have to pre-sort all the N triangles so that alpha blending is done in the correct depth order. This sorting process is computationally expensive but it has to be executed at the rendering time, as the depth-order for alpha blending will change by pixel position and camera view.

Figure 38:
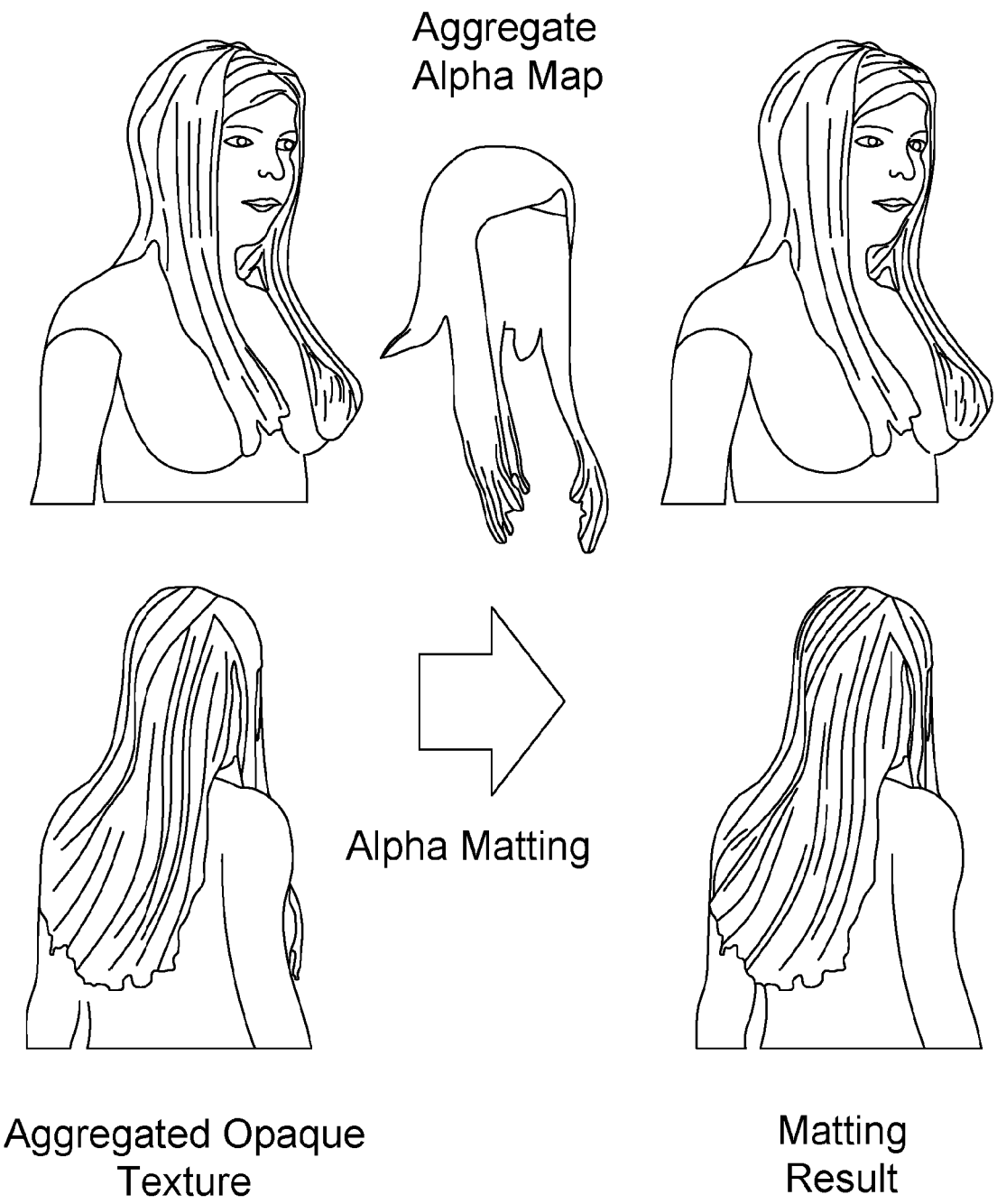
FIG. 38 shows an illustration example of the aggregating alpha matting scheme for fast rendering of a photo-realistic 3D hair model, as described in Section 5.3.1.

To solve the problem, we provide a three-pass rendering solution based on an approximate alpha matting scheme to avoid the triangle sorting process mentioned above. See FIG. 38 for an illustration example.

In the first pass, we render an aggregated alpha-map over the whole mesh with a "max" blending operation over the alpha values $\{\alpha_i\}_{i=1}^N$ of all the associated depth layers (with the z-buffer turned off). For each pixel, we compute the overall translucency $\alpha$ by $$\alpha = \max(\alpha_1, \alpha_2, \ldots, \alpha_N). \quad (50)$$

Since the "max" operator is commutable, no sorting will be required.

In the second pass, we render an aggregated opaque hairstyle texture render with the z-buffer turned on, in which in an example a standard graphics engine (e.g. OpenGL or DirectX) is used to perform depth ordering and occlusion computation for rendering opaque texture efficiently.

Then in the final pass, we perform an alpha matting on the aggregated opaque texture obtained in the second pass with the aggregated alpha-map obtained in the first pass. This will yield the final render of hairstyle texture with translucency on the boundary, as shown for example in FIG. 38.

We find that this solution works well for rendering the translucent models of near-homogeneous colours, such as hairstyles.

5.3.2 Using 2D Photographic Hairstyle Models

In the second solution, we use a texture association approach to model 2D photographic hairstyles in $N_{view}$ discrete camera views. Given a specific camera viewpoint i (i=1, 2, ..., $N_{view}$), we associate the 2D hair texture model with the projection of the underlying 3D head geometry in the given view and then deform the 2D hair texture based on the association when the 3D head shape changes. To model the correct composition order with the body avatar and clothes, a 2D hairstyle model is normally segmented into multiple layers manually. We then associate the 2D hairstyle layers with the 2D projection $h_{i,0}$ of the 3D template head model $H_0$ in each view i (i=1, 2, ..., $N_{view}$). See FIG. 39 for an illustration of an example process.

It is worthwhile to mention that the definition of relevant head template mesh $H_0$ can differ for different hair layers. For example, for those layers modelling the hair areas that are meant to follow the scalp and the shoulders, we assign the relevant template mesh to include the head, the neck base, and the upper part of the shoulders; whilst for the layers modelling the draping of long hairs, we assign the relevant template to be the head part only.

To generate a global texture morph field, we first compute the skinning weights on a $w_g \times h_g$ rectangular grid G of sample texture positions $G = \{g_{x,y} = (u_x, v_y) = (xd_g, yd_g)\}_{1 \leq x \leq w_g, 1 \leq y \leq h_g}$, where $d_g$ is the step size per grid in the UV texture coordinate. For any texture grid position g=(u, v) falling inside the silhouette of $h_{i,0}$, it is mapped to the corresponding mesh triangle T. We associate g with the n=3 corresponding vertices $\{v_{1,0}, v_{2,0}, v_{3,0}\}$ of the triangle T.

$$p = \sum_{j=1}^{3} w_j v_{j,0}, \quad (51)$$

The skinning weights $\{w_j\}_{j=1}^n$ are then computed based on baricentric coordinates of the given grid point g in the triangle as follows.

$$w_1 = \frac{n_T \cdot ((g - v_{2,0}) \times (g - v_{3,0}))}{n_T \cdot ((v_{1,0} - v_{2,0}) \times (v_{1,0} - v_{3,0}))}, \quad (52)$$

$$w_2 = \frac{n_T \cdot ((g - v_{3,0}) \times (g - v_{1,0}))}{n_T \cdot ((v_{2,0} - v_{3,0}) \times (v_{2,0} - v_{1,0}))}, \quad (53)$$

$$w_3 = 1 - w_1 - w_2, \quad (54)$$

where $n_T$ refers to the normal of the triangle T.

On the other hand, for any texture grid position g falling outside the silhouette of $h_{i,0}$, a direct texture mapping cannot be performed. In this scenario, we adopt an extrapolation based on a texture-to-mesh skinning. The 2D texture grid point g is affiliated to $N_p$ nearest vertices $\{v_{j,0}\}_{j=1}^{N_p}$ (in 2D coordinates) of the projected head template $h_{i,0}$ in a weighted-average manner. The skinning weights $\{w_j\}_{j=1}^{N_p}$ are inversely proportional to their distances to the respective vertices as follows.

$$w_j = \frac{1}{\gamma + \|p - v_{j,0}\|}, \quad j = 1, 2, \dots, N_p, \quad (55)$$

where $\gamma$ is the regularisation constant, normally set to 1. In the implementation, we choose $N_p=4$.

When modelling the hair texture on the user's head model H, the hair texture will morph according to the displacement of the associated vertices in a projected head model $h_i$ in each camera view i accordingly. For each texture position $g_{x,y}$ on the original hair texture image defined on the sampling grid G, its new texture position $g^*_{x,y}$ after the texture morph can be computed as the following equation shows.

$$g^*_{x,y} = g_{x,y} + \sum_{j=1}^{n} w_j(v_j - v_{j,0}), \quad (56)$$

where $v_{j,0}$ and $v_j$ are the associated vertex position on the projected template head model $h_i$ and the projected user's head model $h_i$ respectively. Then for an arbitrary texture point p=(u, v) on the original hair texture image, its new texture position p* can be obtained from the displacements of the 4 nearby corner grid points $\{\delta g_i\}_{i=1}^4$ based on a bilinear interpolation as follows:

$$p^* = p_{x,y} + (1 - b_x)(1 - b_y)\delta g_1 + \quad (57)$$
$$b_x(1 - b_y)\delta g_2 + (1 - b_x)b_y\delta g_3 + b_x b_y \delta g_4,$$

where $$\delta g_1 = g^*_{\lfloor \frac{u}{d_g} \rfloor, \lfloor \frac{v}{d_g} \rfloor} - g_{\lfloor \frac{u}{d_g} \rfloor, \lfloor \frac{v}{d_g} \rfloor}, \quad (58)$$

$$\delta g_2 = g^*_{\lfloor \frac{u}{d_g} \rfloor + 1, \lfloor \frac{v}{d_g} \rfloor} - g_{\lfloor \frac{u}{d_g} \rfloor + 1, \lfloor \frac{v}{d_g} \rfloor}, \quad (59)$$

$$\delta g_3 = g^*_{\lfloor \frac{u}{d_g} \rfloor, \lfloor \frac{v}{d_g} \rfloor + 1} - g_{\lfloor \frac{u}{d_g} \rfloor, \lfloor \frac{v}{d_g} \rfloor + 1}, \quad (60)$$

$$\delta g_4 = g^*_{\lfloor \frac{u}{d_g} \rfloor + 1, \lfloor \frac{v}{d_g} \rfloor + 1} - g_{\lfloor \frac{u}{d_g} \rfloor + 1, \lfloor \frac{v}{d_g} \rfloor + 1}, \quad (61)$$

$$b_x = \left(\frac{u}{d_g} - \left\lfloor \frac{u}{d_g} \right\rfloor\right), \quad (62)$$

$$b_y = \left(\frac{v}{d_g} - \left\lfloor \frac{v}{d_g} \right\rfloor\right), \quad (63)$$

and $|\cdot|$ stands for a floor function that round down a real number down to its nearest integer.

6 Personalisation Applications Based on 3D Face Modelling

In this section, we describe other examples of personalisation applications which derived from the personalised 3D face/head reconstruction techniques as described in Section 2. By integrating them with commercial social network websites and/or messenger applications on the mobile platforms, it allows users to create, visualize, and share their personalised 3D models conveniently.

As a key feature, these applications can automatically create graphical representations based on a user's 3D face model (e.g. GIF animations of a left-to-right rotating face), in which the 3D face model is automatically reconstructed from a selfie of the user or an offline single 2D portrait photo uploaded by the user using the single-view 3D face reconstruction approach described in Section 2.1. The representations of a user's 3D face could be an animated GIF of:
  the face shape only,
  the face merged with a full head and a hairstyle,
  a full body model, created using the approaches described in Section 5, which is rendered on top of a specified background image. These approaches can be generalised to take into account different effects, including but not limited to:
    change of camera positions, as an animation of head motion and movements;
    face transfers: i.e. transfer the face appearance from one to the other, or merges the face appearance of two or more users by e.g. averaging, blending, and morphing.
    expression modification i.e. gradually change a user's expression from one to another.
    skin appearance modification and lighting changes, i.e. in the form of virtual tanning and virtual make-up applications.

Figure 40:
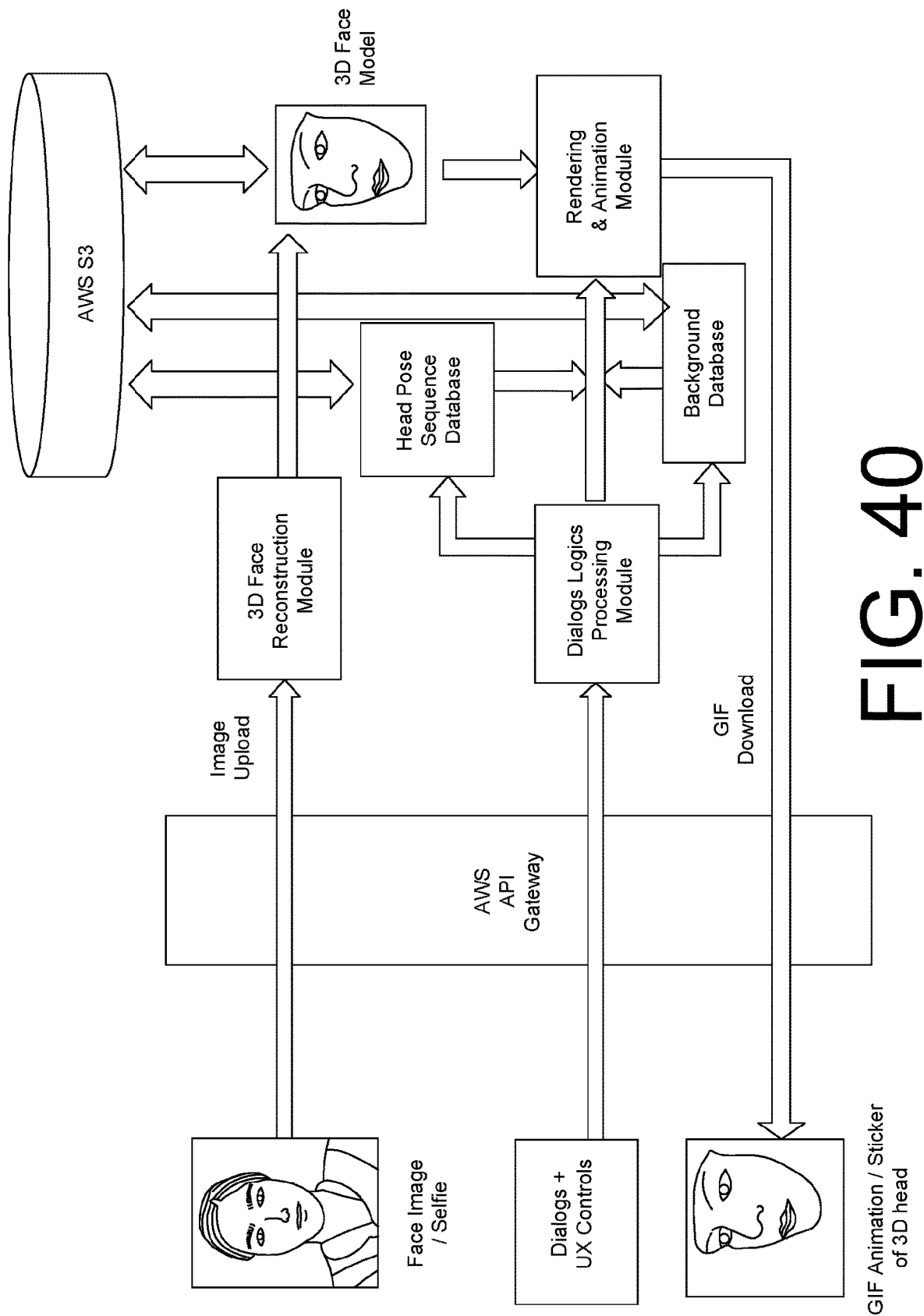
FIG. 40 shows an example sample system diagram of the application to generate 3D face GIF animations or a personalised sticker set from a user's photo automatically, as described in Section 6.
Figure 41:
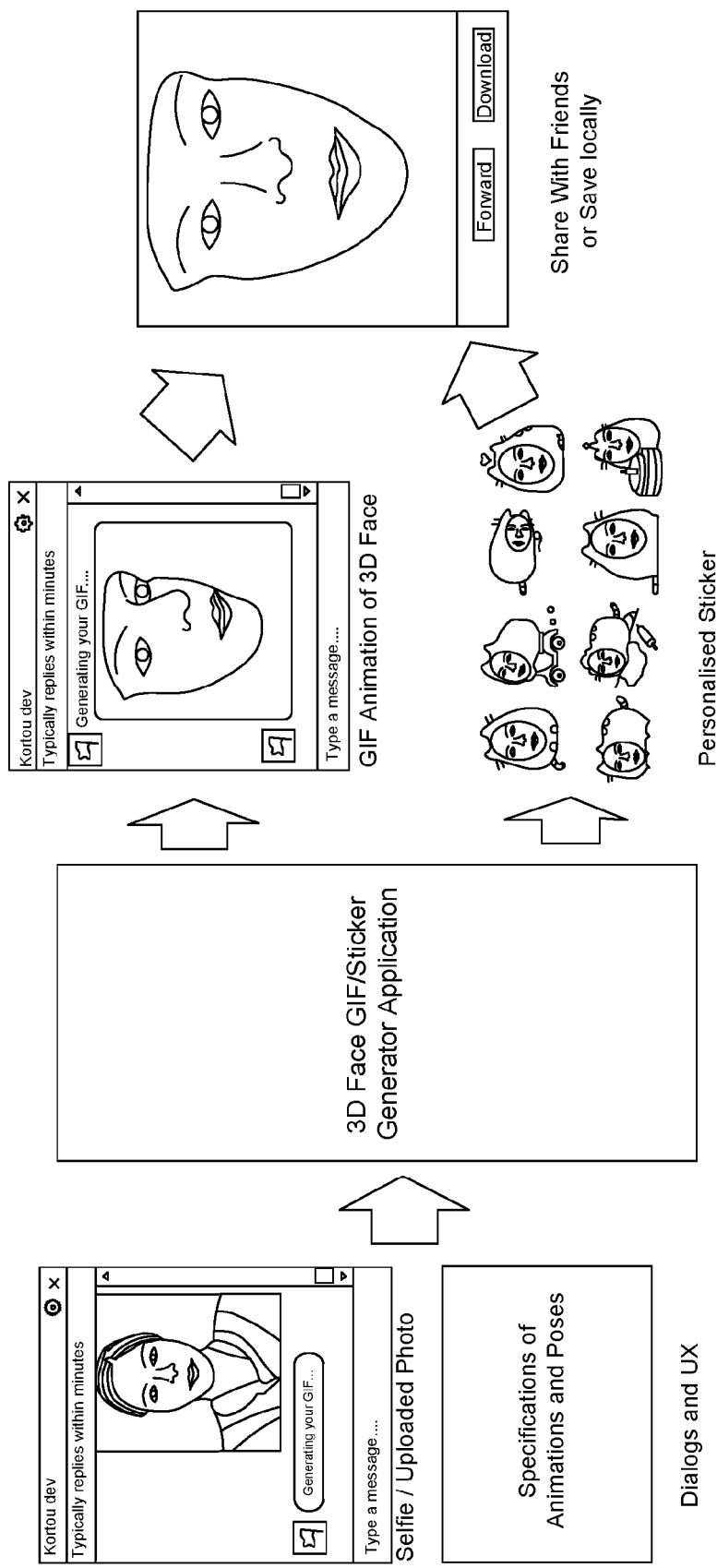
FIG. 41 shows an example simplified user flow of the 3D face GIF generator application, as described in Section 6.

A pipeline of an example provided system is illustrated in FIG. 40 with a simplified diagram and user flows shown in FIG. 41 by way of example. The system may include the following key components:

3D face reconstruction module, reconstructs the user's 3D face model from the single 2D frontal selfie/uploaded face photo, using the approach described in Section 2.1. An example of pipeline detail of the module is given in FIG. 5.

Background database, stores a number of static or dynamic background images of various themes for users to select as the background for their personalised animations.

Head pose sequence database, stores the predefined metadata of different head pose sequences for users to compose their personalised animations.

Dialog logic management module, keeps the state of the UI and converts the users' text dialog and UI inputs into logic instructions. It will then select the specified background image from the background library, and select the head pose motion sequence for rendering the 3D face model.

Rendering and animation module, renders the animation (e.g. animated GIF) from the 3D face model(s) given the specified background image and head pose sequences. As a specific example of implementation, the system can be implemented by 1) using Amazon Web Service (AWS) Lambda functions for image uploading and downloading, 3D face reconstruction, dialog logic management, rendering, and animations, and 2) using Amazon S3 buckets to store the data of the background image set, pre-defined head pose sequences, user uploaded photos, and intermediate results of 3D face models, as shown for example in FIG. 40.

6.1 Chatbots and Messenger Plug-Ins

Figure 42:
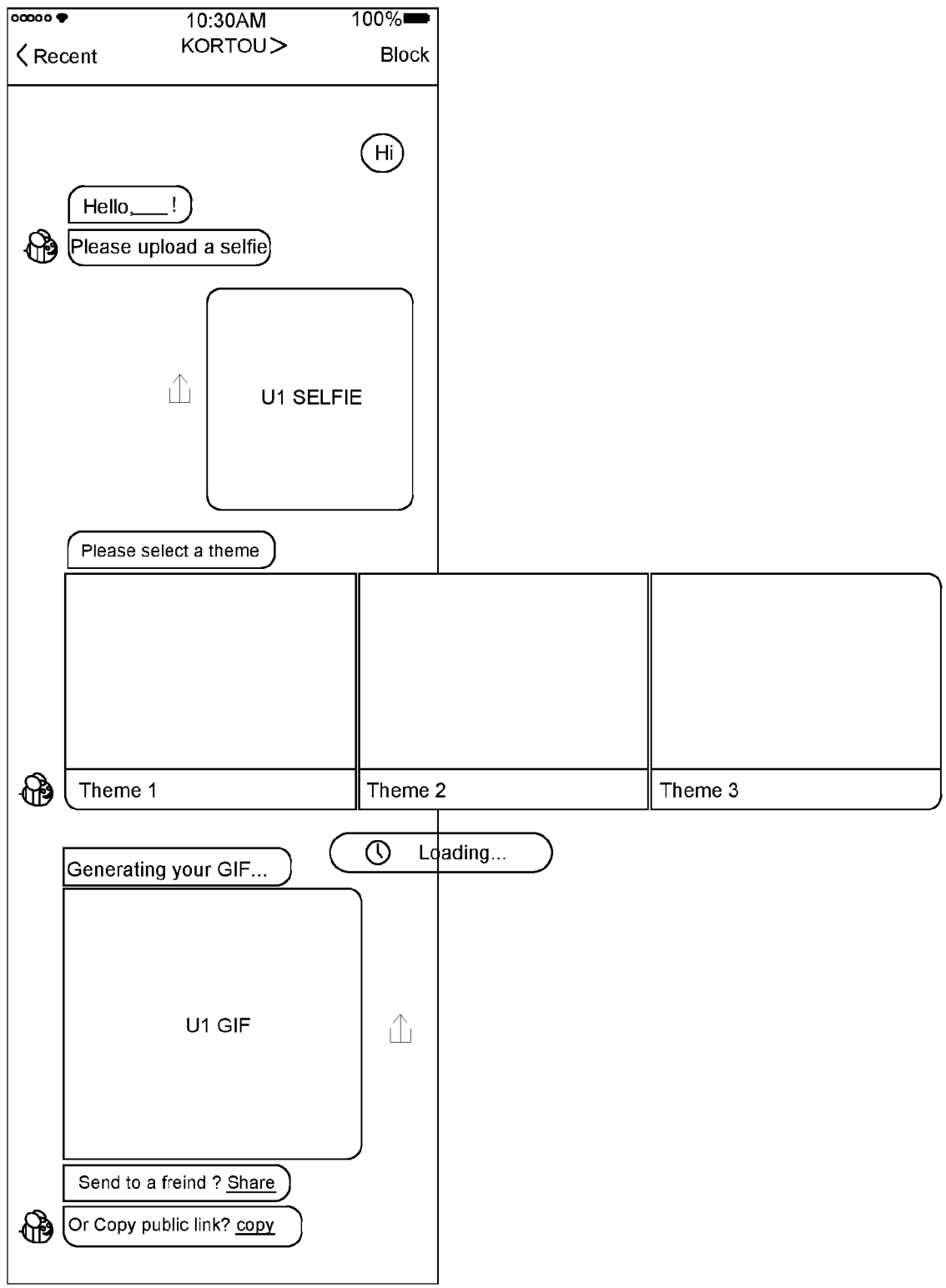
FIG. 42 shows an example sample user flow for a personalised GIF-generation chat-bot based on 3D face reconstruction techniques, as described in Section 6.1.

The systems above can be integrated with a commercial social network website (e.g. Facebook), or messengers (e.g. Facebook Messenger, Wechat, Kakao chat, Slack), either on the PC or on mobile devices. It can be in the form of a web-app, chatbot, or other forms of plug-ins for messengers or social network applications. A sample user flow of the messenger chat-bot system for 3D face reconstruction is illustrated in FIG. 42 by way of example.

Figure 43:
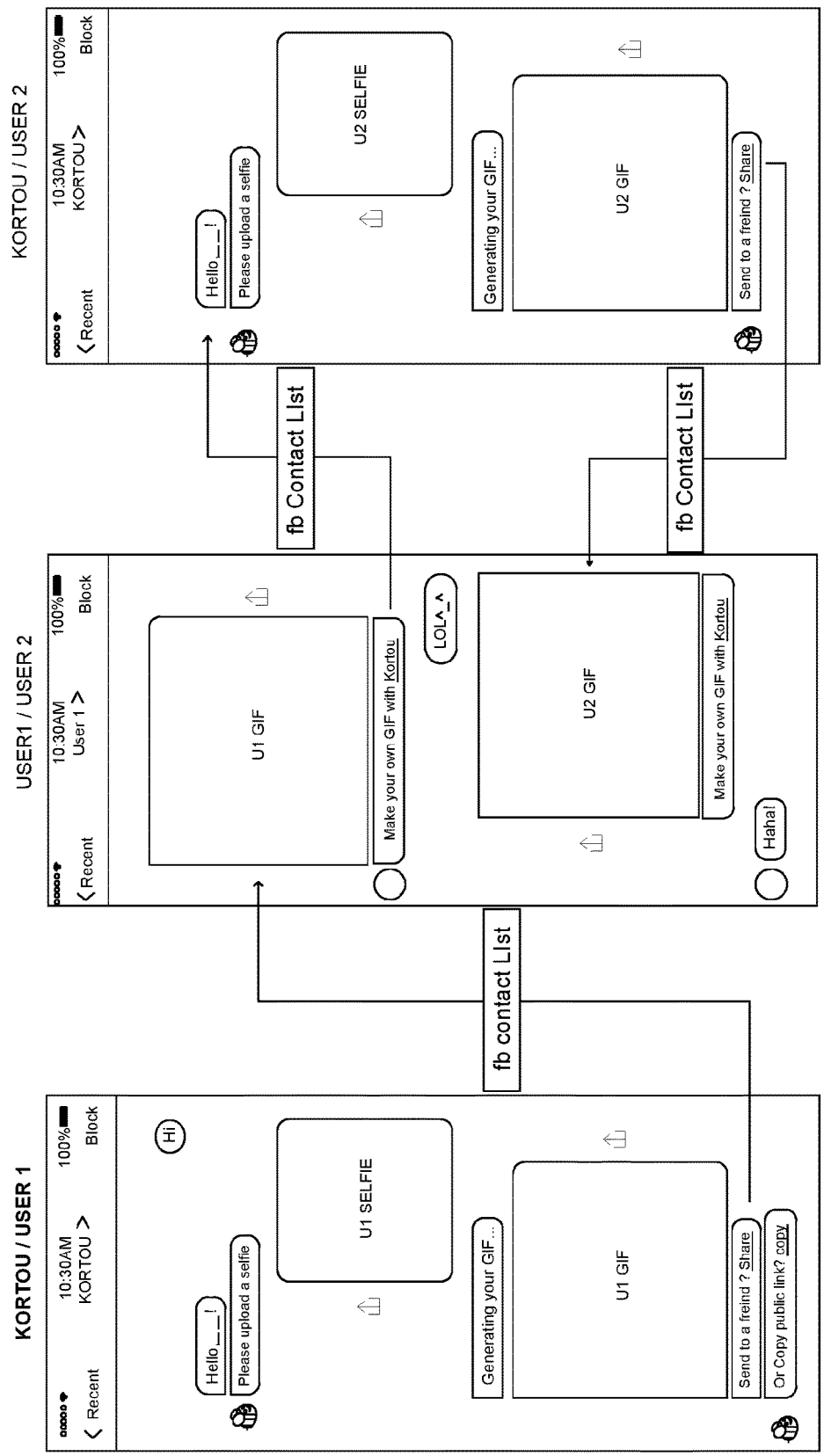
FIG. 43 shows an example user flow for a personalised GIF-generation messenger application in FIG. 42, which further implements a direct sharing mechanism. In this example, the implementation is based on Facebook Messenger.
Figure 44:
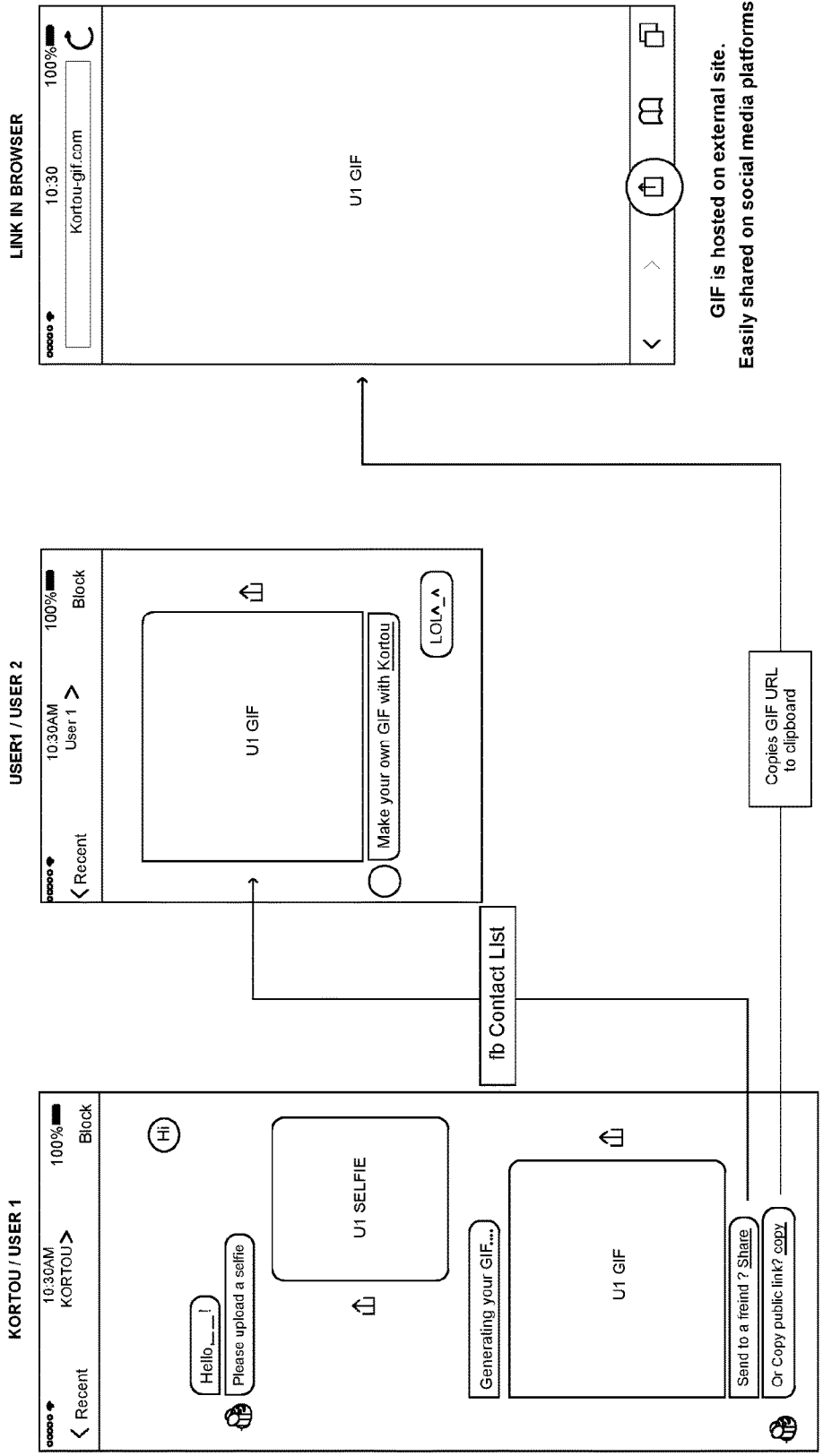
FIG. 44 shows an example user flow for a personalised GIF-generation messenger applications in FIG. 42, which further implements external sharing. In this example, the implementation is based on Facebook Messenger.

The messenger application systems provided above can be extended to further support 1) saving the resulting GIF animations, 2) sharing the the GIF results with friends in the same messenger channel (see FIG. 43 for examples), or 3) sharing the GIF results onto an external website or other social network platforms (see FIG. 44 for an example). The information included in the sharing mechanisms above will involve a propagation mechanism that will bring traffic back into the channel to achieve virality.

6.2 Voice Chat Systems

Figure 45:
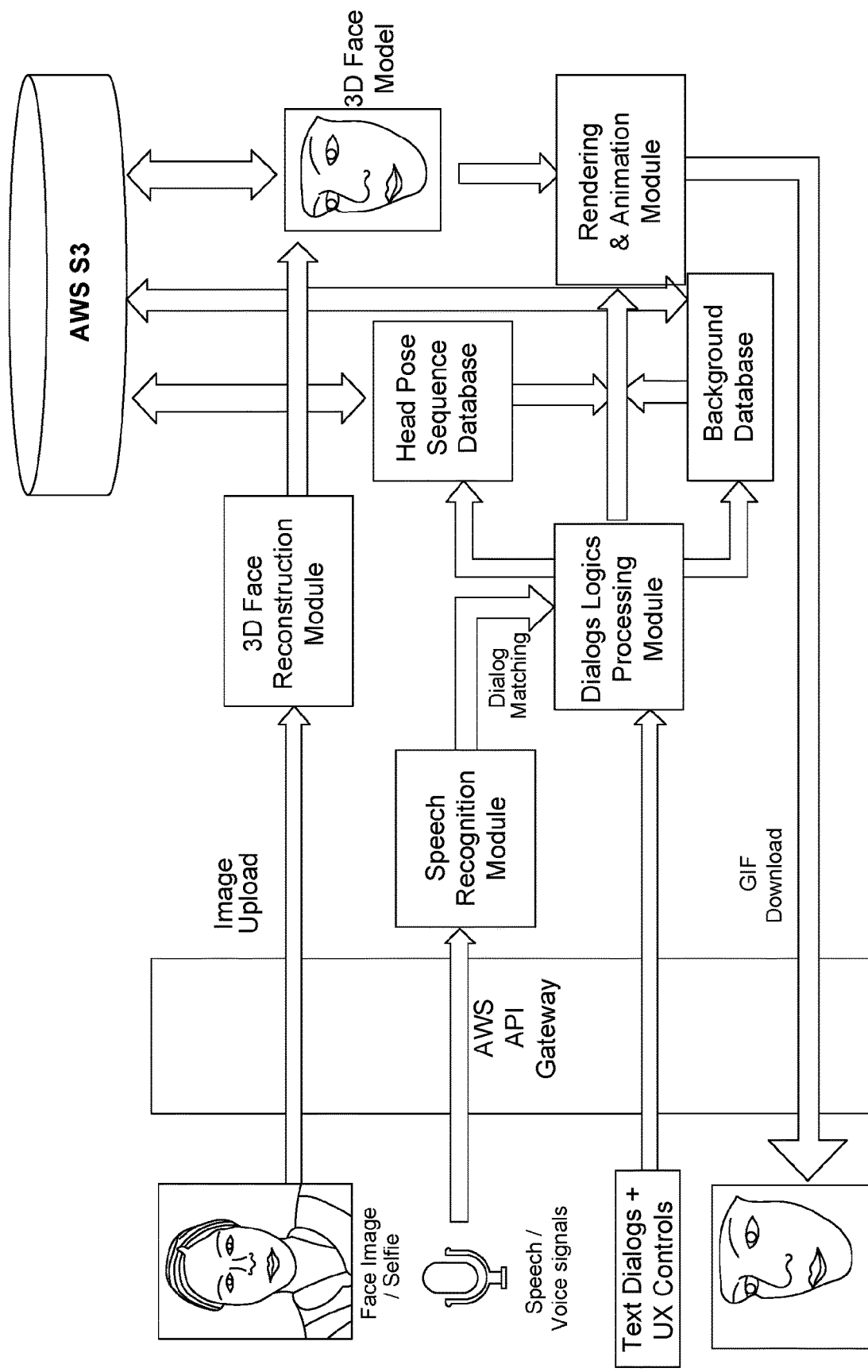
FIG. 45 shows a diagram of an example 3D face GIF animation application with a speech recognition module integrated, as described in Section 6.2.

The functionality of voice chat support can be further implemented on top of the system in FIG. 45 by integrating a speech recognition library (e.g. CMU Sphinx [20]) on the input side of the system to translate the voice signals into text dialogs (see FIG. 45 for the modified system diagram). Considering the fact that the output of the speech recognition module can be sometimes erroneous, a string pattern matching scheme, e.g. one based on minimal editing distance, can be used to match the output of the speech recognition module with the pre-defined dialog patterns that correspond to a particular state in the conversation logic controlling module to activate the chat-bot conversation progress.

6.3 Animation of Multiple 3D Faces

The system and the approaches in Section 2.1 can be generalised to process a photo containing multiple faces of a collection of people (two or more), and generate a group animation automatically. Given a single input image I of multiple faces, an example process is as follows:

1. Detect all N frontal faces $\{f_i\}_{i=1}^{N}$ in the image, and the associated L 2D face landmarks $\{I_{i,j}\}_{j=1}^{L}$ for each face $f_i$ (i=1, 2, ..., $N_{face}$). For example, this can be achieved automatically by an open-source face detector (e.g. dlib [18]).

2. Reconstruct the 3D face $F_i$ for each individual i (i= 1,2, ..., $N_{face}$) in the photo I based on the 2D face landmark detection results $\{I_{i,j}\}_{j=1}^{K}$, using the approach described in Section 2.1.

3. Render an animation (e.g. an animated GIF) that contains some or all of the resulting 3D faces $\{F_i\}_{i=1}^{N_{face}}$ using distinctive time-sequences of head pose parameters $P_i(t)$ defined for each face $F_i$ (i=1, 2, ..., $N_{face}$) A typical set of pose parameters includes 3D rotation $R_i(t)$ (3×3 matrix), the centroid of rotation $c_i(t)$, the 3D translation vector $t_i(t)$, and the global scaling factor $s_i(t)$. The vertex-wise transformation is formulated as follows:

$$v^*_{i,j}(t)=s_i(t)(R_i(t)(v_{i,j}-c_i(t))+t_i(t)), \quad (64)$$

where and $v_{i,j}$ and $v^*_{i,j}(t)$ refer to the j-th vertex of the i-th 3D face model in the image, before and after the transformation, respectively.

As an example effect, we can generate a "roulette of faces" from a group photo of $N_{face}$ faces, in which we apply the head pose parameters $P_i(t)=\{R_i(t), c_i(t), t_i(t), s_i(t)\}$ to generate the effect:

$$R_i(t) = \qquad (65)$$

$$Rotation_y\left(\frac{2\pi i + \omega t}{N_{face}}\right) = \begin{bmatrix} \cos\left(\frac{2\pi i + \omega t}{N_{face}}\right) & 0 & \sin\left(\frac{2\pi i + \omega t}{N_{face}}\right) \\ 0 & 1 & 0 \\ -\sin\left(\frac{2\pi i + \omega t}{N_{face}}\right) & \frac{K_y}{\bar{x}_{v,i,3}} & \cos\left(\frac{2\pi i + \omega t}{N_{face}}\right) \end{bmatrix},$$

$$c_i(t) = \left(0, 0, -\left(d + w\sin\left(\frac{\pi}{2} - \frac{\pi}{N_{face}}\right)\right)\right), \qquad (66)$$

$$t_i(t) = \left(0, 0, d_{camera} + d + w\sin\left(\frac{\pi}{2} - \frac{\pi}{N_{face}}\right)\right), \qquad (67)$$

$$s_i(t) = 1, (i = 0, 1, 2, \ldots, N_{face} - 1), \qquad (68)$$

where the sample hyper-parameters settings are d=30 mm, w=180 mm, $d_{camera}$=400 mm, respectively. An example visualisation of the effect is illustrated in FIG. 46. As examples of applications, we could integrate the above system in a social network or a messenger application so that it allows automatic generation of a spinning face-roulette animation for all the members in a group chat or in the same channel.

6.4 Creating a Personalised Sticker Set

The face/head animation generation systems above can be further extended to automatically create a collection of personalised stickers for the user (see FIG. 40 for example), from one single image or multiple frontal view static images of the user with different expressions.

The personalised sticker set comprises several GIF animations created with the approaches above using a combination of:

Background images in different themes, which can be either a static or a dynamic background (e.g. an animated GIF) characterising e.g. the expressions, the gestures, and the motions of carton characters; and Different head pose parameters sequences, which represent the head motions of the original character(s) in the background, so that we replace the head of the original character(s) with the user's face by rendering the user's 3D face model onto the background image.

Some examples are given in FIG. 41.

A. Smooth Shape and Texture Mapping Based on the Thin-Plate Spline Model

We use the thin-plate spline (TPS) model [9] to generate a smooth global deformation field of shape or texture based on a number of pre-computed pair-wise control points.

Given an arbitrary k-dimensional input position p (normally k=2 or 3 in our applications), its k-dimensional output position q after the mapping is obtained by the following interpolating function (69):

$$q^T = [\, p^T \ 1\, ]B + \sum_{i=1}^{L} c_i \varphi(\|p - p_{l_i}\|), \qquad (69)$$

where the kernel function is typically chosen to be $\phi(r)=r \log r$; B is a $(k+1) \times k$ coefficient matrix; $c_i$ ($i=1, 2, \ldots, L$) are $1 \times k$ weighting vectors, which also satisfy that:

$$\sum_{i=1}^{L} c_i = 0, \text{ and } \sum_{i=0}^{L} c_i p_i = 0. \tag{70}$$

TPS coefficients B and $c_i$ are chosen to minimise the matching errors as well as the bending energy based on all L control point pairs $(p_{1_i}, q_{1_i})$ ($i=1, 2, \ldots, L$) obtained in the matching stage:

$$E_{TPS} = \sum_{i=1}^{L} \|p_{l_i} - q_{l_i}\|^2 + \beta Tr(C^T \Phi C). \tag{71}$$

where $\Phi = [\phi(Pp_i - p_j P)]_{1 \le i \le L, 1 \le j \le L}$ is the $L \times L$ kernel matrix; $C = [c_i]_{i=1}^{L}$ is an $L \times k$ weighting matrix; and $\beta$ is the regularisation factor controlling the amount of smoothness, normally set to be 1 is our implementation. $E_{TPS}$ in (71) can be minimised analytically through the following linear system:

$$\begin{bmatrix} \tilde{\Phi} & \prod_P \\ \prod_P^T & 0 \end{bmatrix} \begin{bmatrix} C \\ B \end{bmatrix} = \begin{bmatrix} \prod_q \\ 0 \end{bmatrix}, \tag{72}$$

where $$\prod_P = \begin{bmatrix} p_1^T & 1 \\ p_2^T & 1 \\ \vdots & \vdots \\ p_L^T & 1 \end{bmatrix}$$

is a $L \times (k+1)$ matrix, $$\prod_Q = \begin{bmatrix} q_1^T \\ q_2^T \\ \vdots \\ q_L^T \end{bmatrix}$$

is a $L \times k$ matrix, and $\tilde{\Phi} = \Phi + \beta I$ is an $L \times L$ matrix.

REFERENCES

[1] T. Adeyoola, N. Brown, N. Trott, E. Herbert, D. Robertson, J. Downing, N. Day, R. Boland, T. Boucher, J. Townsend, E. Clay, T. Warren, and A. Unadkat. Computer implemented methods and systems for generating virtual body models for garment fit visualisation. UK Patent GB2488237, Metail Limited, August 2012.

[2] B. Allen, B. Curless, and Z. Popovic. The space of human body shapes: reconstruction and parametrization from range scans. *ACM Transactions on Graphics*, 22(3): 587-594, 2003.

[3] B. Amberg, S. Romdhani, and T. Vetter. Optimal step nonrigid ICP algorithms for surface registration. *IEEE Conference on Computer Vision and Pattern Recognition*, 2007.

[4] T. Baltrusaitis, P. Robinson, and L.-P. Morency. Constrained local neural fields for robust facial landmark detection in the wild. In *Proceedings of the IEEE International Conference on Computer Vision Workshops*, pages 354-361, 2013.

[5] H. Barrow, J. Tenenbaum, R. Bolles, and H. Wolf. Parametric correspondence and chamfer matching: Two new techniques for image matching. *Proc. 5th Int. Joint Conf. Artificial Intelligence*, pages 659-663, 1977.

[6] R. Basri and D. Jacob. Lambertian reflectance and linear subspaces. *IEEE Trans. Pattern Analysis and Machine Intelligence* (PAMI, 2003.

[7] P. Besl and N. Mckey. A method for registration of 3-D shapes. *IEEE Trans. Pattern Analysis and Machine Intelligence* (PAMI), 14(2):239-256, 1992.

[8] V. Blanz and T. Vetter. A morphable model for the synthesis of 3D faces. *Proc. of SIGGRAPH*, pages 187-194, 1999.

[9] F. Bookstein. Principal warps: Thin-plate splines and the decomposition of deformations. *IEEE Trans. Pattern Analysis and Machine Intelligence* (PAMI), 11 (6): 567-585, 1989.

[10] Y. Chen, D. Robertson, and R. Cipolla. A practical system for modelling body shapes from single view measurements. *British Machine Vision Conference*, 2011.

[11] D. Cristinacce and T. Cootes. Automatic feature localisation with constrained local models. *Pattern Recognition*, 41(10):3054-3067, 2008.

[12] D. Fidaleo and G. Medioni. Model-assisted 3d face reconstruction from video. In *Analysis and modeling of faces and gestures*, pages 124-138. Springer, 2007.

[13] P. Gill, W. Murray, and M. Wright. *The Levenberg-Marquardt Method*. London: Academic Press, 1981.

[14] K. Haming and G. Peters. The structure-from-motion reconstruction pipeline "c a survey with focus on short image sequences. *Kybernetika*, 46(5):926-937, 2010.

[15] C. Harris and M. Stephens. A combined corner and edge detector. In *In Proc. of Fourth Alvey Vision Conference*, pages 147-151, 1988.

[16] R. Hartley and A. Zisserman. *Multiple view geometry in computer vision*. Cambridge University Press, Cambridge, 2003. Choix de documents en appendice.

[17] D. Huttenlocher, R. Lilien, and C. Olson. View-based recognition using an eigenspace approximation to the hausdorff measure. *IEEE Trans. Pattern Ana/ysis and Machine Intelligence* (PAMI), 21(9):951-955, 1999.

[18] E. Kazemi and J. Sullivan. One millisecond face alignment with an ensemble of regression trees. *IEEE Conference on Computer Vision and Pattern Recognition*, 2014.

[19] A. Krizhevsky, I. Sutskever, and G. E. Hinton. Imagenet classification with deep convolutional neural networks. In *Advances in Neural Information Processing Systems*, page 2012.

[20] P. Lamere, P. Kwok, W. Walker, E. Gouv**°a, R. Singh, B. Raj, and P. Wolf. Design of the cmu sphinx-4 decoder. In IN 8TH EUROPEAN CONF. ON SPEECH COMMUNICATION AND TECHNOLOGY (EUROSPEECH, 2003.

[21] Y. LeCun, L. Bottou, Y. Bengio, and P. Haffner. Gradient-based learning applied to document recognition. *Proceedings of the IEEE*, 86(11):2278-2324, November 1998.

[22] M. Lourakis and A. Argyros. The design and implementation of a generic sparse bundle adjustment software package based on the levenberg-marquardt algorithm. 2004.

[23] D. Lowe. Distinctive image features from scale-invariant keypoints. *International Journal of Computer Vision*, 2(60):91-110, 2004.

[24] D. Martin, C. Fowlkes, and J. Malik. Learning to detect natural image boundaries using local brightness, color, and texture cues. *IEEE Trans. Pattern Analysis and Machine Intelligence* (PAMI), 26(5):530-549, 2004.

[25] P. Perez, M. Gangnet, and A. Blake. Poisson image editing. In *ACM Transactions on Graphics* (TOG), volume 22, pages 313-318. ACM, 2003.

[26] K. Robinette, H. Daanen, and E. Paquet. The CAESAR project: a 3-D surface anthropometry survey. *International Conference on* 3-*D Digital Imaging and Modeling*, pages 380-386, 1999.

[27] C. Schmid, R. Mohr, and C. Bauckhage. Evaluation of interest point detectors. *International Journal of computer vision,* 37 (2): 151-172, 2000.

[28] P. J. Schneider and D. Eberly. *Geometric Tools for Computer Graphics*. Elsevier Science Inc., New York, N.Y., USA, 2002.

[29] K. Simonyan and A. Zisserman. Very deep convolutional networks for large-scale image recognition. *CoRR*, abs/1409.1556, 2014.

[30] R. T. Tan and K. Ikeuchi. Separating reflection components of textured surfaces using a single image. *Pattern Analysis and Machine Intelligence, IEEE Transactions on,* 27 (2):178-193, 2005.

[31] P. Viola and M. Jones. Robust real-time object detection. In *International Journal of Computer Vision,* 2001.

[32] Y. Wang, S. Lucey, and J. F. Cohn. Enforcing convexity for improved alignment with constrained local models. In *Computer Vision and Pattern Recognition,* 2008. *CVPR* 2008. *IEEE Conference on*, pages 1-8. IEEE, 2008.

[33] K. Zhou, X. Wang, Y. Tong, M. Desbrun, B. Guo, and H.-Y. Shum. Texturemontage. In *ACM SIGGRAPH* 2005 *Papers, SIGGRAPH* '05, pages 1148-1155, New York, N.Y., USA, 2005. ACM.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. A method of generating an image file of a personalized three-dimensional (3D) head model of a user, the method comprising the steps of:
   (i) acquiring at least one two-dimensional (2D) image of the user's face;
   (ii) performing automated face 2D landmark recognition based on the at least one 2D image of the user's face;
   (iii) providing a 3D face geometry reconstruction using a shape prior;
   (iv) providing texture map generation and interpolation with respect to the 3D face geometry reconstruction to generate the personalized 3D head model of the user, and
   (v) generating the image file of the personalized 3D head model of the user;
   wherein the generated texture map includes a 3D mesh geometry of the user's face comprising mesh triangles;
   UV texture coordinates are determined for texture vertices of each mesh triangle of the 3D mesh geometry of the user's face;
   in which a UV coordinate of a landmark vertex is computed based on a result of a corresponding 2D face landmark position detected by a 2D face landmark detector on the at least one 2D image of the user's face;
   in which head geometry is improved for better realism by deforming an initial head model by rectifying facial landmark positions of the personalized 3D head model in directions within an image plane of the at least one 2D image of the user's face, so that a projection of facial landmarks on the personalized 3D head model is a similarity transform of corresponding 2D facial landmarks in the at least one 2D image of the user's face.

2. The method of claim 1, wherein the at least one 2D image of the user's face is acquired via a network communication.

3. The method of claim 2, wherein the at least one 2D image of the user's face is acquired via the network communication, from a smartphone including a camera.

4. The method of claim 1, wherein the at least one 2D image of the user's face is a front image of the user's face.

5. The method of claim 1, wherein the at least one 2D image of the user's face is a smartphone camera image of the user's face.

6. The method of claim 1, wherein the automated face 2D landmark recognition includes using the 2D face landmark detector.

7. The method of claim 1, in which the image file is a 3D image file.

8. The method of claim 1, in which the image file is a 2D image file.

9. The method of claim 1, in which the image file is an animation file.

10. The method of claim 1, in which the image file is a personalised sticker set.

11. The method of claim 1, in which head size is estimated from body shape parameters.

12. The method of claim 1, in which an automatic image analysis is performed to help the user quickly acquire input data of good quality.

13. The method of claim 12, in which prior to starting the video or image capture, the user is presented with a live view of a camera feed, and a feedback mechanism analyses the live view and provides the user with recommendations on how to improve conditions in order to achieve a high quality end result.

14. The method of claim 1, in which a machine-learning-based attribute classifier, which can be implemented by a deep convolutional neural network (CNN), is used to analyze the at least one 2D image of the user's face, and predict attributes from appearance information in the at least one 2D image of the user's face.

15. The method of claim 1, in which a 3D thin-plate spline (TPS) deformation model is used to rectify a 3D geometry of a regressed head model to achieve better geometric similarity, so as to generate a smooth interpolation of 3D geometry deformation throughout the 3D mesh geometry of the user's face from control point pairs.

16. The method of claim 1, in which to complete the generated texture map of the personalized 3D head model, a 2D thin plate spline (TPS) model is used for interpolation and to populate the UV texture coordinates over the texture vertices of each mesh triangle of the 3D mesh geometry of the user's face.

17. The method of claim 1, in which the at least one 2D image of the user's face comprises at least a front image, a left side image and a right side image, of the user's face, and in which following generating an approximate 3D face model from the front image for use as an initialisation model, a step is performed of performing an iterative optimisation algorithm for revising the initialisation model, which is implemented to minimise landmark re-projection errors against independent 2D face landmark detection results obtained from the front image, the left side image and the right side image, of the user's face.

18. A system including a processor, wherein the processor is configured to generate an image file of a personalized three-dimensional (3D) head model of a user, the processor configured to:
(i) acquire at least one two-dimensional (2D) image of the user's face;
(ii) perform automated face 2D landmark recognition based on the at least one 2D image of the user's face;
(iii) provide a 3D face geometry reconstruction using a shape prior;
(iv) provide texture map generation and interpolation with respect to the 3D face geometry reconstruction to generate the personalized 3D head model of the user, and
(v) generate the image file of the personalized 3D head model of the user;
wherein the generated texture map includes a 3D mesh geometry of the user's face comprising mesh triangles;
UV texture coordinates are determined for texture vertices of each mesh triangle of the 3D mesh geometry of the user's face;
in which a UV coordinate of a landmark vertex is computed based on a result of a corresponding 2D face landmark position detected by a 2D face landmark detector on the at least one 2D image of the user's face;
in which head geometry is improved for better realism by deforming an initial head model by rectifying facial landmark positions of the personalized 3D head model in directions within an image plane of the at least one 2D image of the user's face, so that a projection of facial landmarks on the personalized 3D head model is a similarity transform of corresponding 2D facial landmarks in the at least one 2D image of the user's face.

19. A computer program product embodied on a non-transitory storage medium, the computer program product comprising instructions executable on a processor to generate an image file of a personalized three-dimensional (3D) head model of a user, the computer program product executable on the processor to:
(i) receive at least one two-dimensional (2D) image of the user's face;
(ii) perform an automated face 2D landmark recognition based on the at least one 2D image of the user's face;
(iii) provide a 3D face geometry reconstruction using a shape prior;
(iv) provide texture map generation and interpolation with respect to the 3D face geometry reconstruction to generate the personalized 3D head model of the user, and
(v) generate the image file of the personalized 3D head model of the user;
wherein the generated texture map includes a 3D mesh geometry of the user's face comprising mesh triangles;
UV texture coordinates are determined for texture vertices of each mesh triangle of the 3D mesh geometry of the user's face;
in which a UV coordinate of a landmark vertex is computed based on a result of a corresponding 2D face landmark position detected by a 2D face landmark detector on the at least one 2D image of the user's face;
in which head geometry is improved for better realism by deforming an initial head model by rectifying facial landmark positions of the personalized 3D head model in directions within an image plane of the at least one 2D image of the user's face, so that a projection of facial landmarks on the personalized 3D head model is a similarity transform of corresponding 2D facial landmarks in the at least one 2D image of the user's face.

20. A method of generating an image file of a personalized three-dimensional (3D) head model of a user, the method comprising the steps of:
(i) acquiring at least one two-dimensional (2D) image of the user's face;
(ii) performing automated face 2D landmark recognition based on the at least one 2D image of the user's face;
(iii) providing a 3D face geometry reconstruction using a shape prior;
(iv) providing texture map generation and interpolation with respect to the 3D face geometry reconstruction to generate the personalized 3D head model of the user, and
(v) generating the image file of the personalized 3D head model of the user;
wherein the generated texture map includes a 3D mesh geometry of the user's face comprising mesh triangles;
UV texture coordinates are determined for texture vertices of each mesh triangle of the 3D mesh geometry of the user's face;
in which a UV coordinate of a landmark vertex is computed based on a result of a corresponding 2D face landmark position detected by a 2D face landmark detector on the at least one 2D image of the user's face;
in which a 3D thin-plate spline (TPS) deformation model is used to rectify a 3D geometry of a regressed head model to achieve better geometric similarity, so as to generate a smooth interpolation of 3D geometry deformation throughout the 3D mesh geometry of the user's face from control point pairs.

21. A method of generating an image file of a personalized three-dimensional (3D) head model of a user, the method comprising the steps of:
(i) acquiring at least one two-dimensional (2D) image of the user's face;
(ii) performing automated face 2D landmark recognition based on the at least one 2D image of the user's face;
(iii) providing a 3D face geometry reconstruction using a shape prior;
(iv) providing texture map generation and interpolation with respect to the 3D face geometry reconstruction to generate the personalized 3D head model of the user, and (v) generating the image file of the personalized 3D head model of the user;

wherein the generated texture map includes a 3D mesh geometry of the user's face comprising mesh triangles;

UV texture coordinates are determined for texture vertices of each mesh triangle of the 3D mesh geometry of the user's face;

in which a UV coordinate of a landmark vertex is computed based on a result of a corresponding 2D face landmark position detected by a 2D face landmark detector on the at least one 2D image of the user's face;

in which the at least one 2D image of the user's face comprises at least a front image, a left side image and a right side image, of the user's face, and in which following generating an approximate 3D face model from the front image for use as an initialisation model, a step is performed of performing an iterative optimisation algorithm for revising the initialisation model, which is implemented to minimise landmark re-projection errors against independent 2D face landmark detection results obtained from the front image, the left side image and the right side image, of the user's face.

* * * * *